United States Patent
Feldman et al.

(10) Patent No.: US 10,447,744 B2
(45) Date of Patent: Oct. 15, 2019

(54) SIMULTANEOUS INPUT SYSTEM FOR WEB BROWSERS AND OTHER APPLICATIONS

(71) Applicant: T1V, INC., Charlotte, NC (US)

(72) Inventors: Michael R. Feldman, Huntersville, NC (US); James E. Morris, Lake Wylie, SC (US); Ron Gilson, Cornelius, NC (US); Todd Eaglin, Charlotte, NC (US)

(73) Assignee: TIV, Inc., Charlotte, NC (US)

( * ) Notice: Subject to any disclaimer, the term of this patent is extended or adjusted under 35 U.S.C. 154(b) by 342 days.

(21) Appl. No.: 15/455,920

(22) Filed: Mar. 10, 2017

(65) Prior Publication Data

US 2017/0187762 A1 Jun. 29, 2017

Related U.S. Application Data

(63) Continuation of application No. 14/540,946, filed on Nov. 13, 2014, now Pat. No. 9,596,319.
(Continued)

(51) Int. Cl.
| | |
|---|---|
| *G06F 3/0481* | (2013.01) |
| *H04L 29/06* | (2006.01) |
| *G06F 9/451* | (2018.01) |
| *G06Q 10/10* | (2012.01) |
| *G06F 9/44* | (2018.01) |

(Continued)

(52) U.S. Cl.
CPC ........... *H04L 65/403* (2013.01); *G06F 3/048* (2013.01); *G06F 3/0481* (2013.01); *G06F 3/04883* (2013.01); *G06F 9/44* (2013.01); *G06F 9/451* (2018.02); *G06Q 10/101* (2013.01); *H04L 67/12* (2013.01); *H04L 67/36* (2013.01); *H04L 67/22* (2013.01)

(58) Field of Classification Search
USPC ......................................................... 715/753
See application file for complete search history.

(56) References Cited

U.S. PATENT DOCUMENTS

| | | | |
|---|---|---|---|
| 7,287,054 B2* | 10/2007 | Lee ................... | H04M 3/567 709/204 |
| 7,326,117 B1* | 2/2008 | Best ................... | A63F 13/10 463/32 |

(Continued)

FOREIGN PATENT DOCUMENTS

WO    WO 2012/109368 A1    8/2012

*Primary Examiner* — Reza Nabi
(74) *Attorney, Agent, or Firm* — Lee & Morse, P.C.

(57) ABSTRACT

In a computing environment having a multiple input detection system including a detector that detects and transmits multiple simultaneous user inputs from different users at a same time, a method for processing inputs from different users across multiple application windows of one or more applications displayed on a single display of a user interface, resulting in a multi-user graphical user interface (GUI), the computing environment running an operating system (OS) designed to run with a single user GUI, the method including determining, in a primary application, separate from the OS, that a first user input corresponds to a first window and a second user input corresponds to a second window, the primary application sending the first and second user inputs to first and second secondary applications that run in parallel with the primary application, the first and second secondary applications being designed to run with the OS.

10 Claims, 65 Drawing Sheets

Related U.S. Application Data

(60) Provisional application No. 61/903,736, filed on Nov. 13, 2013, provisional application No. 61/953,399, filed on Mar. 14, 2014, provisional application No. 62/007,789, filed on Jun. 4, 2014, provisional application No. 62/013,365, filed on Jun. 17, 2014.

(51) Int. Cl.
*H04L 29/08* (2006.01)
*G06F 3/048* (2013.01)
*G06F 3/0488* (2013.01)

(56) References Cited

U.S. PATENT DOCUMENTS

| | | | | |
|---|---|---|---|---|
| 7,620,901 | B2 * | 11/2009 | Carpenter | G06F 3/048 715/754 |
| 8,347,215 | B2 | 1/2013 | Carpenter et al. | |
| 2001/0012025 | A1 * | 8/2001 | Wojaczynski | G06F 3/0485 715/856 |
| 2002/0065877 | A1 * | 5/2002 | Kowtko | G06F 16/972 709/203 |
| 2002/0065912 | A1 * | 5/2002 | Catchpole | H04L 29/06 709/224 |
| 2002/0138624 | A1 * | 9/2002 | Esenther | H04L 29/06 709/227 |
| 2003/0189597 | A1 * | 10/2003 | Anderson | G06F 3/0481 715/778 |
| 2003/0208535 | A1 * | 11/2003 | Appleman | G06Q 10/10 709/203 |
| 2005/0015492 | A1 * | 1/2005 | Kumbalimutt | H04L 67/1006 709/226 |
| 2006/0129642 | A1 * | 6/2006 | Qian | G06F 16/954 709/205 |
| 2007/0106748 | A1 * | 5/2007 | Jakobsson | H04L 63/0807 709/217 |
| 2010/0082746 | A1 * | 4/2010 | Ulrich | G06F 16/954 709/204 |
| 2010/0083135 | A1 * | 4/2010 | Zawacki | H04L 12/1822 715/753 |
| 2013/0047093 | A1 * | 2/2013 | Reuschel | G06F 3/04883 715/753 |
| 2013/0076591 | A1 * | 3/2013 | Sirpal | G06F 3/1438 345/1.3 |
| 2013/0187861 | A1 * | 7/2013 | Lavallee | G06F 9/543 345/173 |
| 2013/0214996 | A1 * | 8/2013 | Reeves | G09G 5/14 345/1.3 |
| 2015/0200985 | A1 * | 7/2015 | Feldman | H04L 67/36 715/753 |
| 2016/0085436 | A1 * | 3/2016 | Louch | G06F 3/0481 715/790 |

* cited by examiner

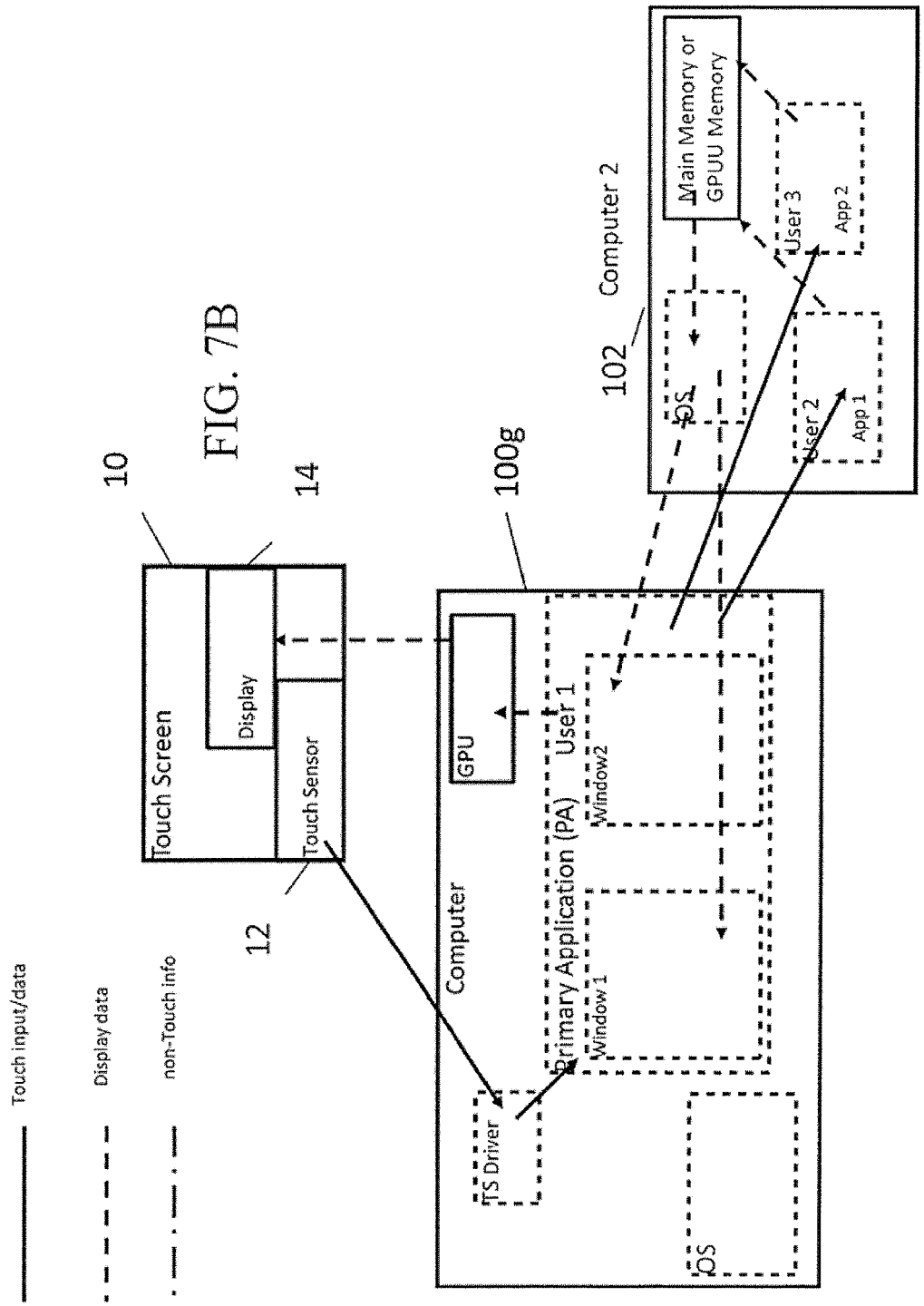

View of Portion of a primary screen showing icon bar with multi-user mirroring icon Multi-user Mirroring Icon

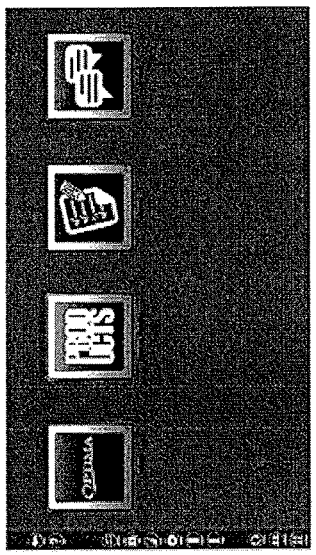
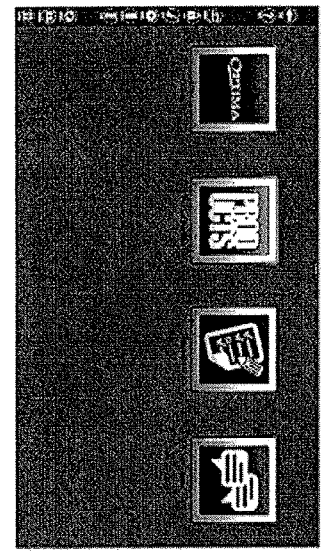
FIG. 33A
FIG. 33B
Conventional Mirror Mode — Single User Mode
Primary screen / Secondary screen New Mirror Mode
Single User Mode

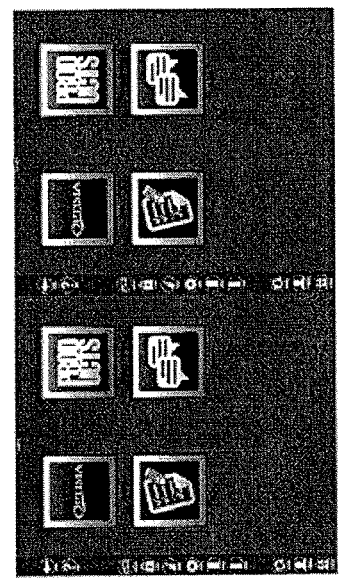
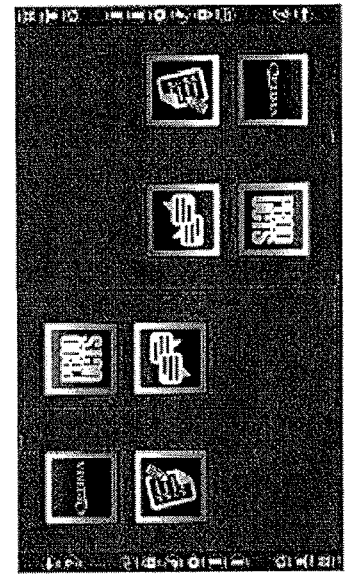
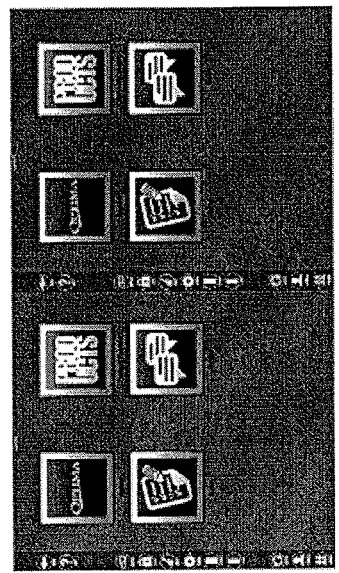
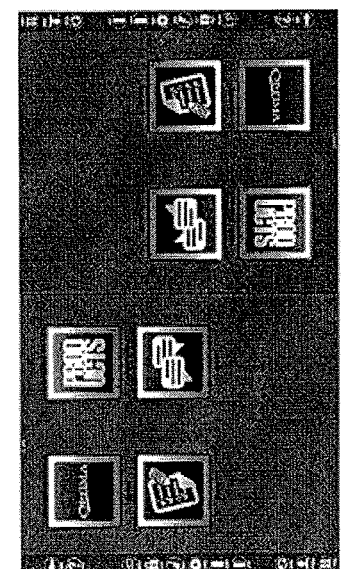
FIG. 35A — Conventional Mirror Mode
FIG. 35B — Two User Mode New Mirror Mode / Two User Mode
Secondary screen
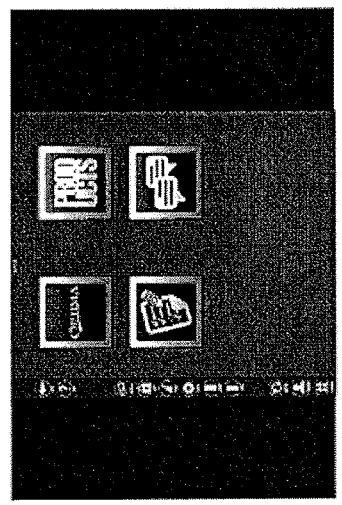
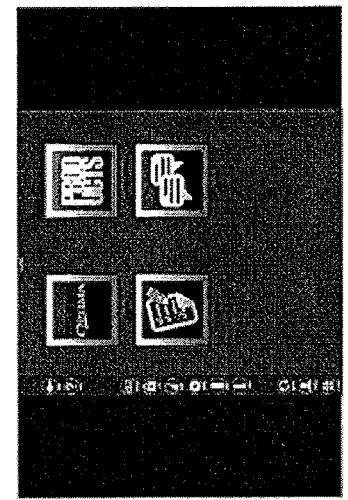
Primary screen
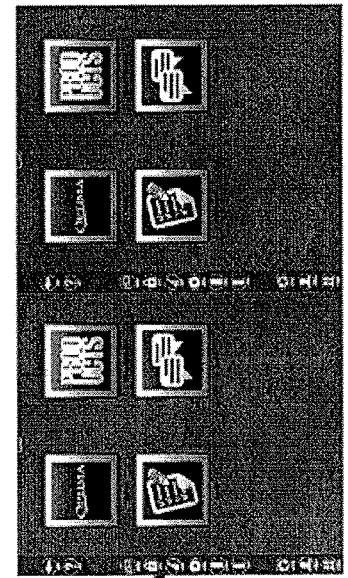
FIG. 36A
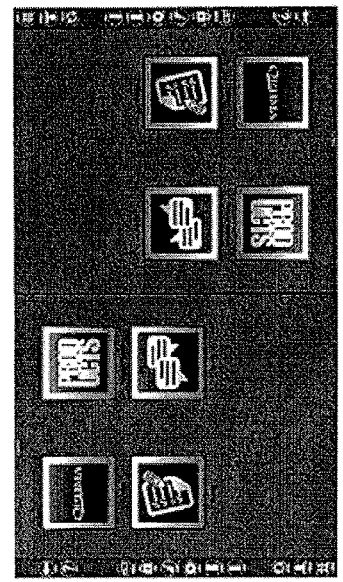
FIG. 36B New Mirror Mode
Two User Mode
Secondary screen
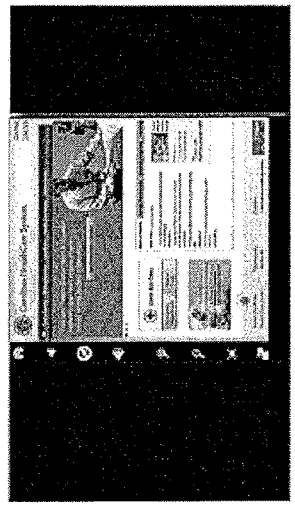
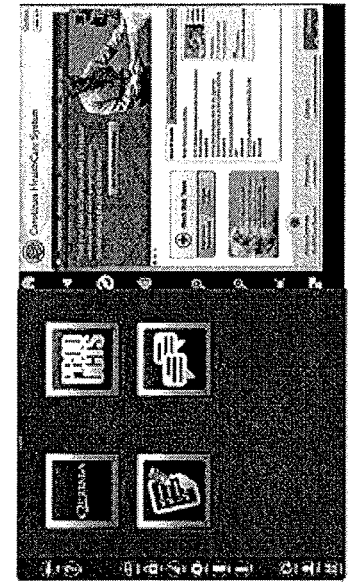
Primary screen
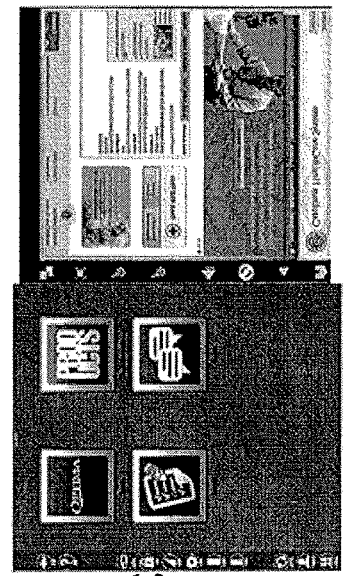
FIG. 36C
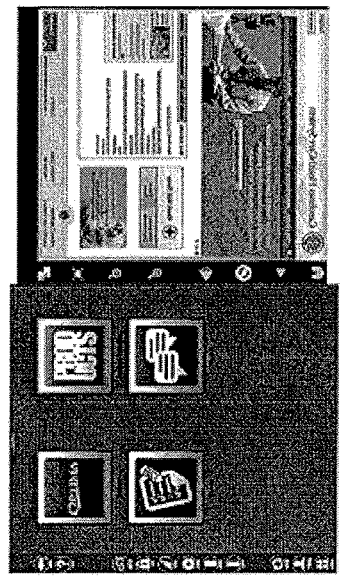
FIG. 36D New Mirror Mode
Four User Mode
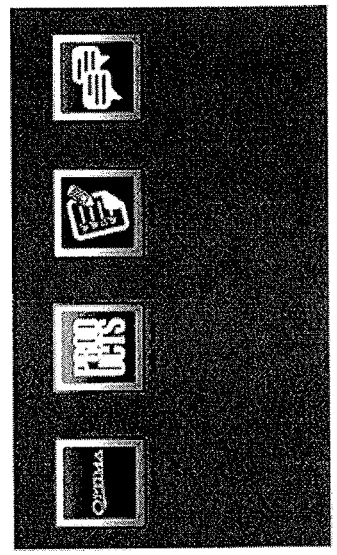
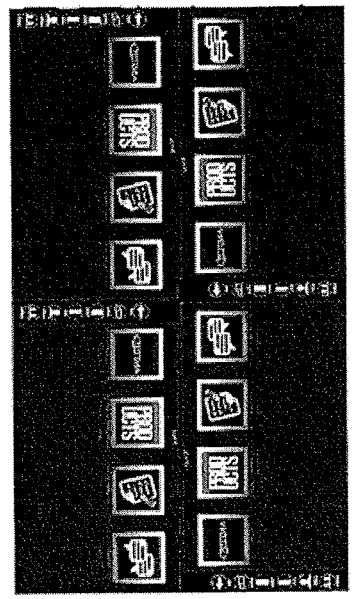
Secondary screen
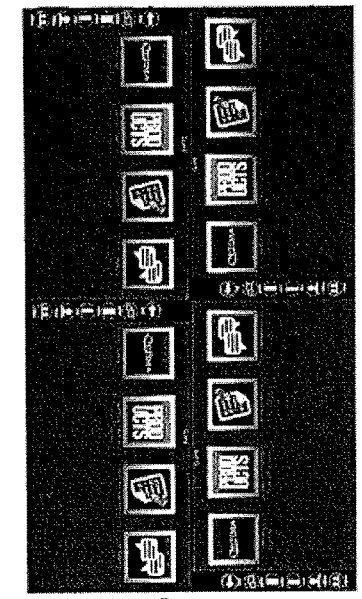
Primary screen
FIG. 38A
FIG. 38B

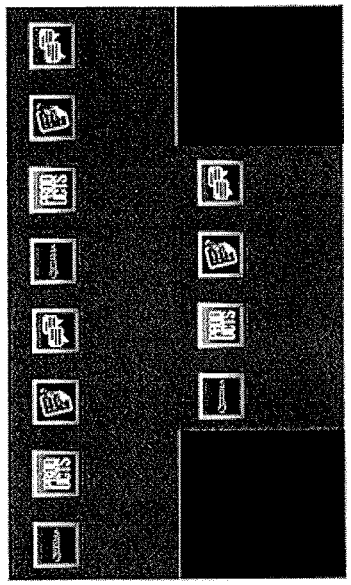
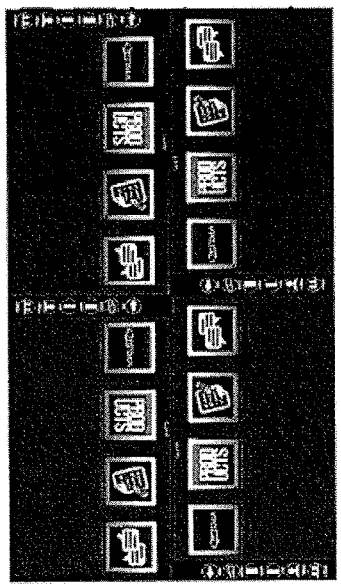
FIG. 38C
FIG. 38D

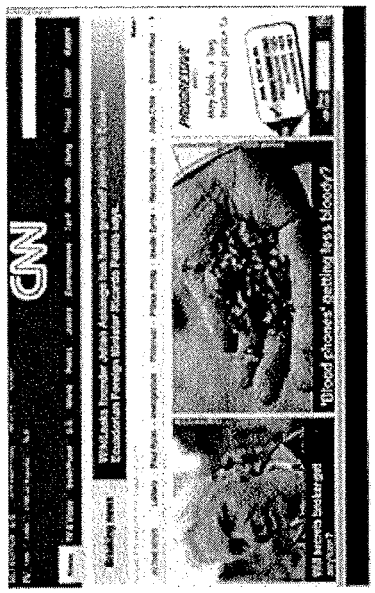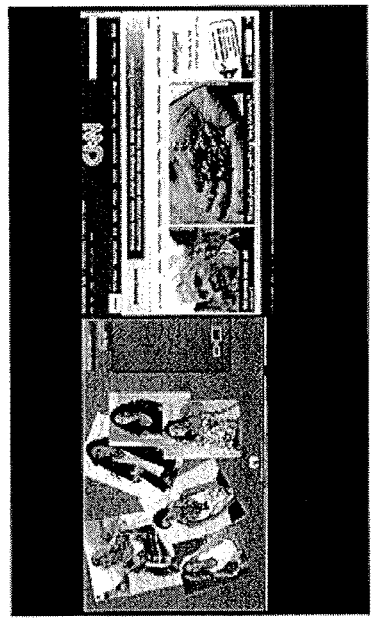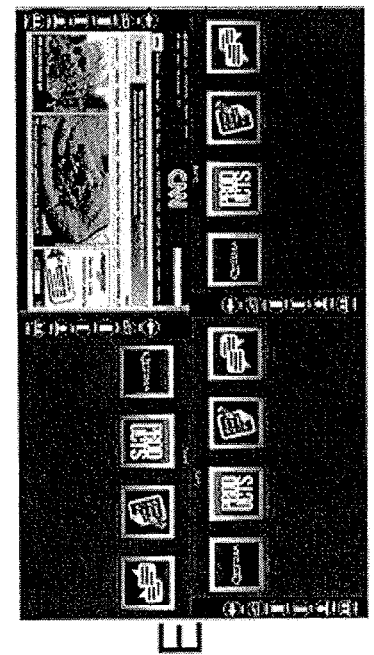
FIG. 38E
FIG. 38F

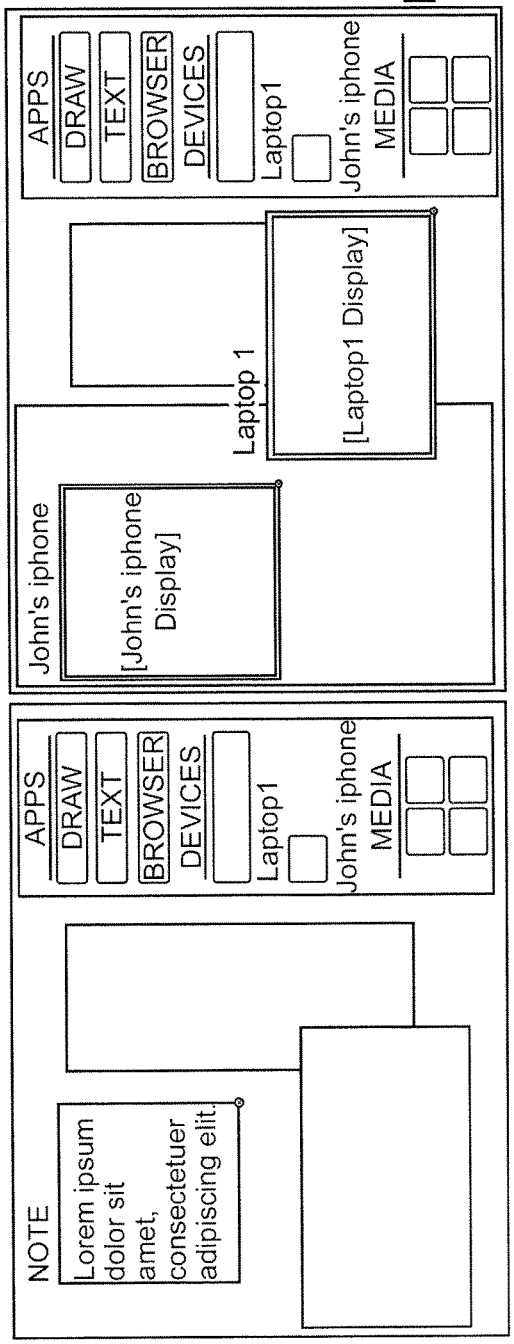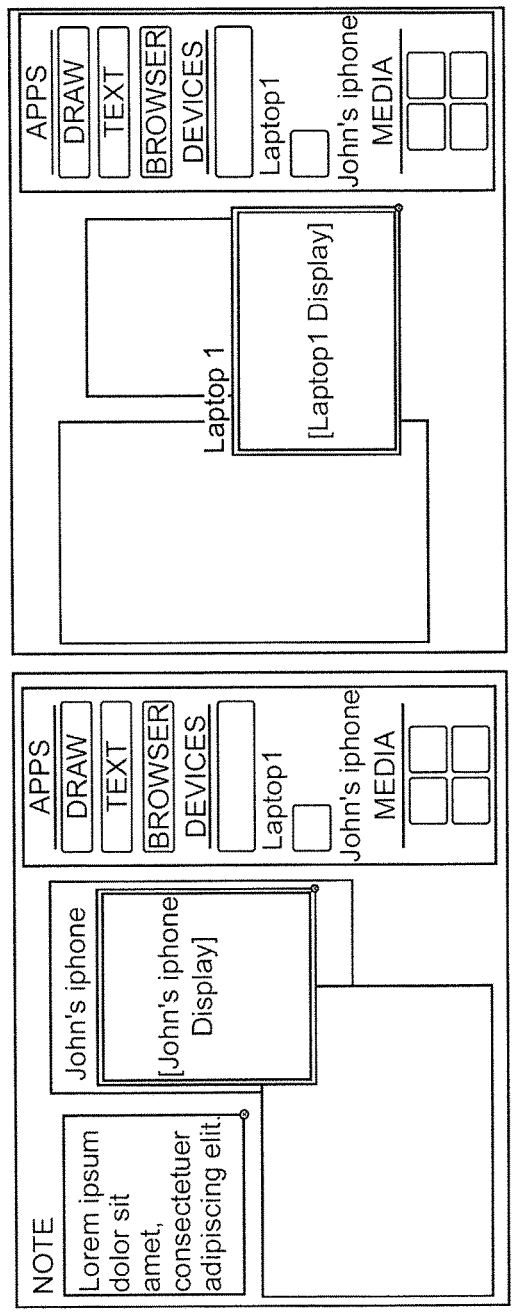

SIMULTANEOUS INPUT SYSTEM FOR WEB BROWSERS AND OTHER APPLICATIONS

CROSS-REFERENCE TO RELATED APPLICATION

This application is a continuation of U.S. patent application Ser. No. 14/540,946, entitled "Simultaneous Input System for Web Browsers and Other Applications," which was filed on Nov. 13, 2014, the entire contents of which are hereby incorporated by reference.

This application is related to U.S. Provisional Application Nos.: 61/903,736, filed on Nov. 13, 2013, entitled "Display System"; 61/953,399, filed on Mar. 14, 2014, and entitled "Multimedia System and Associated Methods", 62/007,789, filed on Jun. 4, 2014, and entitled "Touchscreen System for Web Browsers and Other Applications," and 62/013,365, filed on Jun. 17, 2014, and entitled "Touchscreen System for Web Browsers and Other Applications," all of which are incorporated by reference in their entirety herein.

SUMMARY

One or more embodiments are direct to a computing environment, the computing environment having a multiple input detection system including a detector that detects and transmits multiple simultaneous user inputs from different users at a same time, a method for processing inputs from different users across multiple application windows of one or more applications displayed on a single display of a user interface, resulting in a multi-user graphical user interface (GUI), the computing environment running an operating system (OS) designed to run with a single user GUI, the method including receiving a first user input from the detector, simultaneous to receiving the first user input from the detector, receiving a different second user input from the detector, determining, in a primary application, separate from the OS, that the first user input corresponds to a first window, the primary application sending the first user input to a first secondary application that runs in parallel with the primary application, the first secondary application being designed to run with the OS, determining a first user input event from the first user input, displaying a result of the determined first user input event in the first window associated with the first secondary application, determining, in the primary application, that the second user input corresponds to a second window, the primary application sending the second user input to a second secondary application that runs in parallel with the primary application, the second secondary application being designed to run with the OS, determining a second user input event from the second user input, and displaying a result of the determined second user input event on the second window associated with the second secondary application.

The first and second secondary applications may be a same type of application.

The first and second secondary applications may be web browser applications.

The primary application may distribute user inputs to the first and second secondary applications while bypassing the OS.

The primary application may receive user inputs from the detector before the OS receives the first user input.

The primary application distributes user inputs to the first and second secondary applications through the OS.

The method may include starting up the first and second secondary applications in invisible windows by the primary application.

The method may include providing a first user account and corresponding login information for the primary application, the primary application running in the first user account, the primary application logging into a second user account for the first secondary application within the second user account and starting the first secondary application, display information from the first secondary application or an entirety of a desktop for the second user being transferred to the primary application to be displayed by the primary application in a window on the display and input information is transferred by the primary application to the first secondary application or to the desktop for the second user.

The primary application may be in a first computer running a first operating system and the first and second secondary applications may be in a second computer running a second operating system.

The first and second operating systems may be different types of operating systems.

The first user input may include moving or resizing the first window and the second user input may include moving or resizing the second window.

One or more embodiments is directed to providing, a computing environment, the computing environment having a multiple input detection system including a detector that detects and transmits multiple simultaneous user inputs from different users at a same time, a method for processing inputs from different users across multiple application windows of one or more applications displayed on a single display of a user interface, resulting in a multi-user graphical user interface (GUI), the single display having a canvas displaying multiple application windows, the method including dividing the single display into at least two section, each section providing an independent view of the canvas, wherein a canvas maneuver within a section affects only a view within that section.

The canvas maneuver may include at least one of panning, pinching and zooming.

A window maneuver of a window within a section may affect a view of the window for all sections viewing that window.

One or more embodiments is directed to a system, including an interactive display including a sensor and a display and a computer in communication with the display, the computer including a sensor driver that responds to inputs from the sensor, wherein a gesture associated with maneuvering items on a canvas of the display performs the maneuvering depending on a location of the gesture and a state of the items, wherein the maneuvering is applied to an entirety of the canvas when the gesture is not adjacent the item, the maneuvering is applied to the item itself when the gesture is adjacent the item and the item is not in select mode, and the maneuvering is applied to contents of the item when the gesture is adjacent the item and the item is in select mode.

One or more embodiments is directed to a system, including a system including a simultaneous multiple input detector and a display, and a computer in communication with the display and the detector, the computer including an operating system, at least one web browser application designed for code to run in the operating system, a primary application separate from the operating system, and a detection driver in communication with the detector, the primary application providing touch information from the detector driver directly to the web browser application.

There may be at least two web browser applications and the primary application may keep multiple web browser windows displayed on the display corresponding to respective ones of the least two web browser applications in focus on the display simultaneously.

Zooming, pinching, or panning may affect all of the touchscreen display or may affect only a section of the touchscreen display associated with the primary application.

One or more embodiments is directed to a display system including a computer, a primary screen including a display in communication with the computer, and a secondary screen, separate from the primary screen and in communication with the computer, wherein the computer is configured to mirror an initial portion of the primary screen, the primary screen display changing in response to user inputs, the computer being configured to update the secondary screen in real time to mirror the initial portion of the primary screen as the primary screen display changes, and the computer being configured to change the portion of the primary screen that is mirrored in response to user inputs.

The primary screen may include a touch detection surface serving as a primary input to the computer and user inputs are touches.

The display may be divided into at least two simultaneously active sections, touches in the at least two simultaneously active sections having independent effects within the at least two simultaneously active sections, each simultaneously active section having an independent interface configured to select distinct applications in each simultaneously active section.

The detector may be a touch detector and the computer may be configured to perform an action in response to a touch on a touch detection surface, the action reconfiguring at least one of a number and orientation of the at least two continuously active sections.

An orientation of a display on the secondary screen may be unchanged by the action.

The computer may be configured, in response to a user input, to reconfigure a display on the primary screen from an initial configuration into a different configuration, each configuration corresponding to a numerical value, a numerical value of one corresponding to a single screen and a numerical value of greater than one corresponding to a number of independent sub-screens equal to the numerical value.

An image displayed on the secondary screen may remain unchanged when the number of independent sub-screens on the primary screen is changed.

There may be at a least two portions of the primary screen, each oriented at a different angle, and when both of the least two portion of the primary screen are mirrored on the secondary screen, both are mirrored with the same angles of orientation.

A website may be displayed within the portion of the primary screen.

The website displayed on the secondary screen may have a higher resolution than that displayed within the portion of the primary screen.

One or more embodiments is directed to providing a display system, including a computer, a primary screen including a display and a touch detection surface serving as a primary input to the computer, a secondary screen, separate from the primary screen and in communication with the computer, wherein the computer is configured to mirror an initial portion of the primary screen, the primary screen display changing in response to touch inputs on the touch detection surface, the computer being configured to update the secondary screen in real time to mirror the initial portion of the primary screen as the primary screen display changes, the computer further configured to rotate the initial portion of the primary screen in response to a gesture from a user on the primary screen, and where the computer is further configured to continue to mirror the initial portion of the primary screen on to the secondary screen when the initial portion is rotated, except that the angle of orientation on the secondary screen is maintained even when rotated on the primary screen.

One or more embodiments is directed to a system, including a sensor that detects gestures, a group display in communication with the surface, and a computer connected to the surface and the group display, the computer being configured to open a first window in a display region of the group display to mirror a view on a first mobile device in the first window, to manipulate the first window in response to gestures detected by the sensor, and to update the first window in real time.

The computer may be configured to update the first window in real time while the first window is being manipulated.

The computer may be configured to open a second window in the display region of the group display to display information from a second mobile device in the second window.

The gestures may include at least one of touches and motions.

When the first window is selected, additional functions may appear adjacent the first window.

The system may include a snapshot icon adjacent the first window, when the snapshot icon is activated, the computer is configured to display a static image of the first window as a new window.

The group display may include a tray region from which an application and a mobile device are selected and a display region. The tray region may display a representation of the first mobile device and, when a gesture moves that representation towards the display region, the computer is configured to open the first window in the display region. The tray region may include additional applications to be selected and run in the display region.

The system may include a secondary screen in communication with the computer, the secondary screen being separate from the group display, wherein, when the first window is selected and a gesture moves the first window towards the secondary screen, the computer is configured to display the first window on the secondary screen.

One or more embodiments is directed to a system including a sensor that detects gestures, a group display in communication with the sensor, the group display including at least two display devices, and a computer connected to the sensor and the group display, the computer being configured to open a first window in a display region of the group display to mirror a view on a first mobile device in the first window, the first window spanning more than one display device, and to manipulate the first window in response to gestures detected by the sensor.

One or more embodiments is directed to a system including a sensor that detects gestures, a group display in communication with the surface, and a computer connected to the sensor and the group display, the computer being configured to open a plurality of windows in a display region of the group display, to manipulate the windows in response to gestures detected by the sensor, where the windows include a variety of types, including at least one of drawings that are drawn on the group display, windows that include content of mobile devices that are mirrored an updated in real time on the group display, and text windows containing text that are input through either text messaging, email or typed with a virtual keyboard on the group display, wherein multiple windows can be selected and grouped with a gesture, a label to the group can be added with a virtual keyboard or by drawing directly on the group display, and the group including the label and the windows selected can be saved to a separate file.

One or more embodiments is directed to a system, including a sensor that detects gestures, a group display in communication with the surface, and a computer connected to the surface and the group display, the computer being configured to open a first window in a display region of the group display to mirror a view on a first mobile device in the first window, to manipulate the first window in response to gestures detected by the sensor, and to update the first window in real time.

The computer may be configured to update the first window in real time while the first window is being manipulated.

The computer may be configured to open a second window in the display region of the group display to display information from a second mobile device in the second window.

The gestures may include at least one of touches and motions.

When the first window is selected, additional functions may appear adjacent the first window.

The system may include a snapshot icon adjacent the first window, when the snapshot icon is activated, the computer is configured to display a static image of the first window as a new window.

The group display may include a tray region from which an application and a mobile device are selected and a display region. The tray region may display a representation of the first mobile device and, when a gesture moves that representation towards the display region, the computer is configured to open the first window in the display region. The tray region may include additional applications to be selected and run in the display region.

The system may include a secondary screen in communication with the computer, the secondary screen being separate from the group display, wherein, when the first window is selected and a gesture moves the first window towards the secondary screen, the computer is configured to display the first window on the secondary screen.

One or more embodiments is directed to a system including a sensor that detects gestures, a group display in communication with the sensor, the group display including at least two display devices, and a computer connected to the sensor and the group display, the computer being configured to open a first window in a display region of the group display to mirror a view on a first mobile device in the first window, the first window spanning more than one display device, and to manipulate the first window in response to gestures detected by the sensor.

One or more embodiments is directed to a system including a sensor that detects gestures, a group display in communication with the surface, and a computer connected to the sensor and the group display, the computer being configured to open a plurality of windows in a display region of the group display, to manipulate the windows in response to gestures detected by the sensor, where the windows include a variety of types, including at least one of drawings that are drawn on the group display, windows that include content of mobile devices that are mirrored an updated in real time on the group display, and text windows containing text that are input through either text messaging, email or typed with a virtual keyboard on the group display, wherein multiple windows can be selected and grouped with a gesture, a label to the group can be added with a virtual keyboard or by drawing directly on the group display, and the group including the label and the windows selected can be saved to a separate file.

BRIEF DESCRIPTION OF THE DRAWINGS

Features will become apparent to those of ordinary skill in the art by describing in detail exemplary embodiments with reference to the attached drawings in which:

FIGS. 33A and 33B illustrate a primary screen and a secondary screen in a conventional system operating in single user mode;

FIGS. 35A and 35B illustrate a primary screen and a secondary screen in a conventional system operating in two user mode;

FIGS. 36A to 36D illustrate a primary screen and a secondary screen in accordance with an embodiment operating in two user mode;

FIGS. 38A to 38F illustrate a primary screen and a secondary screen in accordance with an embodiment operating in four user mode;

FIGS. 50a to 50d illustrate different actions that may be performed between the group display and a secondary display;

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

There is often a need to display multiple apps on an interactive screen at the same time and have them used by different users simultaneously. Such interactive screens may include touch screen, screens manipulated using gesture detection, and so forth. While this may be realized by having an operating system (OS), e.g., Windows, Mac, Android, and so forth, running on a computer initially at start-up and then having the OS running different apps in different windows, this approach does have some issues.

Figure 1:
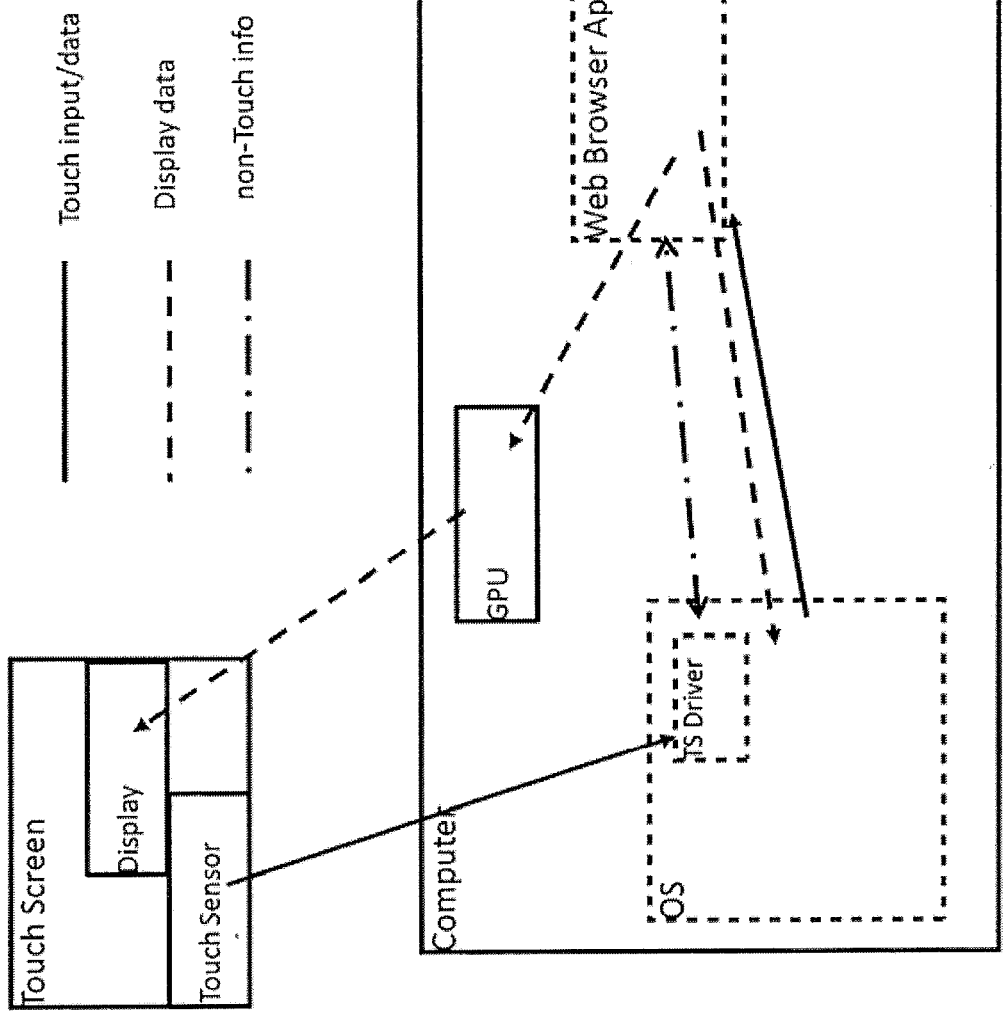
FIG. 1 illustrate a block diagram of a touch screen display system in accordance related art.

As illustrated in FIG. 1, a touch screen (TS) driver may be built into an operating system (OS), e.g., Windows® 8. The OS then takes the input from the TS driver and converts the input into simple touch commands and coordinates to pass onto another application, e.g., a web browser application.

For example, to launch a web browser, the OS specifies the coordinates of a window in the display to the web browser application and the web browser is launched within the window coordinates specified. What happens within the window is governed from here on out, i.e., after launch, by the touch inputs and the OS. For example, when someone touches within the browser an area that requires a keystroke entry (a text entry field), the browser communicates this information to the OS.

Further, only one application can be in focus at a time. Suppose two applications are running, each in a different window. Tapping on one window typically would bring the application within that window in focus. For whichever application is in focus, all touch inputs are directed to the window and application that is in focus. Also, any OS functions would be directed toward whichever application and window that is in focus. OS functions would include a system keyboard, which can be realized by plugging in a physical keyboard, by using a virtual keyboard that is part of the OS, or by creating and displaying a virtual keyboard to interact with the OS's system keyboard functions.

In the above operations, there is only one web browser running at a time, allowing the single web browser to always be in focus. However, if multiple web browsers are to be run simultaneously, typically only one can be in focus at a time.

One or more embodiments disclosed herein is directed to a primary application, separate from the OS, that provides a multiple user graphical user interface (GUI) even when the OS is only designed to operate with a single GUI. Such conventional OSs includes Mac, Android, Linux, iOS, Windows, and so forth. Such conventional Oss are designed to use a single user GUI, i.e., have only one window in focus at a given time and only able to receive input information for a window that is in focus. For example, Mac uses Finder as its single user GUI and Windows uses File Explorer or Metro as its single user GUI.

FIGS. 2 to 7B illustrate a block diagram of a touch screen display system in accordance with embodiments. The solid line blocks indicate hardware components and the dashed line blocks indicate software components. Different communication pathways are indicated by different line styles. While the embodiments are described in connection with a touch screen, other multiple input devices may be used in addition to or in place of the touch screen, e.g., gesture detection.

As shown in FIGS. 2 to 7B, the touch screen display system includes a touch screen display 10 and a display computer 100a. The touch screen 10 may include a touch sensor 12 and a display 14, e.g., a liquid crystal display, an organic light emitting diode display, and so forth. The touch sensor 12 and the display 14 may, e.g., completely, overlap. The computer may include an operating system (OS), a graphic processing unit (GPU), a primary application (PA), other applications, e.g., a web browser application (WBA), Power Point, designed to operate with a single user graphical user interface (GUI), and so forth, and a touchscreen (TS) driver.

Figure 2:
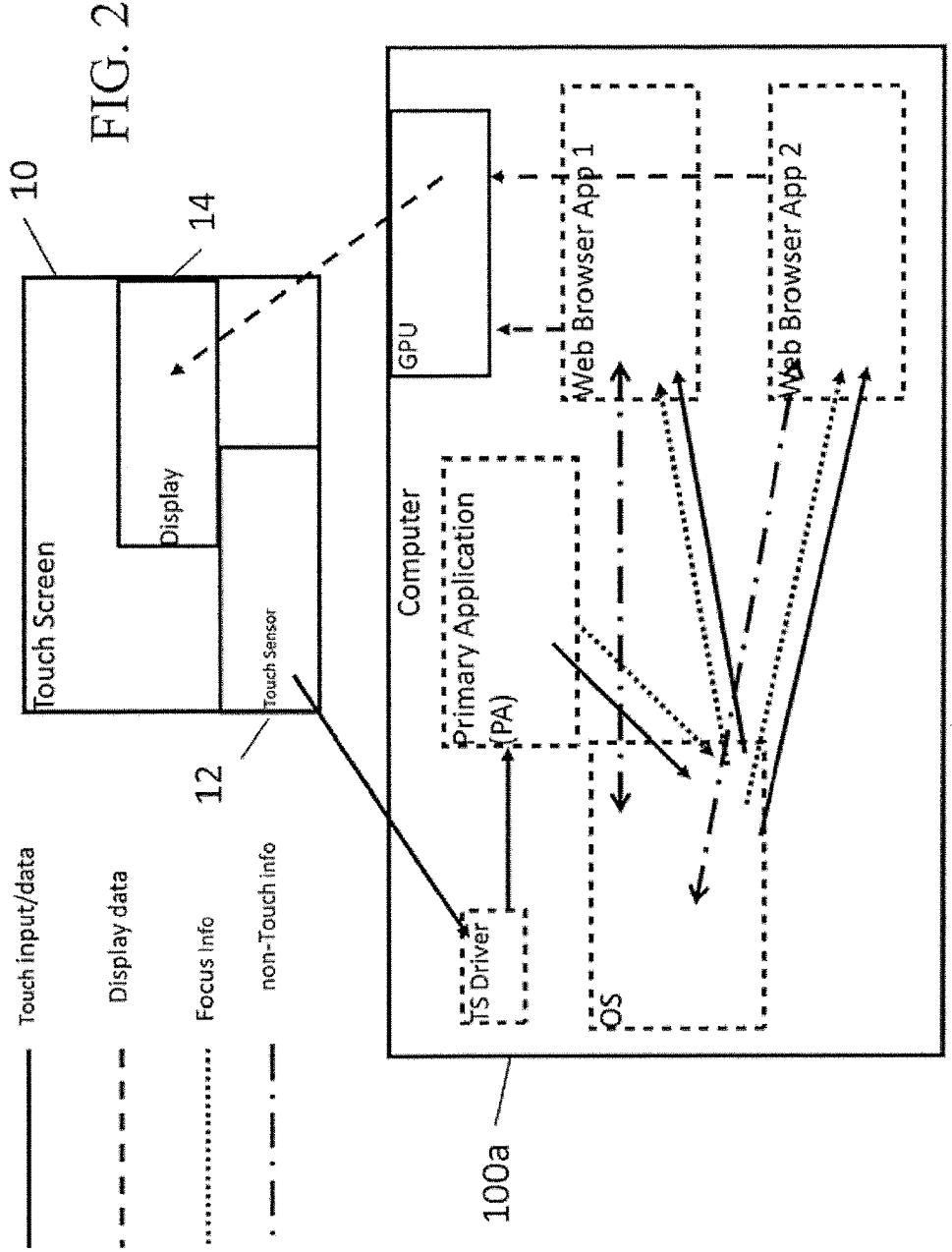
FIGS. 2 to 7B illustrate a block diagram of a touch screen display system in accordance with embodiments.

As shown in FIG. 2, in a first embodiment, a computer 100a may include an operating system (OS), a graphic processing unit (GPU), a primary application (PA) 108, secondary applications, e.g., a web browser application (WBA), and a touchscreen (TS) driver. In this embodiment, the TS driver is not part of the OS, but bypasses the OS to directly talk to the PA which, in turn, directly talks to the secondary applications. The OS may launch multiple web browsers. When the PA receives a touch input, the PA would first look at the location of the touch input coordinates to determine which secondary application window was touched. The PA would then communicate to the OS to bring the corresponding web browser window into focus and then send that touch input to the OS. If two touch inputs were received at the same time, each window would sequentially be brought into focus, e.g., bring window 1 in to focus, then send touch input 1 to OS, then bring window 2 in to focus then send touch input 2 to OS. This works well for single tap entries, as long as there are not a lot of touches occurring at the same time in multiple windows. For example, it is impossible to do a continuous touch motion within a first browser window, while simultaneously performing taps in a second browser window, without breaking the continuous motion of the browser contents in the first window, with this method. This is because, when the PA receives the touch input from the second window and has the OS shift the focus to the second window, the input from the first window will be interrupted and therefore the motion associated with the continuous touch will be discontinuous.

As shown in FIG. 3, again the TS driver is not part of the OS, but bypasses the OS to directly talk to the PA. Alternatively, as shown in FIG. 4, the TS driver may be part of the PA. In a further alternative, as shown in FIG. 5, a human interface device (HID) protocol may be included in the touch screen and in the OS. In this case, the OS may communicate through the HID through e.g., a USB port through which the touch screen and the computer are connected, and may be considered part of the TS driver, as the touch inputs from the touch sensor are input thereto. This HID then outputs the touch inputs to the TS driver in the PA.

Figure 3:
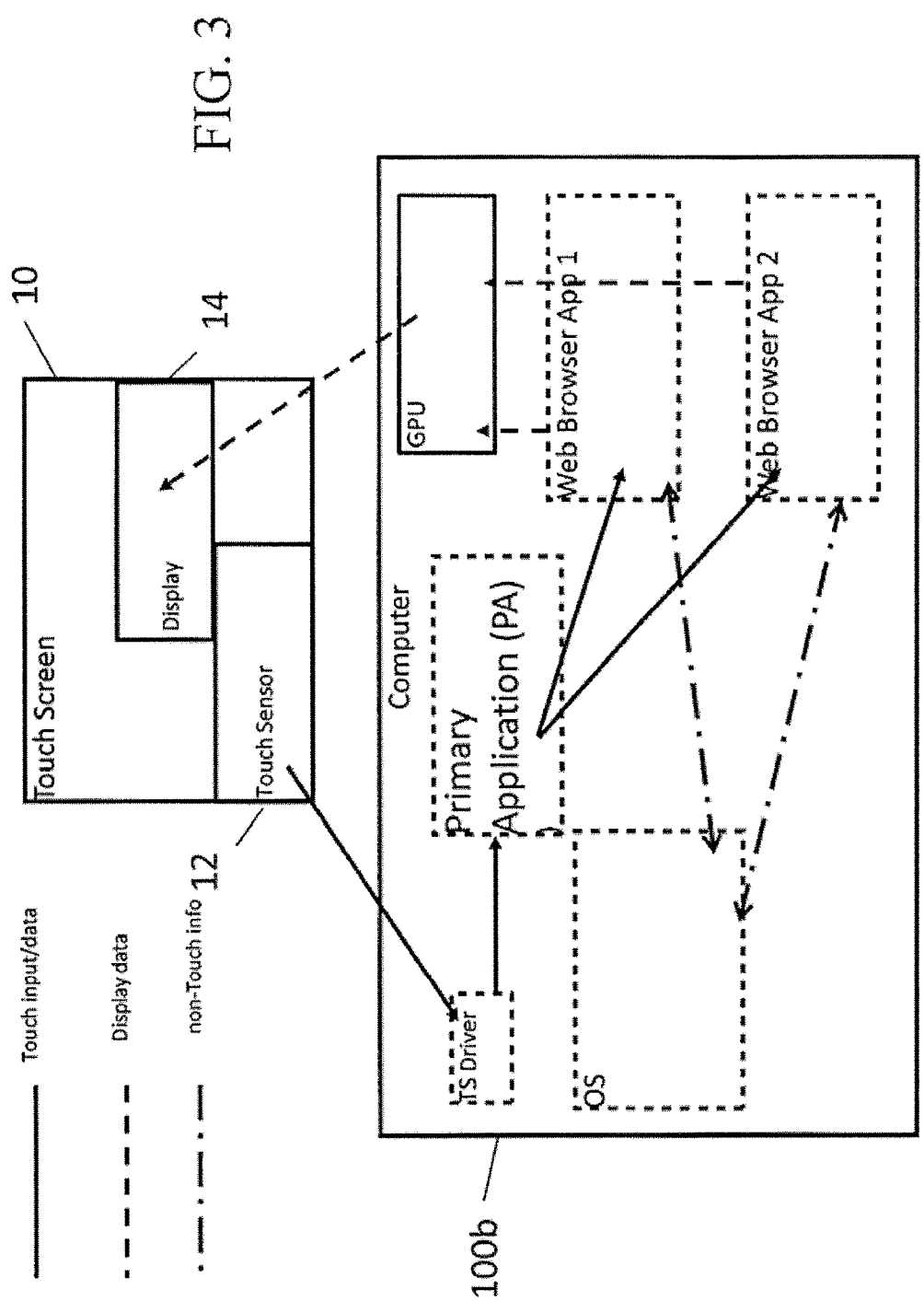
Figure 4:
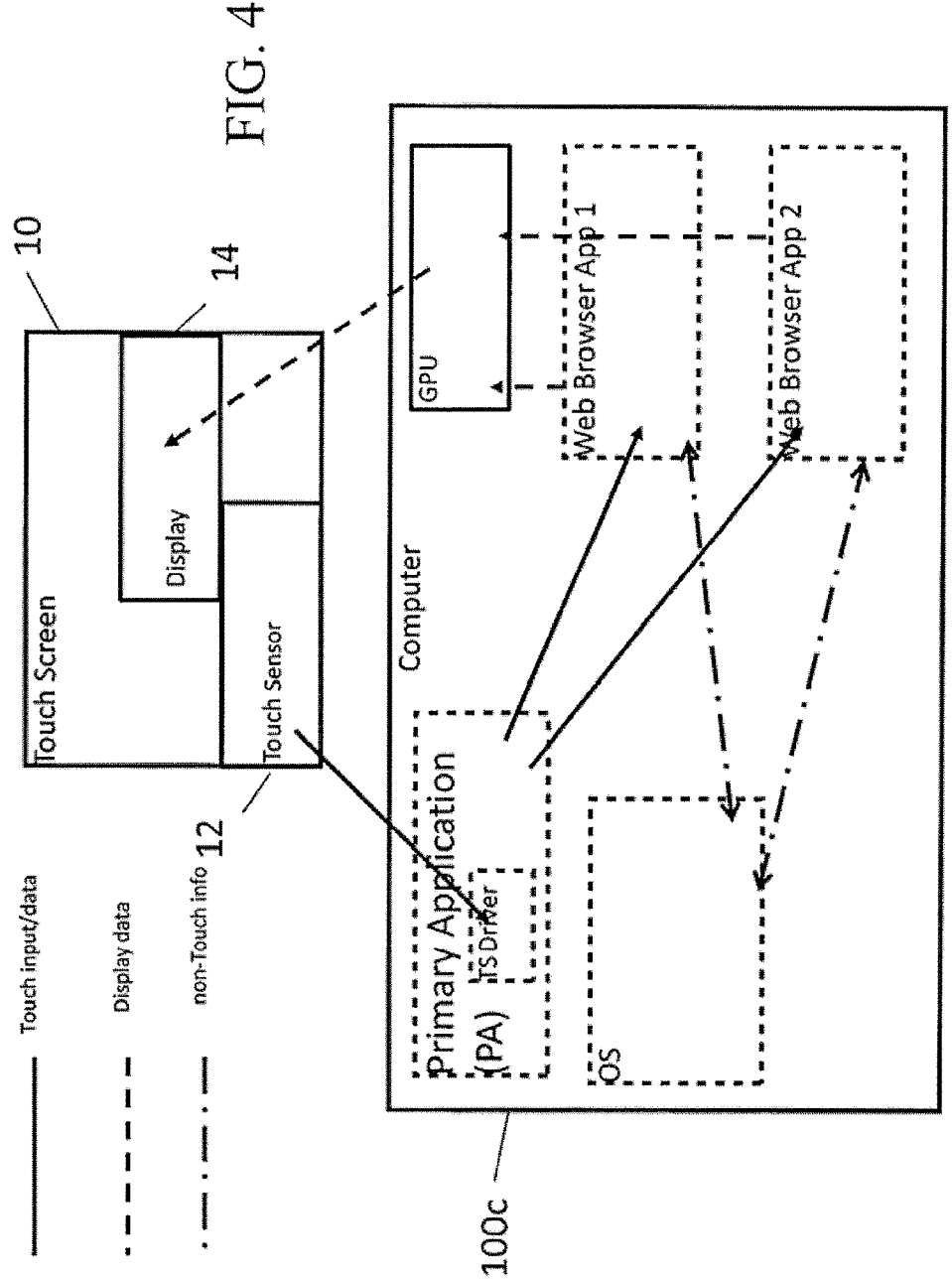
Figure 5:
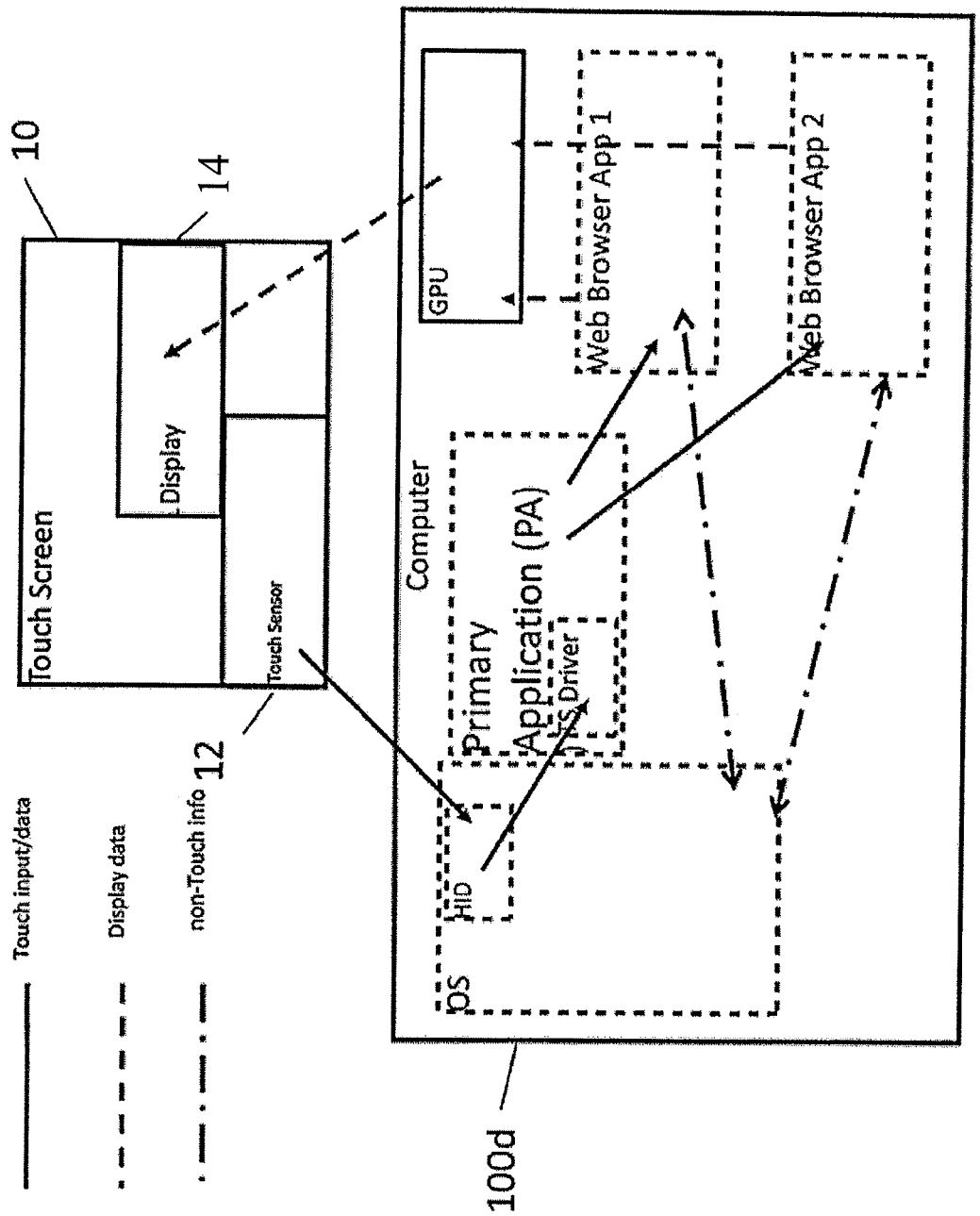

In FIGS. 3 to 5, the PA, rather than the OS, supplies these touch inputs directly to the web browser application to launch multiple web browsers, as indicated by the solid line of the touch input path. With this method, web browser focus information does not need to be supplied to the OS, but just send the input to the appropriate web browser as the coordinates of each touch are determined by the PA. Separate virtual keyboards may be provided for each browser window (See FIG. 12), bypassing the system keyboard. If the OS system is not designed for touch or is placed in a mode to bypass the virtual keyboard, then physical keystrokes are still sent to the system keyboard and the system keyboard sends this information to the text entry field highlighted.

The html code associated with the web browser still runs in conjunction with the OS of the computer, as the html code typically needs to access many OS functions, as indicated by the dash-dot line of the non-touch information path. Display data from the web browser applications is supplied to the display through the GPU, as indicated by the dashed line of the display data path.

Note that in the embodiments in FIGS. 3, 4, and 5, the touch input information is sent directly from the PA to the web browsers, without going through the OS (herein, "Touch Direct to Browser" method) even though the OS may be designed for a single application to be used a time, i.e. only one application to be in focus at a given time and the web browsers and associated downloaded html code may be designed to work with the single focus OS. This therefore allows multiple web browser windows to be in focus simultaneously with multiple associated downloaded html code running in these browser windows. Therefore, in this case a user can perform a continuous touch input in a first web browser window while another user can perform inputs in a second web browser window and these inputs in the second window can be processed without interrupted a continuous motion associated with the continuous touch input in the first web browser window.

As an example of this, the taps in the second window may be taps on a virtual keyboard. Also if there are multiple web browsers displayed, there may be virtual keyboards displayed. With the Touch Direct to Browser method, there is no need to use the system keyboard. The PA can generate the keyboard information directly and send this info directly in to the touch fields within the browser windows.

In order to avoid using the system keyboard, the system keyboard can be disabled. In this case to generate keyboard information for a browser window, the PA will first display the virtual keyboard. The PA may display a different virtual keyboard for each browser window or for other windows. The virtual keyboard for a given window can be triggered by a tap in specific text box regions. Alternatively, since the system keyboard may be disabled, there may be a need to generate a virtual keyboard to enter text in to a field within a window or within a browser window, in which the PA does not generate the virtual keyboard automatically. In this case, a keyboard icon or button can be placed near the associated browser window or in a tray (See FIG. 11). Tapping this icon can then generate a virtual keyboard (See FIG. 12).

Figure 6:
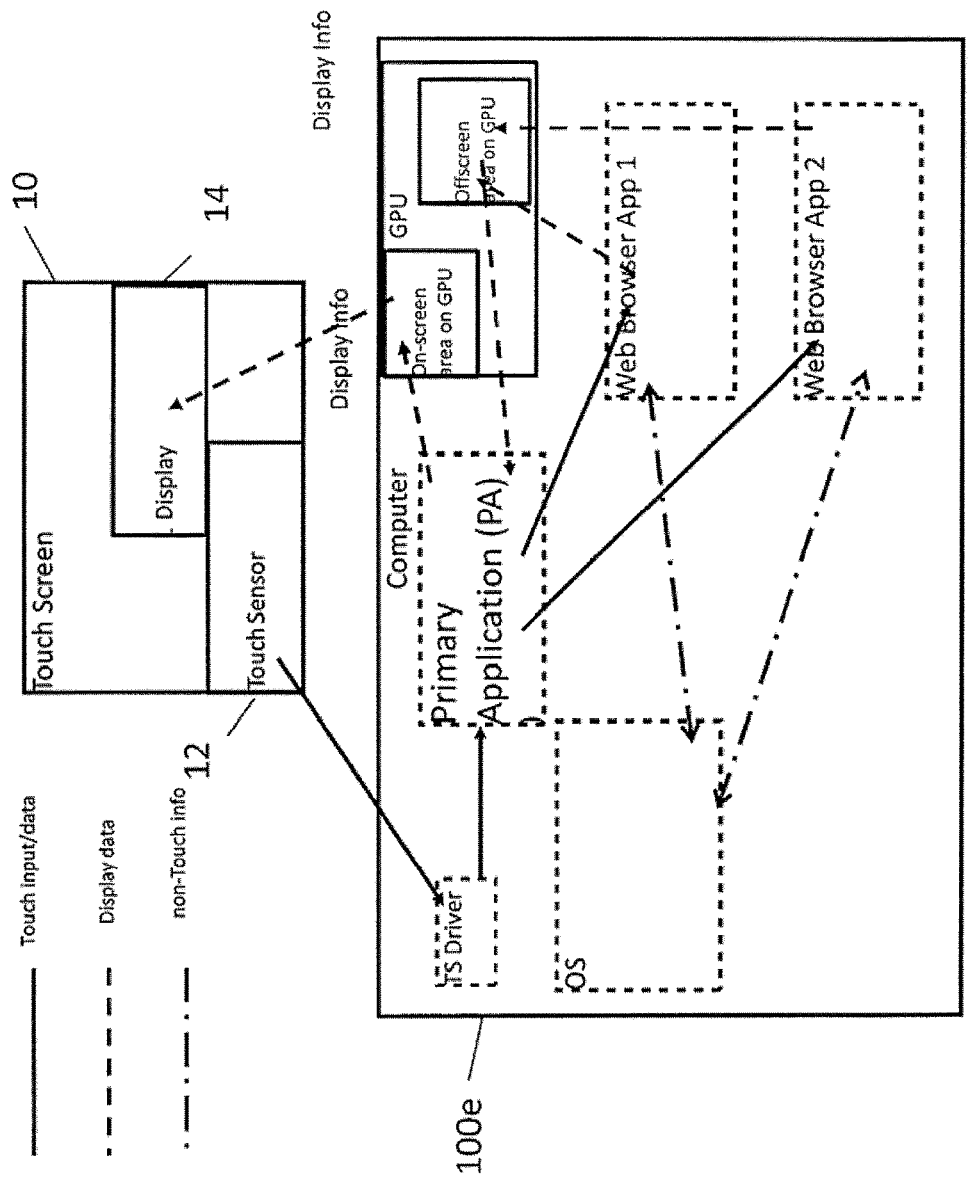

As shown in FIG. 6, video copying may be included in conjunction with the embodiments shown in FIGS. 3, 4 and 5 (Touch Direct to Browser). Video copying may include three different types, depending on the issues: a video copy of (1) the display data (onscreen), (2) a hidden layer, and (3) an offscreen area. The issues that this Video Copying addresses include rotation, resolution, dynamic resizing, and tossing from one touch screen to a second display. For a description of tossing, see U.S. Pat. No. 8,522,513, which is hereby incorporated by reference in its entirety. This second display may be another touch screen or a non-touch display, and may be oriented in another direction and/or may have a lower resolution than the display. The second display may be operating in mirror mode, described in detail below, starting with FIG. 31, in which the display on the touchscreen display mirrors that of the second display or may be wirelessly connected to or otherwise on the same network as the computer. In the mirror mode, only rotation and resolution are issues, and resolution is only an issue in the mirror mode.

The second display that is not operating in the mirror mode, may have issues with tossing an item onto the display, dynamic resizing, and rotation (if the connection is established through a different application than the PA). When viewing a web browser, rotation and dynamic resizing may be issues.

When a video copy is used, the PA grabs a copy of the image from a first region of the GPU, e.g., in a first frame buffer for the original image and a second frame buffer for the copied image. The GPU (or the Central Processing Unit (CPU)) then may perform additional processing on the image stored in the second frame buffer. When onscreen video copy is used, the first region of the GPU is a frame buffer or portion thereof that corresponds to a region that is displayed on the touch screen. For hidden layer video copying, the first region of the GPU corresponds to a layer located on the touch screen, but beneath the visible layer, so that it is not visible to the user. For offscreen video copying, the first region is located in a region of the GPU that does not correspond to any region displayed on the touch screen Hidden layer and offscreen video copying allows resolution in mirror mode to be different between the second display and the display, i.e., may be higher on the display than on the second display as described in mirror mode provisional patent. All 3 video copying methods can be used to mirror portions of the primary display on to the secondary display. When web browsers are displayed and required to be rotated, hidden layer and offscreen video copying can be used to correct issues that can be caused by rotated web browser windows. Also for web browsers, in order to enable web browser resolution on the secondary screen to be larger than on the primary screen, hidden layer or offscreen video copying may be used. When performing dynamic resizing for web browser, without causing the web browser to re-run its code for a different window size, thereby causing discontinuous resizing, offscreen or hidden layer video copying may be used. Hidden layer or offscreen video copying may also be used to allow tossing of a web browser or a mobile device window (window displaying the contents of a mobile device) or a video from a primary display to a secondary screen. Without such offscreen or hidden layer video copying, tossing would involve issues such as the session within the window would be killed and would need to restarted on the secondary display. Once the video copying is complete, this processed image is sent back to the PA, which sends it back to the screen region of the GPU to be output to the display.

By way of summation of the above embodiments, these involve running a primary application to handle other, secondary application and touch inputs on a single computer with an OS. Upon launch, the primary application takes over the entire screen of the display. The primary application then starts up the other applications and has them run on invisible windows, i.e., either hidden or off screen windows. For example, a hidden window can be run on a layer underneath the primary application. Each window may be for a different application or may be for each launch of the same application.

Then the primary application copies data for the invisible window into a window that the primary application controls. The primary application can take touch or gesture inputs from the TS drivers and direct the inputs to the appropriate application. For example, suppose that two secondary applications, e.g., two web browser shown above or Power Point and a web browser, are to be displayed at the same time. The goal is to run Power Point within a window in one section of the display, while, at the same time, run a web browser within a different window on a different section of the display. The primary application can have multiple windows in focus at the same time, even though the OS may be designed to only allow a single application to be in focus at one time. If an input is detected adjacent the Power Point window, this information will be sent to the TS Driver. The primary application will intercept this information before it is directed to the OS, if at all. The primary application will detect the location of the input and therefore direct this touch information to the Power Point application running within the invisible window. The Power Point application will then change the graphical information displayed within the invisible window in response to that information. Then, the primary application will copy the new display information into the visible window running within the primary application.

When it is desirable to have one of the secondary applications be displayed as if it is taking over the entire screen of the display, e.g., when running Power Point in presentation mode or using a "Full Screen" option available in some web browsers. This may not be possible when running a PA that is in focus.

Figure 7A:
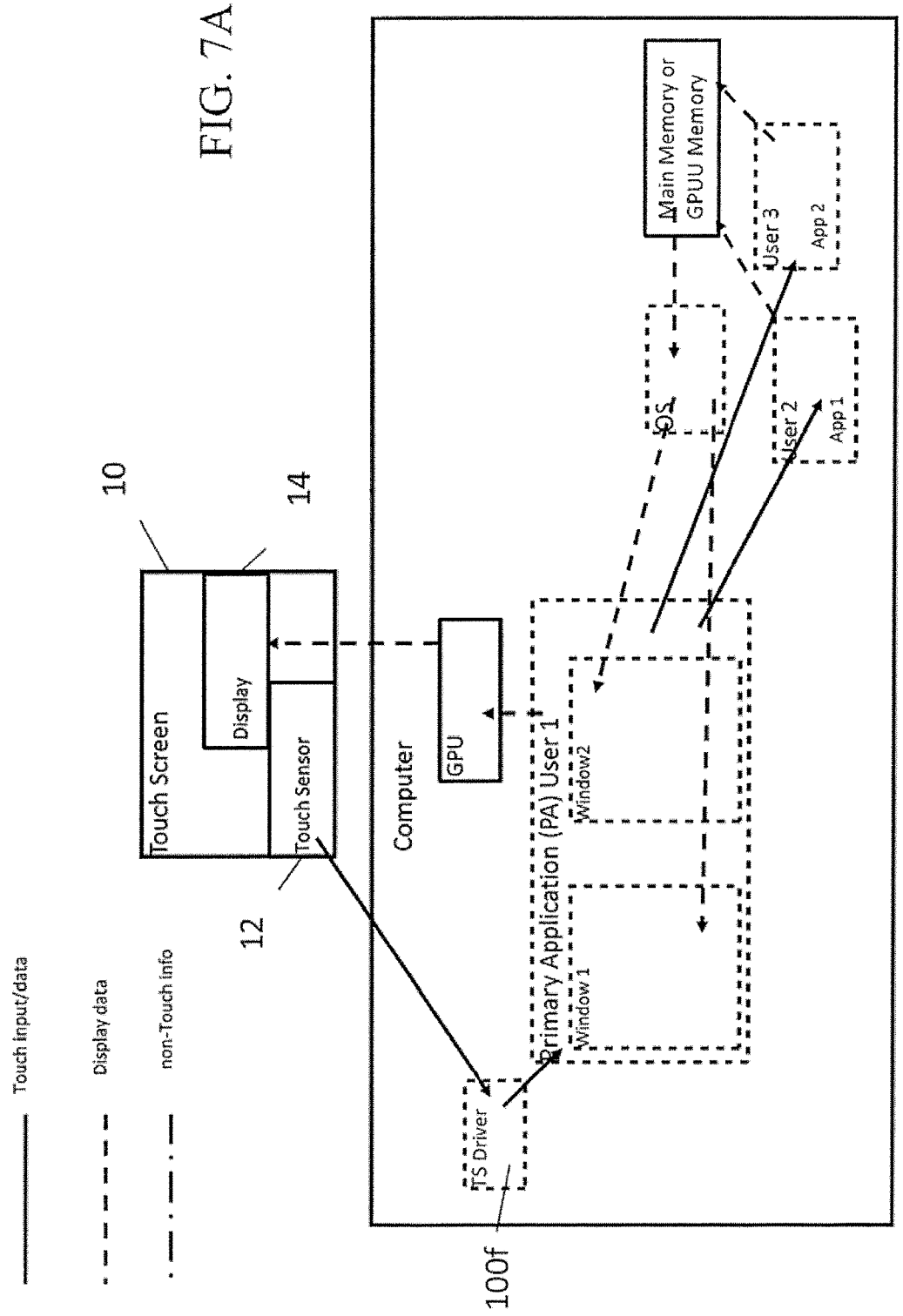

In this case, a second method may be used that employs multiple logins, rather than a single login of the above first method, as illustrated in FIG. 7A. When the primary application initially starts up, it starts up under a particular user account (user 1). Then, a second user account is used to open a new desktop or Window using the OS (associated with a second user login, a first virtual user) through a main memory or GPUU memory of a computer 100*f*. A secondary application may then be opened within this second user's account. The secondary application may then be instructed to display over the entire screen of the second user's desktop or window 2. Additional accounts, e.g., a third user that is a second virtual user, may be employed.

For example, if the secondary application is Power Point, then Power Point can be directed to run in presentation mode and it would take over the full screen of the second user's account, without affecting the screen of the first user. The primary application can be in focus in the first user's account. In this case, the primary application takes over the full screen of the first user's account and displays a window for the secondary application (e.g. Power Point) within a window within the PA just as described above, except that when the PA receives input information from the TS drivers, it will direct this input to the secondary application, e.g., Power Point, running in an invisible window in the second user's account. The virtual screen of the second user's account is then updated.

Another embodiment is illustrated in FIG. 7B, in which secondary applications with different logins are running on different computers, i.e., computer 100*g* and computer 102. This third method is the same as the second method, except that a second computer 102 is used. The PA runs on a first computer 100*g* within a first user's account, while the secondary application runs on the second computer 102. The second computer will have a login for a second user and run within a second user's account on the second computer. The touch sensor is connected to the first computer 100*g*. The touch sensor's inputs are connected to the first computer 100*g* and the video output of the first computer 100*g* is connected to the display.

The secondary applications running on the second computer 102 receives touch information from the PA running on the first computer 100*g*. The PA still copies the graphical display information from the second computer 102 to the appropriate window running within the PA on the first computer 100*g*. This third method allows secondary applications designed for different Operating Systems to be run simultaneously on one display touch screen.

For example a first secondary application may be an application designed to run on a version of Windows OS and a second secondary application may be designed to run on a version of MAC or Android OS. One of these OS systems may be running on one computer and a second OS can be running on the other computer. An alternative would be to set-up a Virtual Machine (VM) that would act as a second computer on the first computer.

According to any of the above, once the information is copied by the primary application, the information can then be manipulated by the GPU (or CPU) for display. Thus, a multiple GUI may be realized even if the OS and the secondary applications are designed for a single GUI.

FIGS. 8 to 27 illustrate views of a screen operating as outlined above in FIGS. 2 to 7. As shown in the following drawings figures, a display includes a display tray, e.g., at a bottom thereof, and a display region or canvas that covers the majority of the display. The display tray may include one or two application regions, e.g., on opposite sides of the display, in which available application icons are present, a devices region, in which other devices, e.g., mobile devices, that are connected to a network associated with the display computer (see FIG. 21) are present, and a media region, in which media images, e.g., an image or video, stored on the display computer (see FIGS. 9-11 and 18-24) or on a device connected to the display computer are present. The application icons may include a markup icon, a notes icon, and a web icon.

Figure 8:
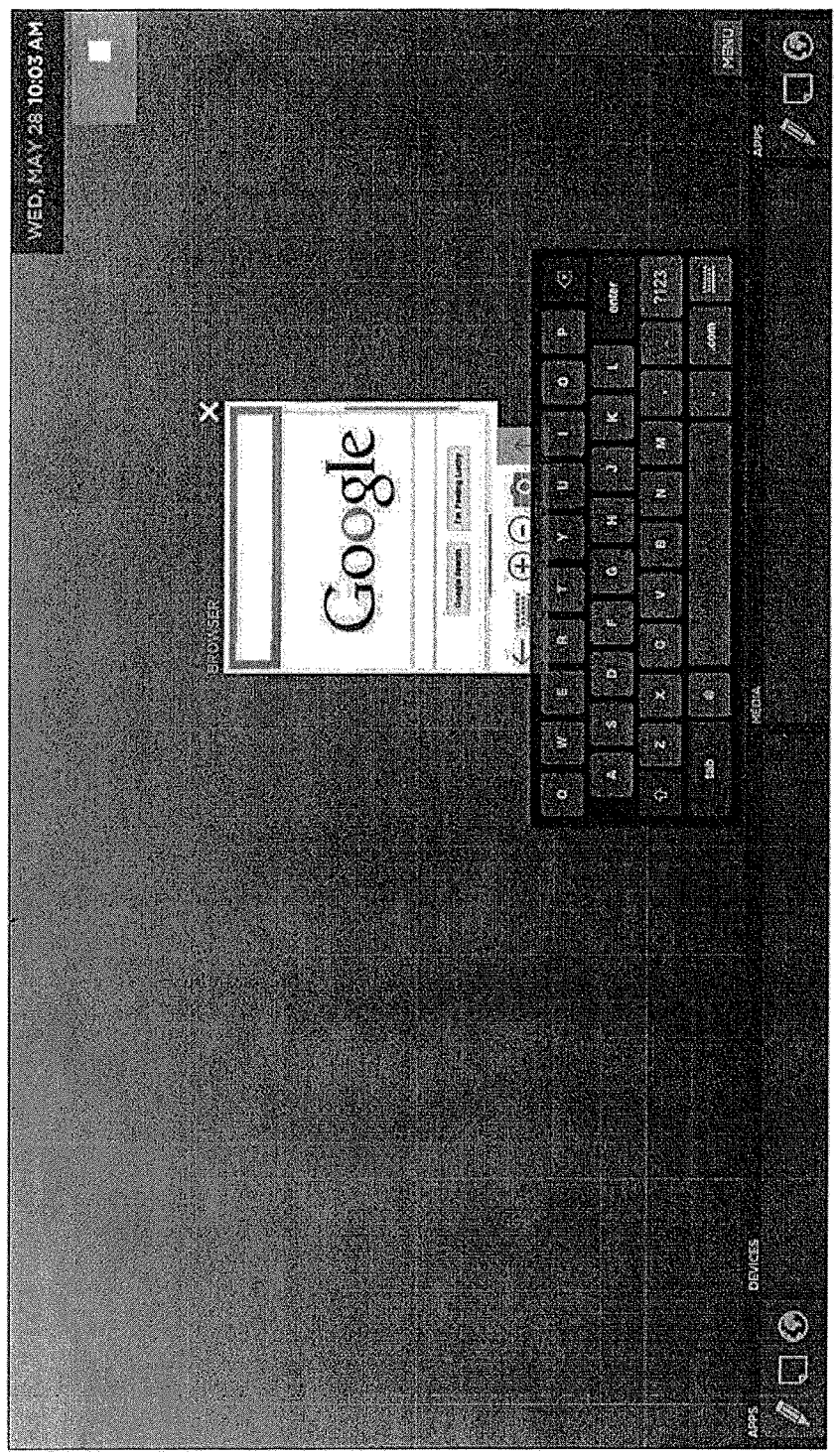
FIGS. 8 to 26 illustrate screen shots of a system according to embodiments.

In FIG. 8, when a user drags the web icon onto the display regions, a browser window opens wherever the web icon was dragged. At first, only the browser window would be open, i.e., a window tray and a window keyboard shown in FIG. 8 would not be present, but the close button "x" and a window identifier, e.g., "browser", may be present, e.g., above the browser window. In this state, the browser window may be maneuvered in a numerous manners, e.g., the browser window may be pinched and zoomed, panned, moved around, and so forth. If a user taps on the browser window once, the window is considered to be in a "select" mode and the window tray appears. The window tray may include numerous icons, e.g., go backwards, keyboard, zoom in, zoom out, camera, hide, and so forth. Selecting the keyboard icon will make a window keyboard appear. Tapping on the window itself again would exit the "select" mode.

Once the window tray is present, the browser window is stuck at its current position and size. Now, however, pinch and zoom may be performed inside the browser window, e.g., pinching would result in the content getting smaller, but see more of the content in the browser window.

Figure 9A:
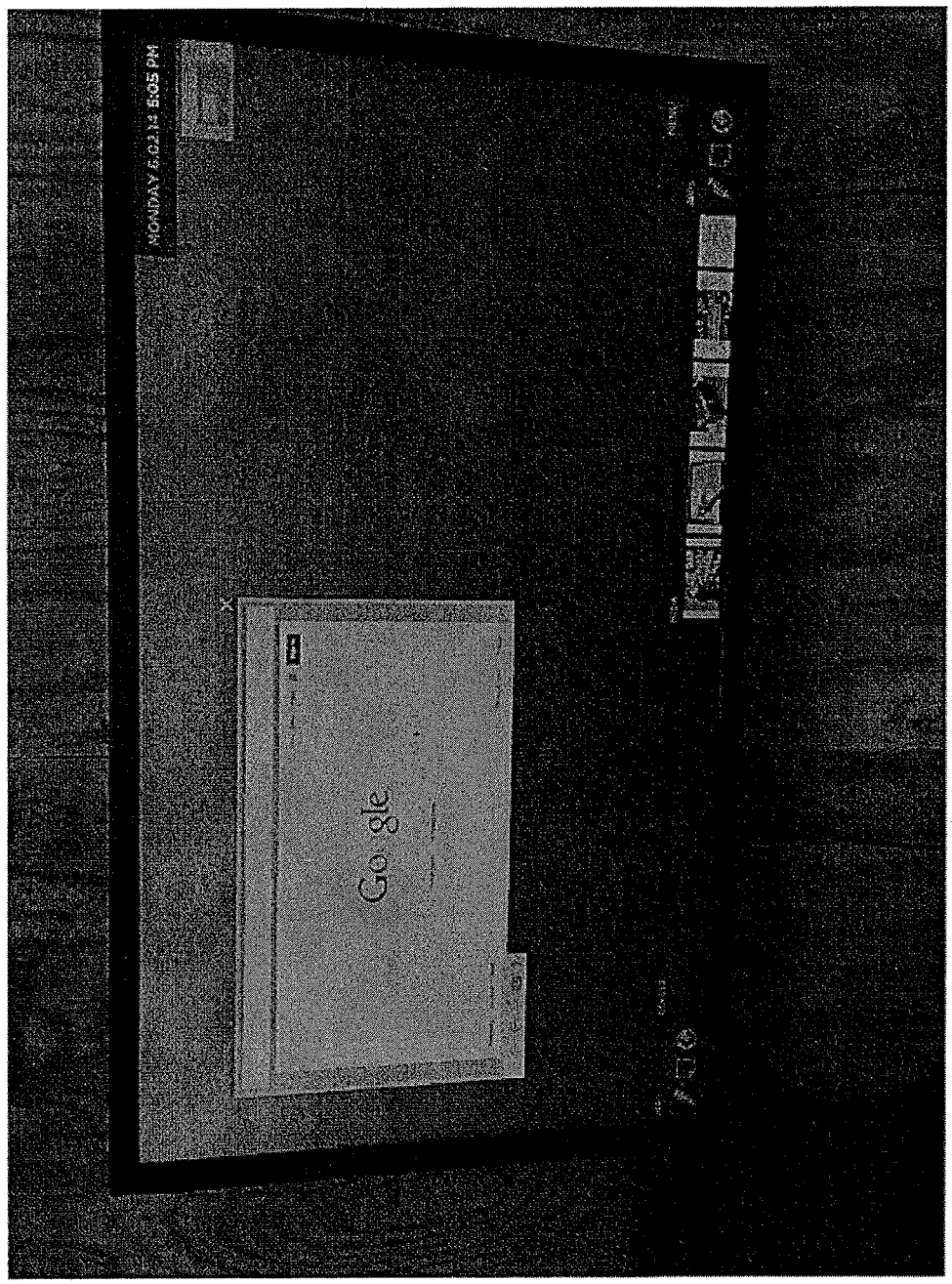
Figure 9B:
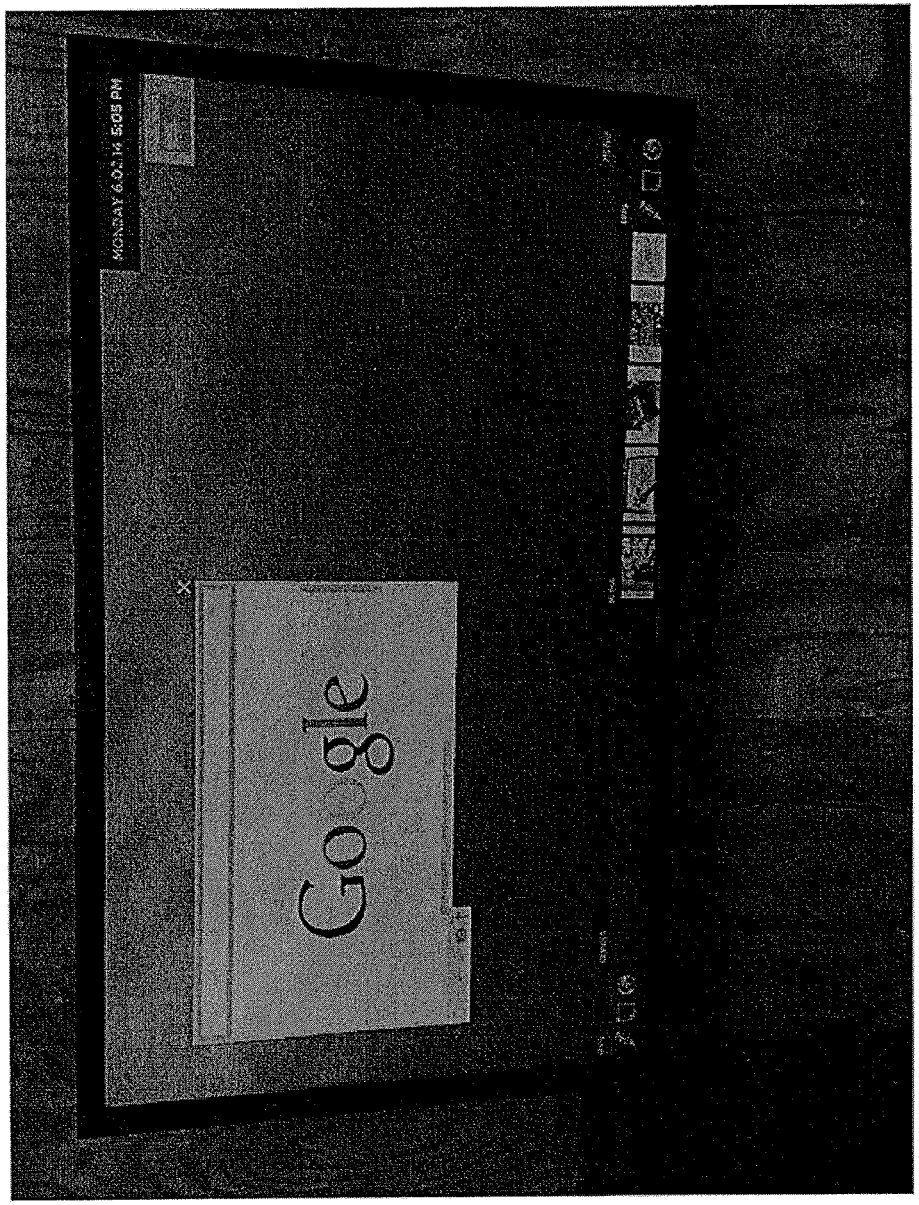
Figure 9C:
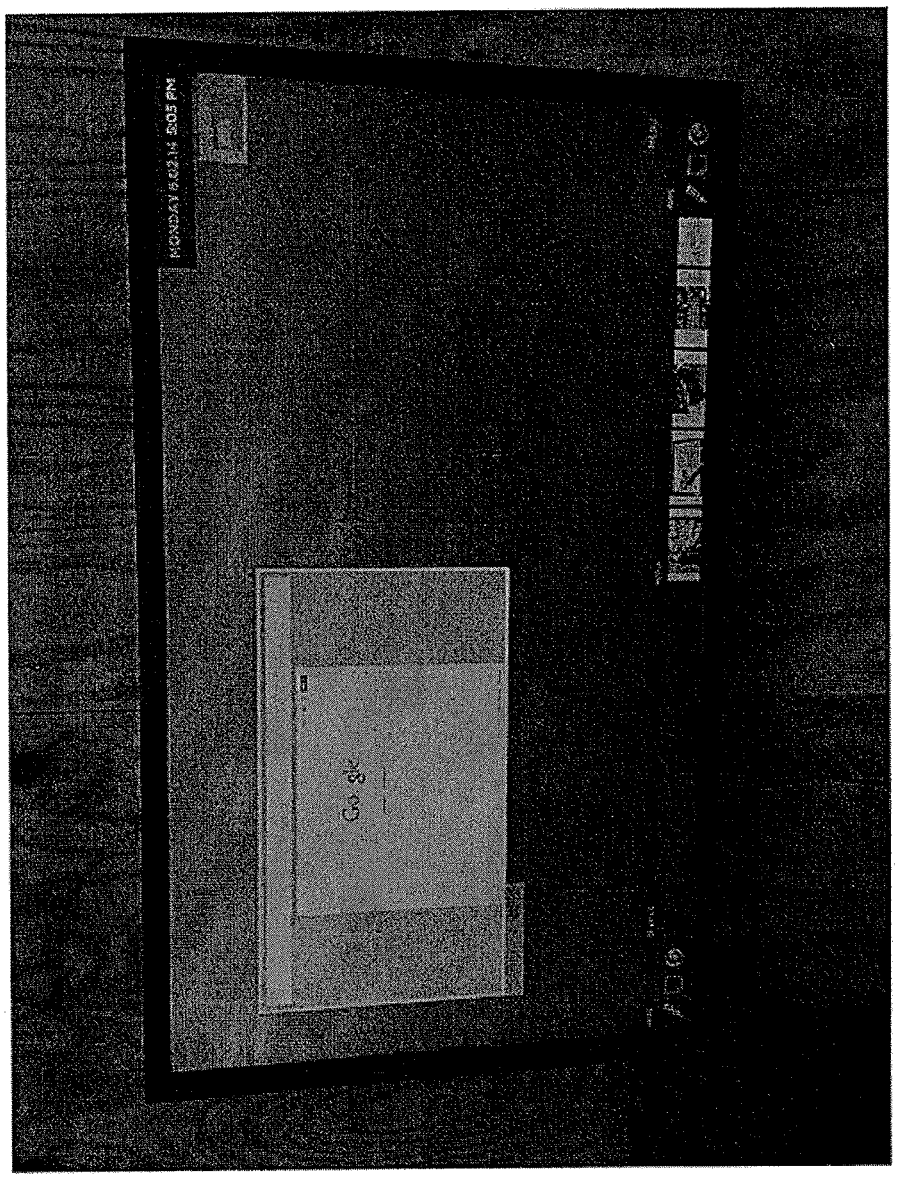

For example, as may be seen in FIGS. 9A and 9B, when the window tray is present, zooming inside the browser window will increase the size content while decreasing an amount of the content seen, without changing a size of the browser window. As may be seen in FIGS. 9A and 9C, when the window tray is present, pinching inside the browser window will decrease the size of the content while increasing an amount of the content seen, without changing a size of the browser window. As in this configuration, the resizing of the material in the window is performed by pinching and zooming, the window tray does not includes the plus and minus signs shown in the window tray in FIG. 8, but does also include a draw icon and an erase icon.

Figure 10A:
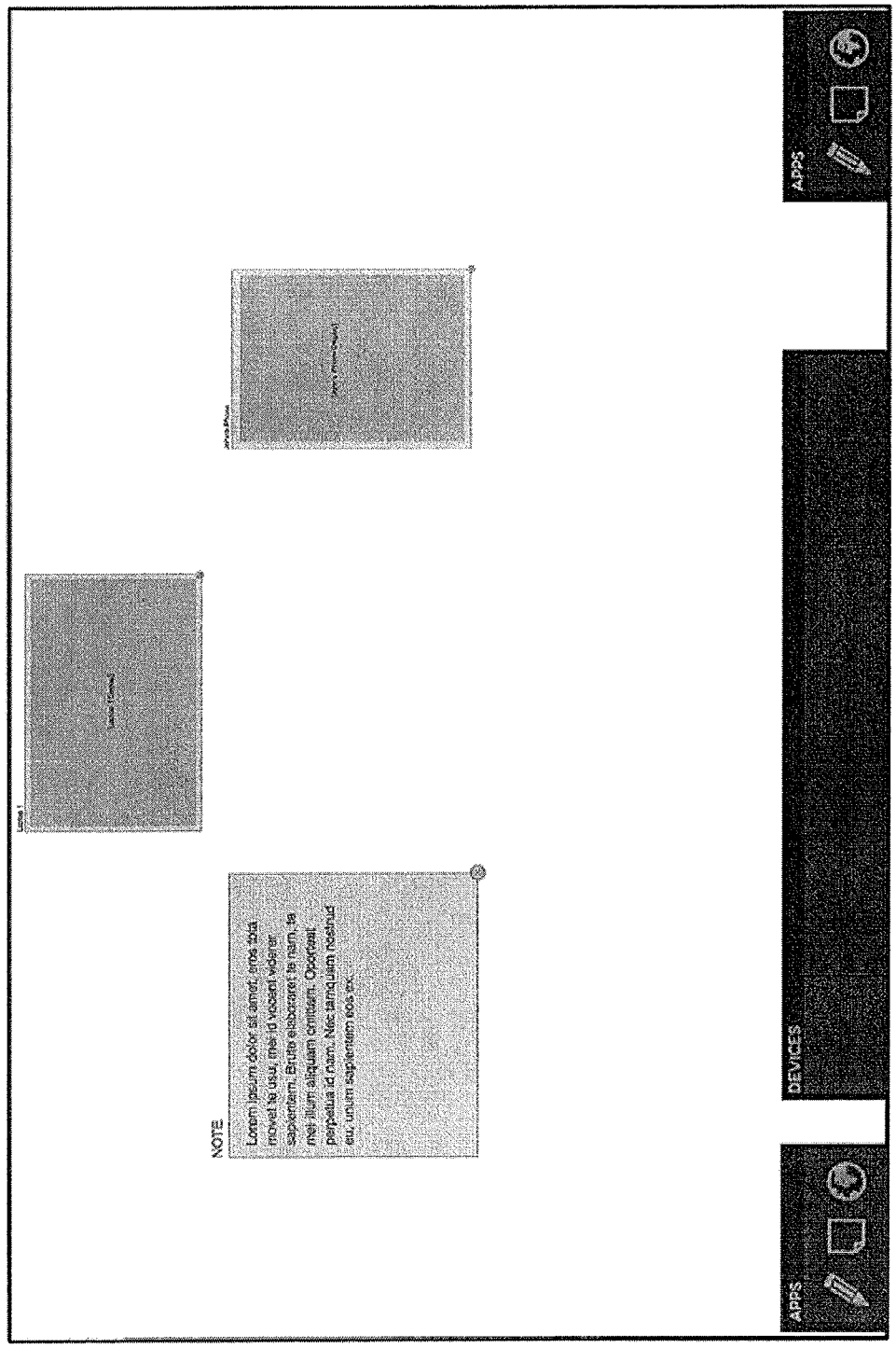
Figure 10B:
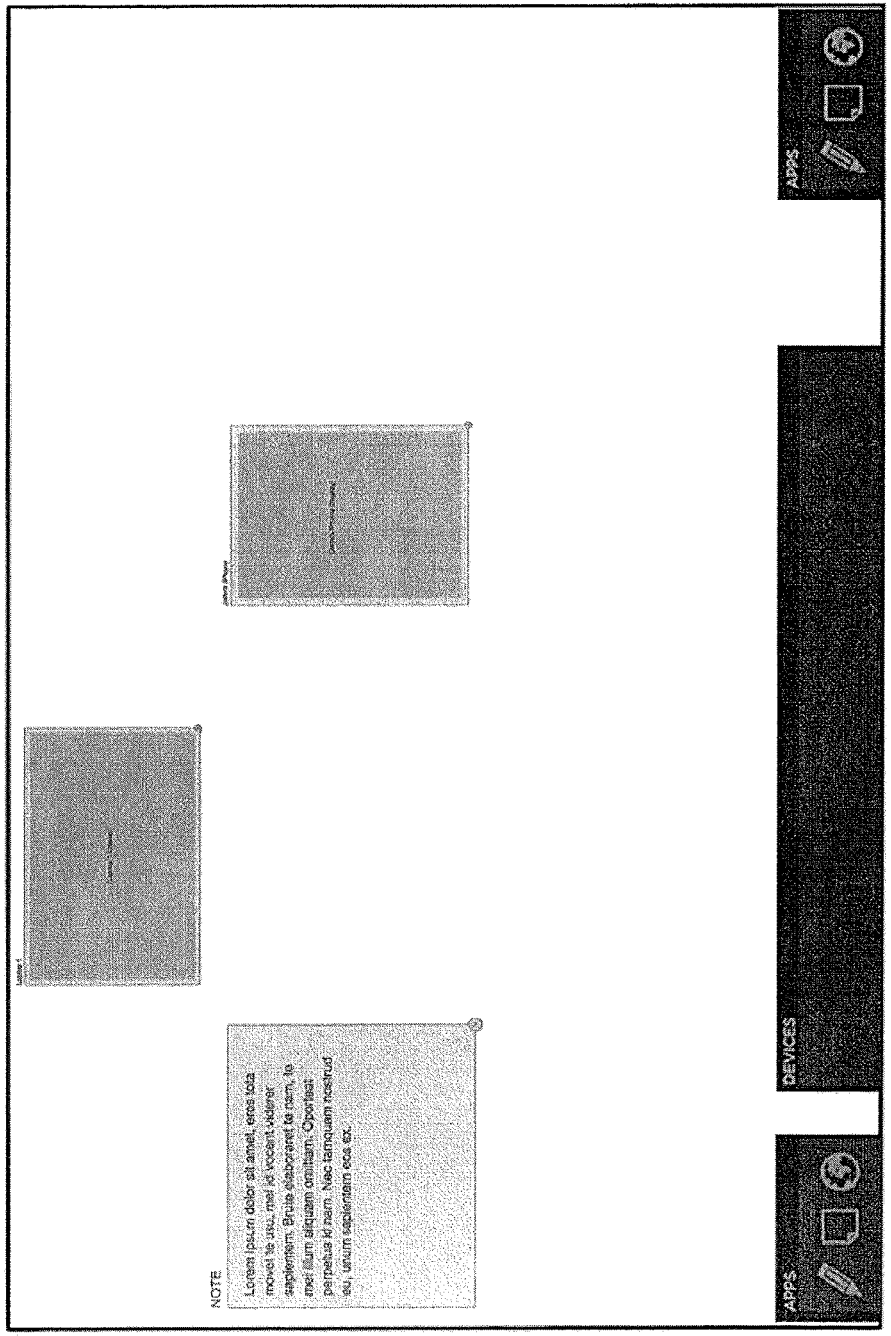
Figure 10C:
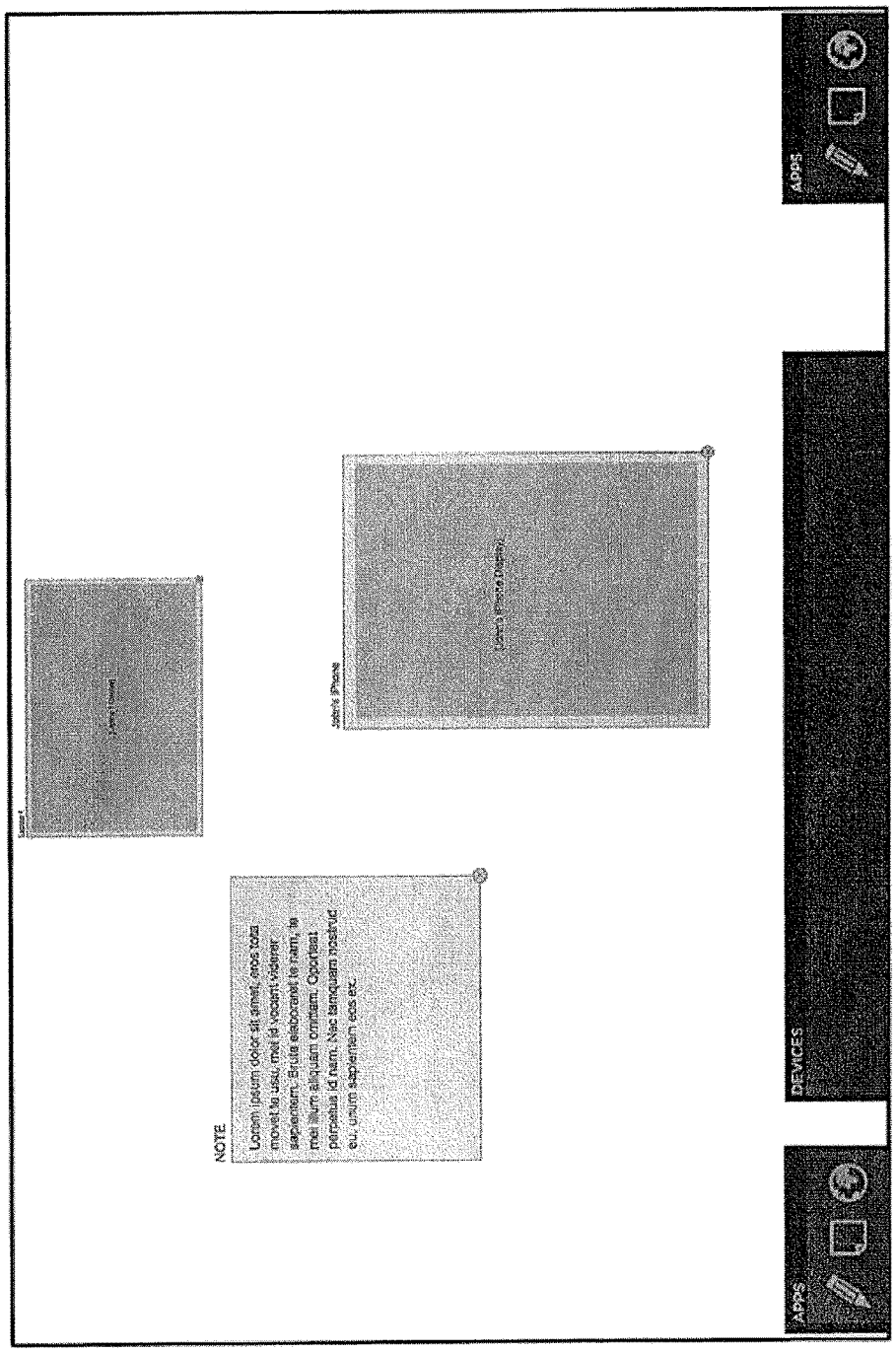
Figure 11A:
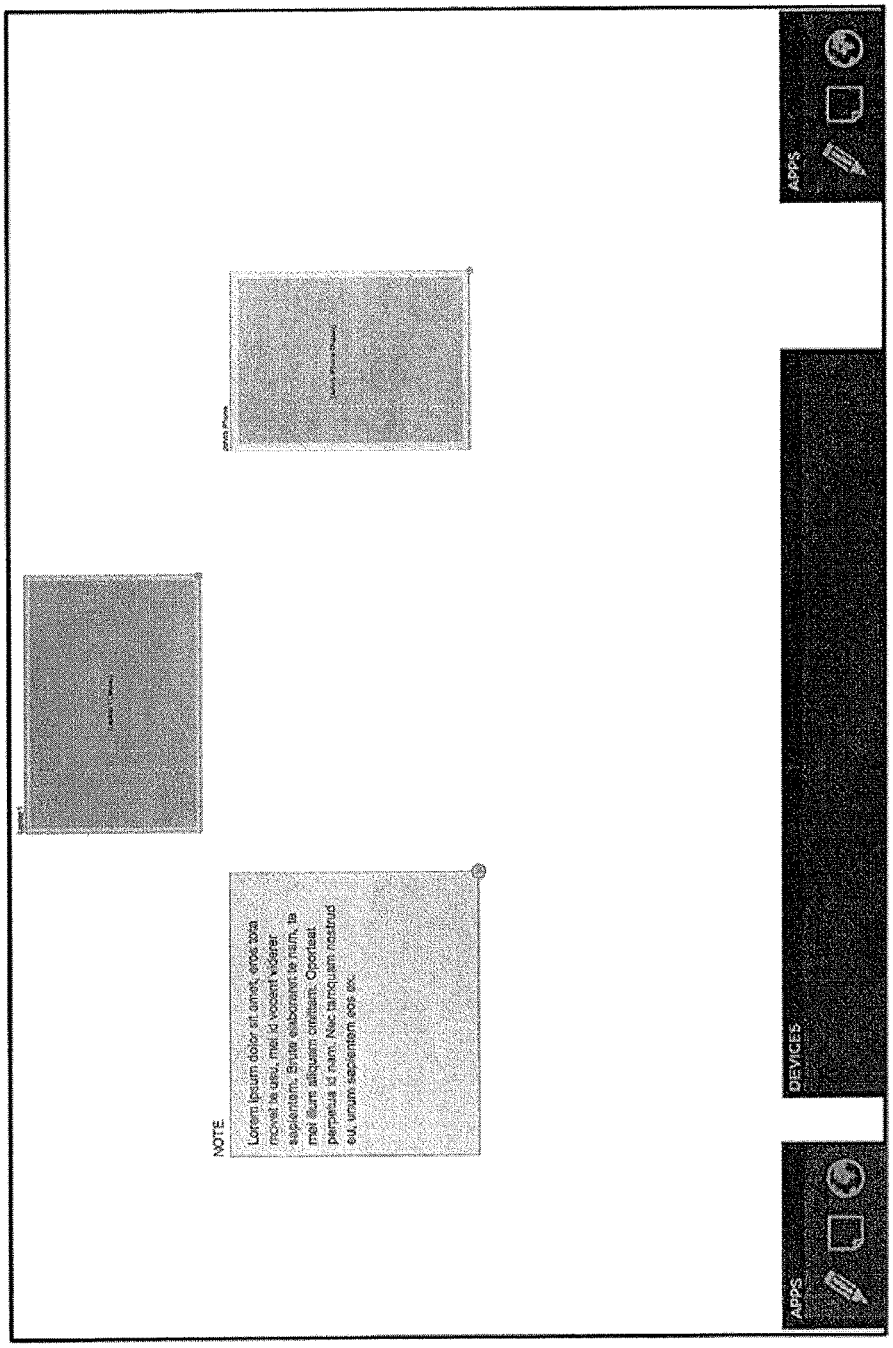
Figure 11B:
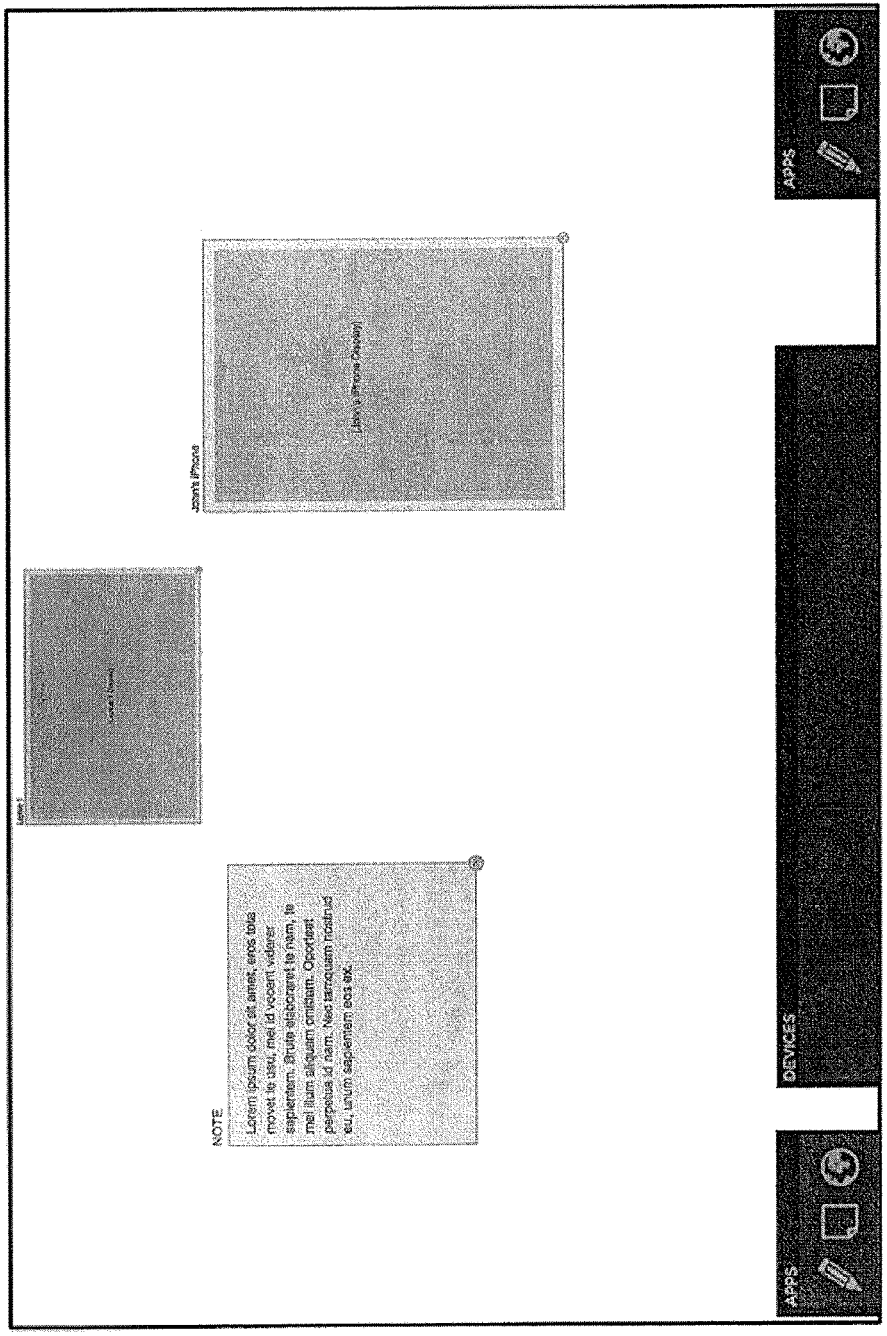

Similarly, FIGS. 10A and 10B illustrate when the entire canvas is panned, while FIGS. 10A and 10C illustrate when only one window is moved. FIGS. 11A and 11B illustrate the zoom of one window.

Thus, as described above with respect to FIGS. 8 to 11B, a same gesture may provide different maneuvers on the display. For example, if a gesture, e.g., pinch, zoom, pan, and so forth, is made outside of a particular window, the action associated with that gesture is applied to the entire canvas. If the same gesture is performed on a window that is not in "select" mode, the action associated with that gesture is applied to the window itself. If the same gesture is performed on a window that is in "select" mode, the action associated with that gesture is applied to content in the window.

Figure 12:
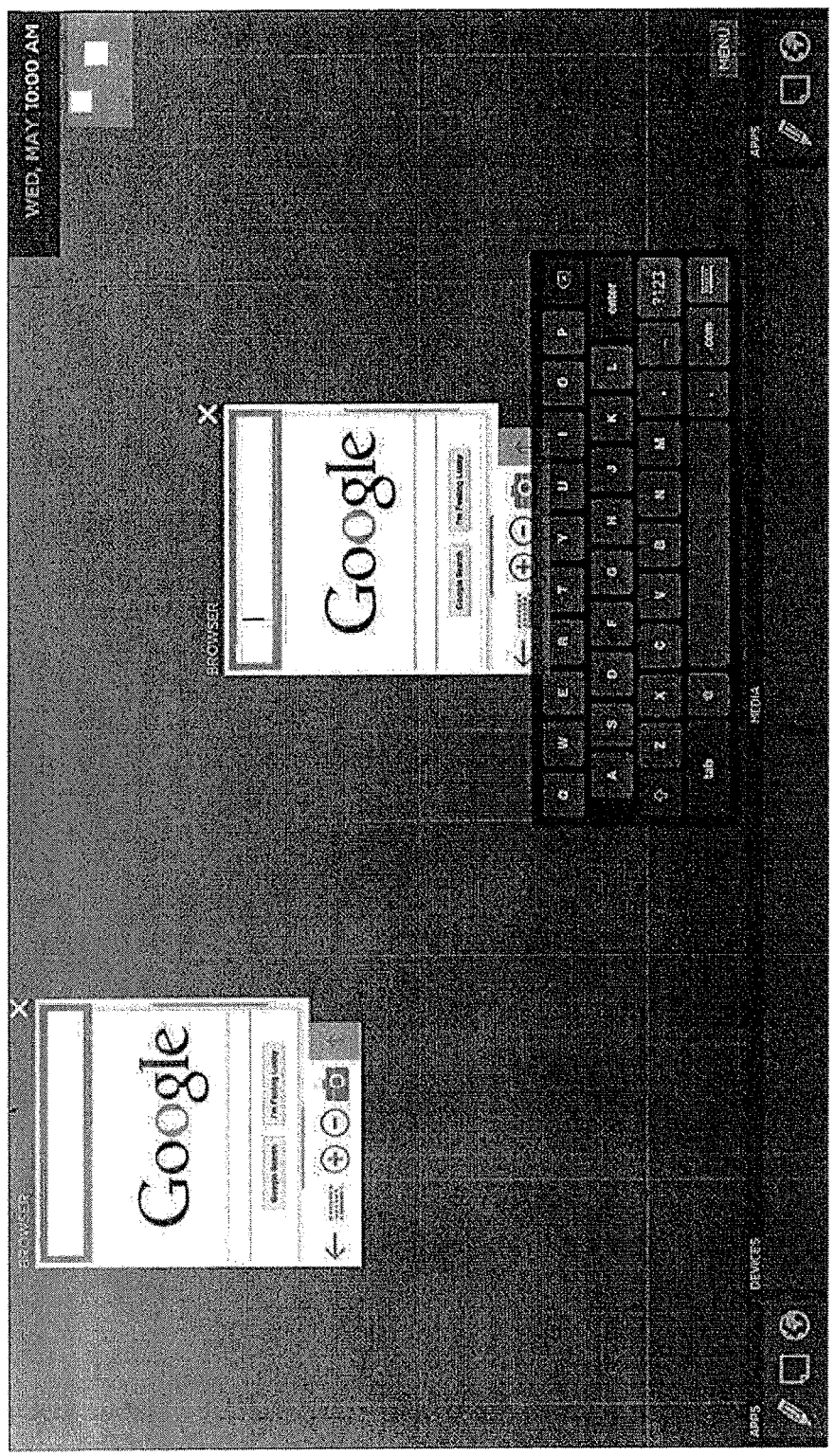
Figure 13:
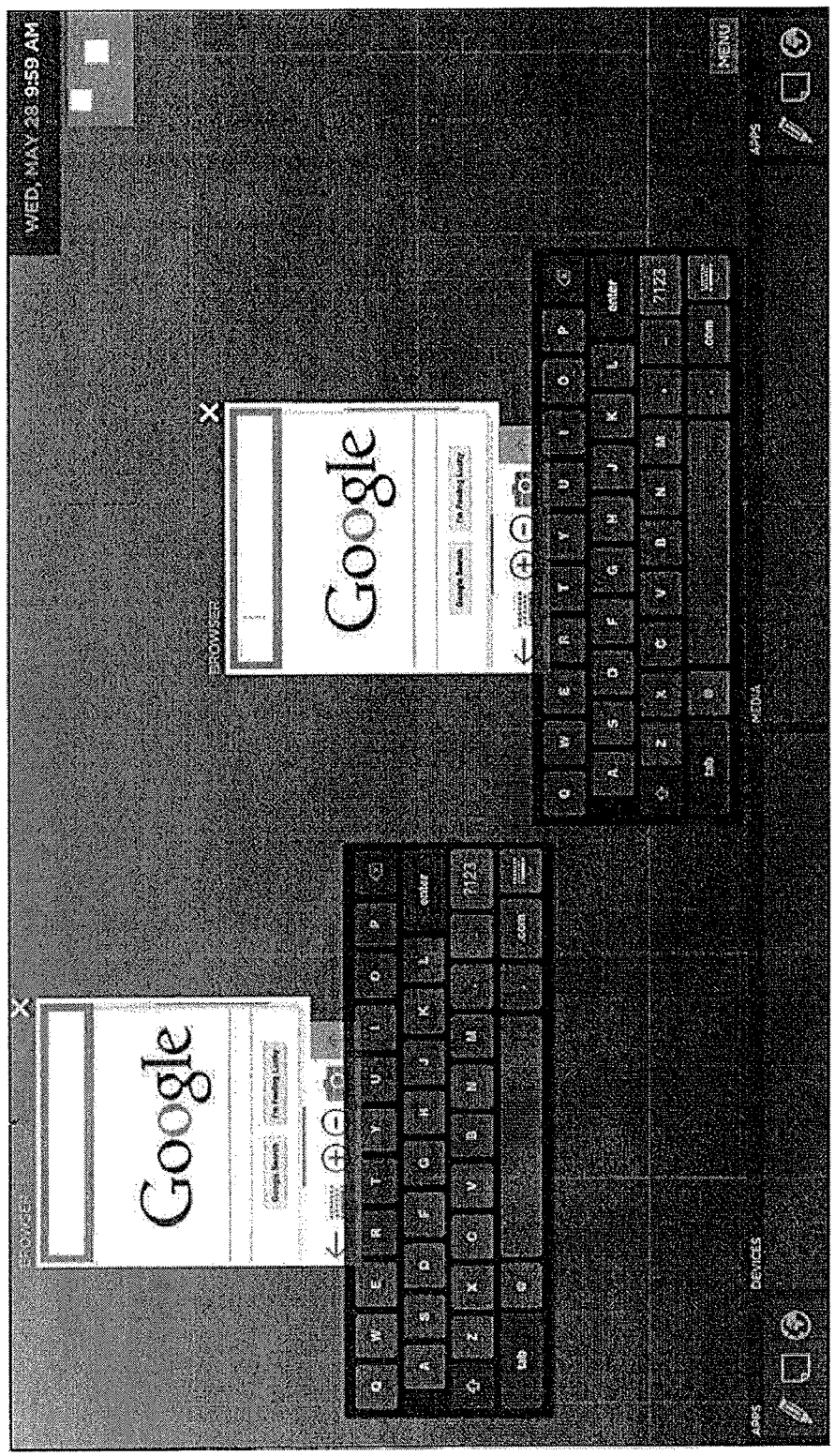

In FIGS. 12 and 13, when a user drags another web icon onto the display regions, another browser window opens wherever that web icon was dragged. As noted above, both the web browsers may used simultaneously, including uninterrupted clicks, resizing, drags, keyboard use, and so forth.

Figure 14:
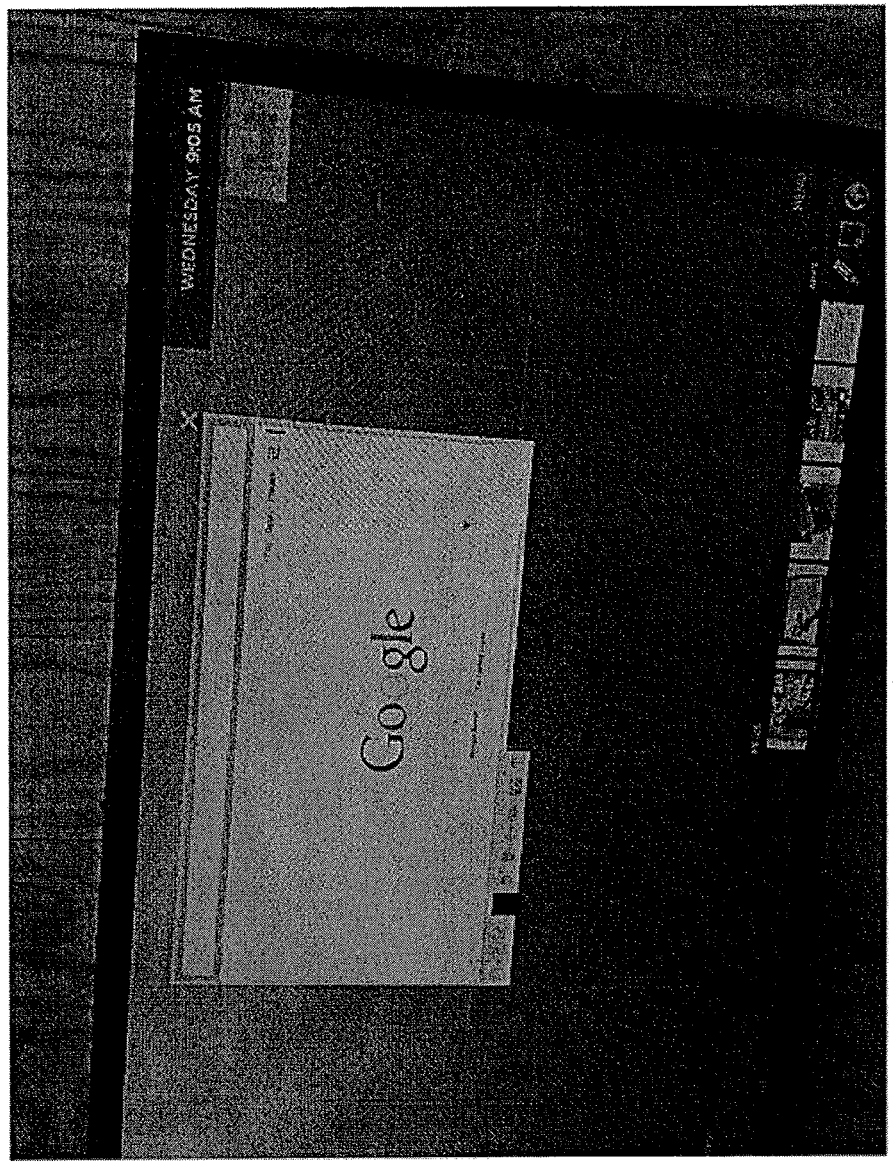

Another example of a window tray is illustrated in FIG. 14, in which the window tray for a browser window includes icons for hand gestures (drag (1 finger) or pinch and zoom (two fingers), draw (allows annotation), erase (an annotation), color selection for the draw, undo (last annotation), trash (undoes all annotations), back (goes to the previous URL), keyboard, camera (still image duplicate), and hide.

Figure 15:
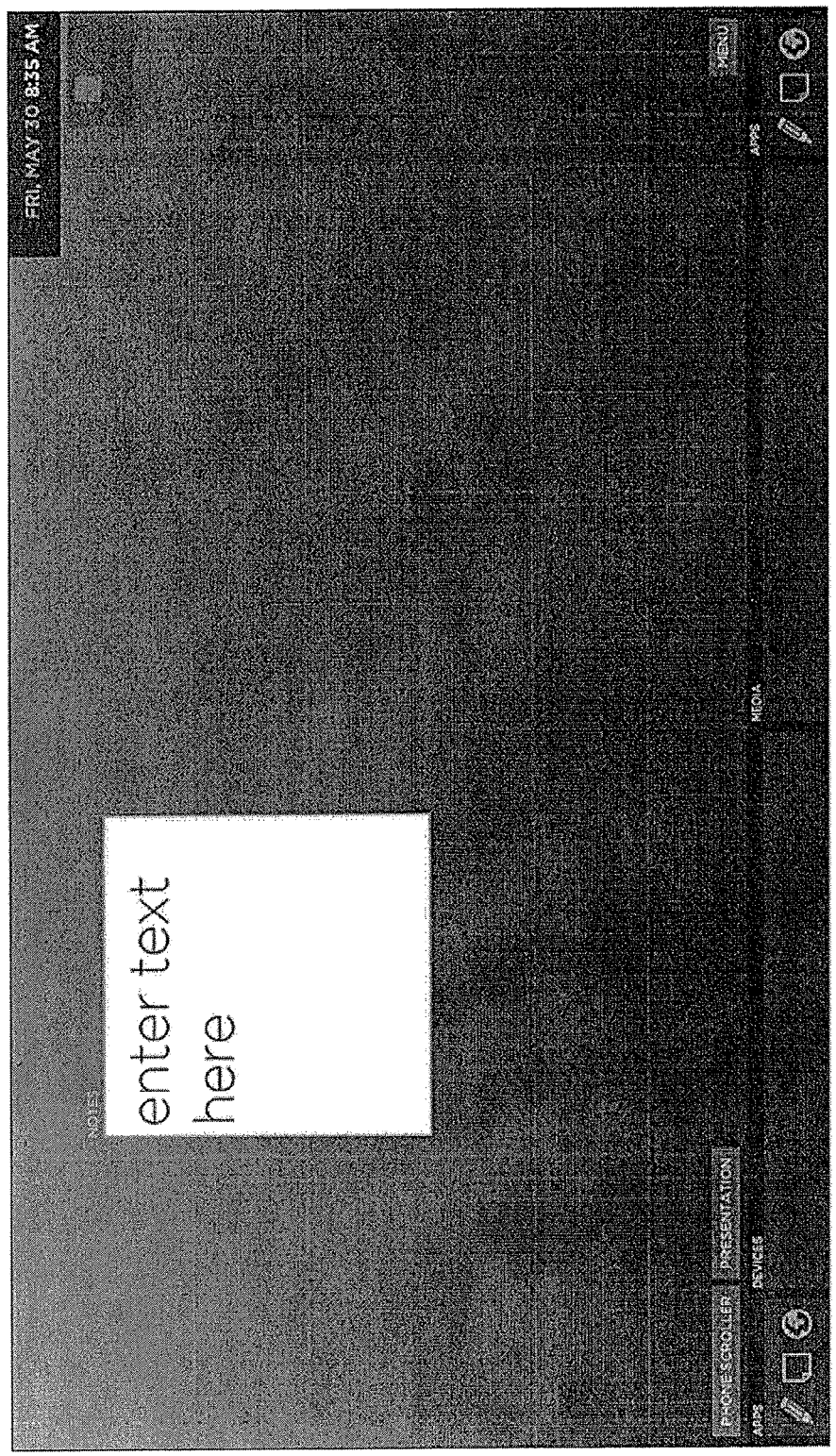
Figure 16:
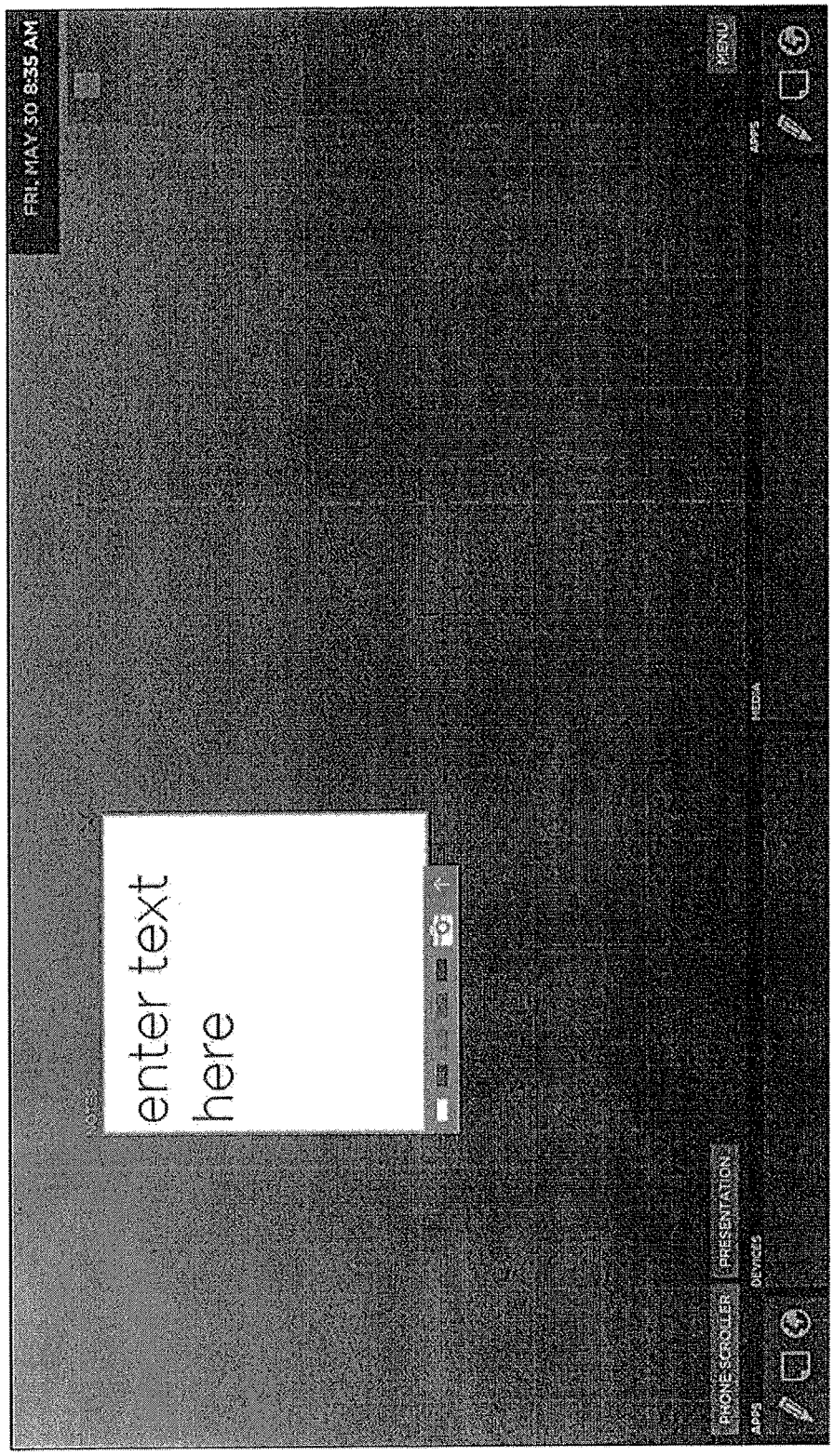
Figure 17:
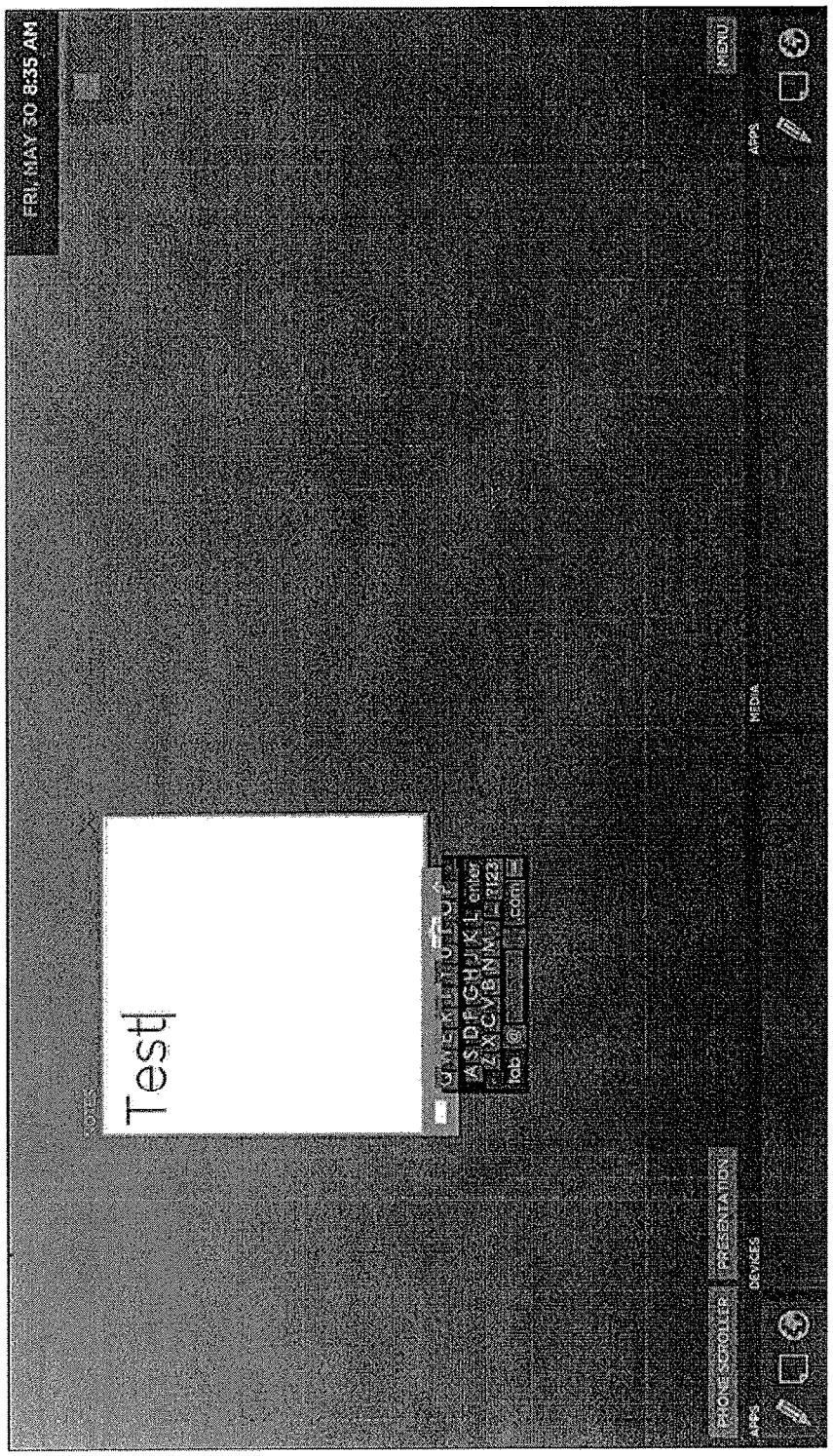

As shown in FIG. 15, when a notes icon is dragged onto the display region, a note window opens where the notes icon was dragged. The note window may include a window identifier, e.g., "notes", and a close icon "x", e.g., at an upper portion of the note window. Tapping on the note window will bring up a window tray, here with different color icons, a camera icon, and a hide icon, as shown in FIG. 16. As shown in FIG. 17, tapping the notes window again will bring up a window keyboard.

Figure 18:
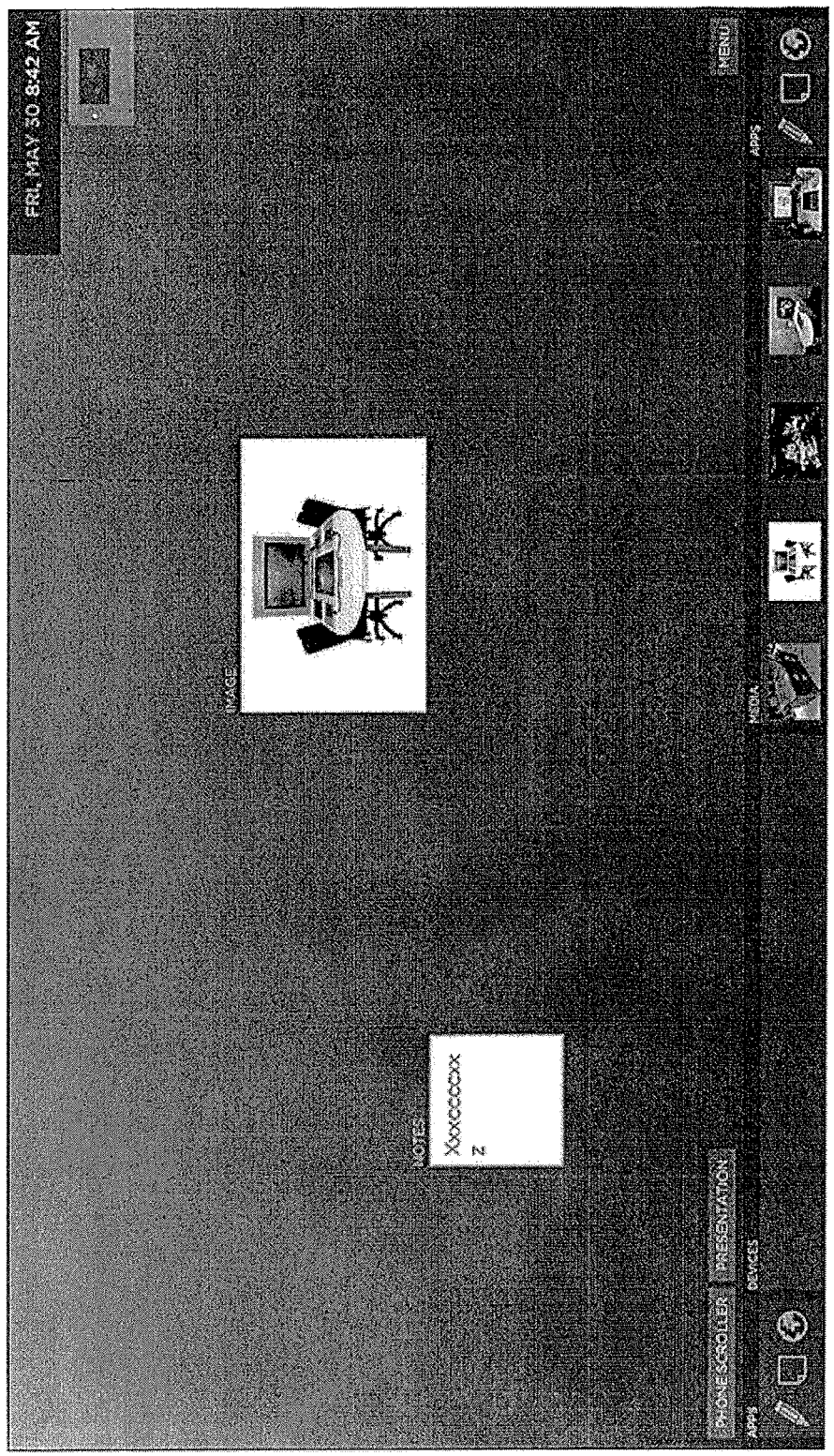
Figure 19:
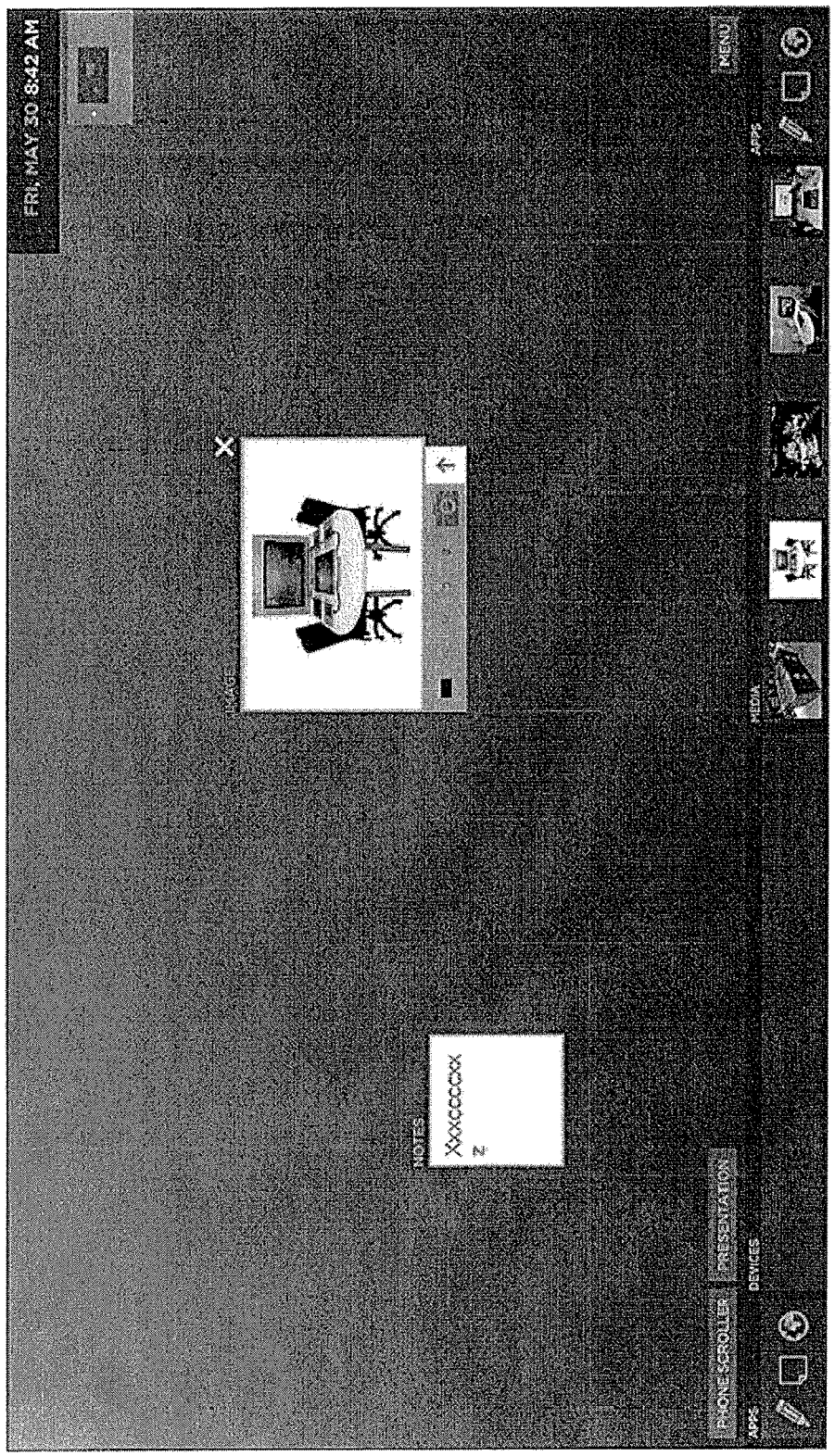

As shown in FIG. 18, an image from the media portion of the tray may be dragged onto display region to open a media window where the image was dragged. The media window may include an identifier, e.g., "image", for example, at an upper portion of the media window. As shown in FIG. 19, tapping on the media window will open a media tray, here with a color icon, a drawing icon, an erase icon, a rotate icon, a trash icon, a camera icon, and a hide icon.

Figure 20:
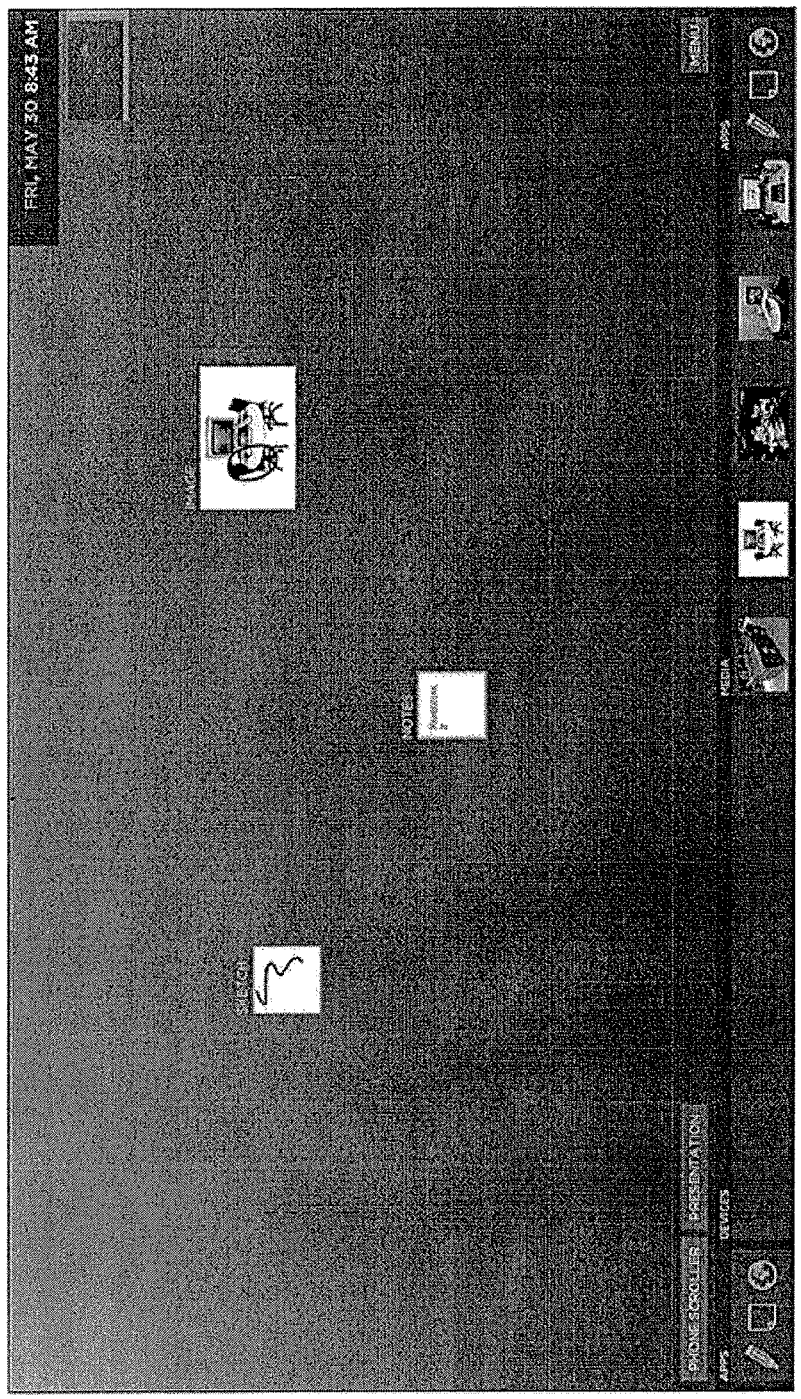
Figure 21:
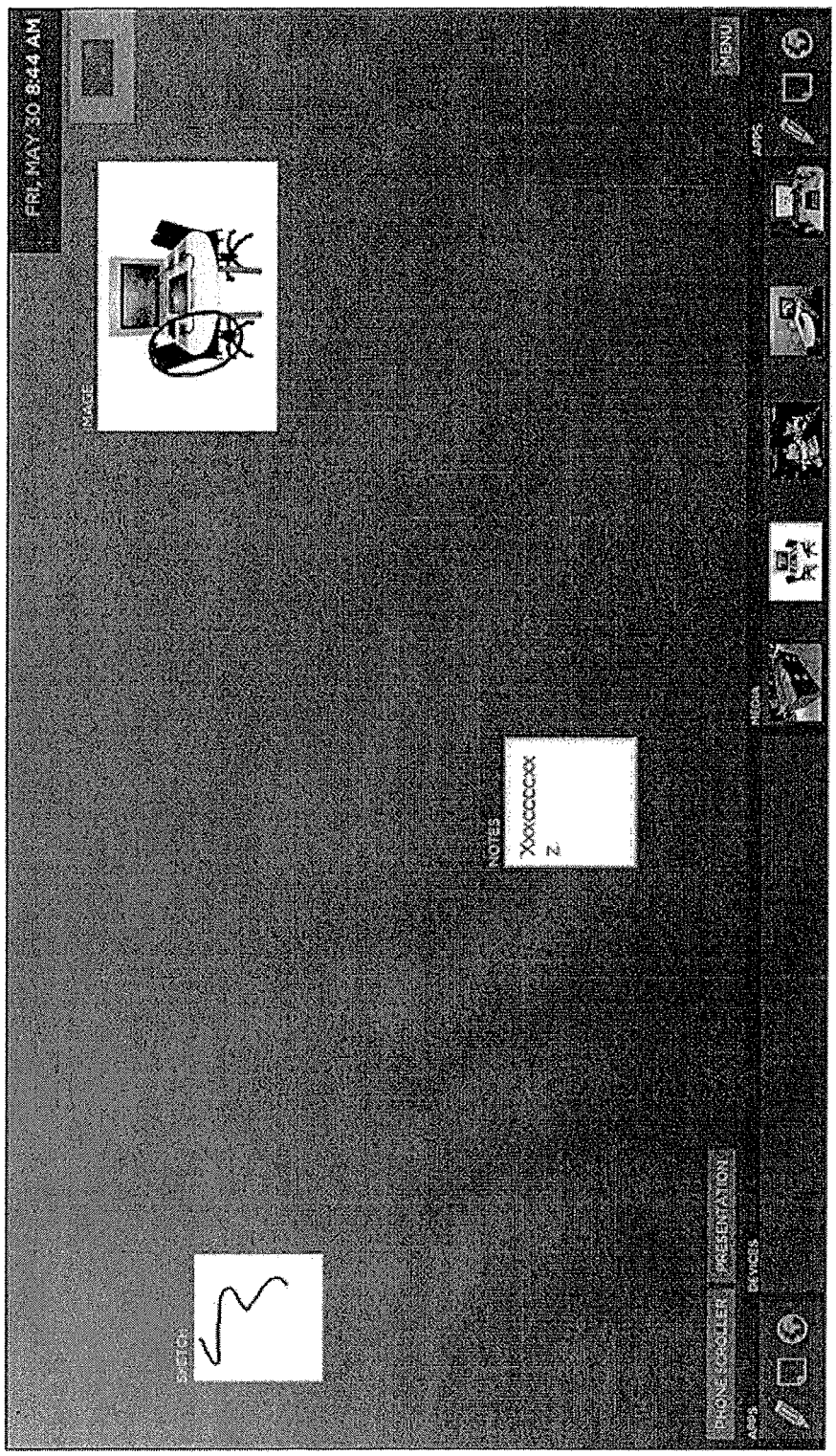

As shown in FIG. 20, notes may be made in the media window and a sketch window may be opened by dragging the pencil icon onto the display region. As shown in FIG. 21, any of these windows may be resized.

Figure 22:
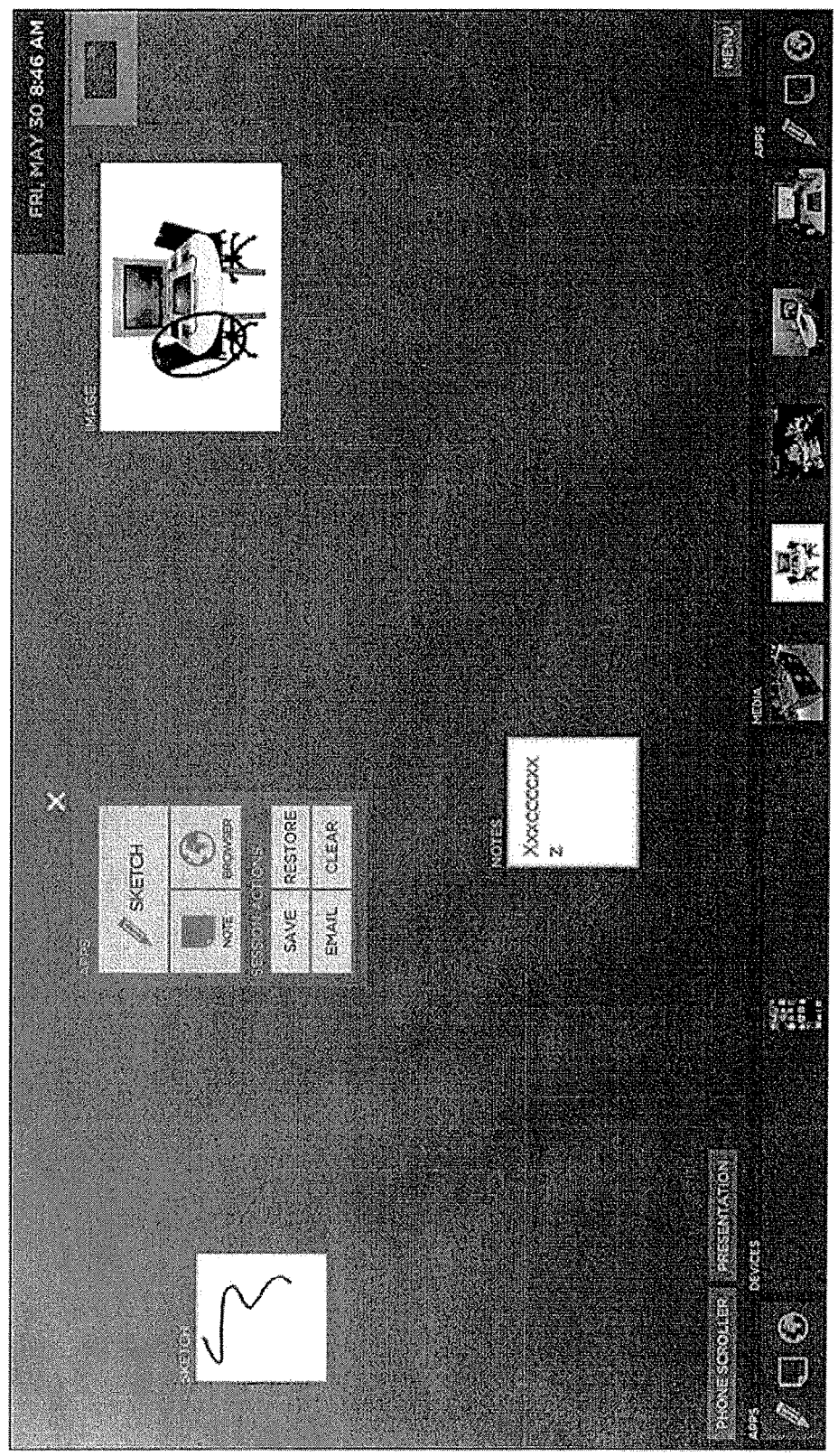

As shown in FIG. 22, when a portion of the display region is touched that does not have a window therein, i.e., a background, a contextual window may appear allowing the applications present in the display tray to be accessed and to allow different actions to be taken for the session, i.e., all the window currently open in the canvas. The actions include saving, restoring, emailing, or clearing. For example, selecting save would prompt a user to name the session; selecting restoring would prompt the user to select from previously stored sessions associated with the user; selecting email would prompt a user to name and email the session; and selecting clear would, after warning the user, clear the session.

Figure 23:
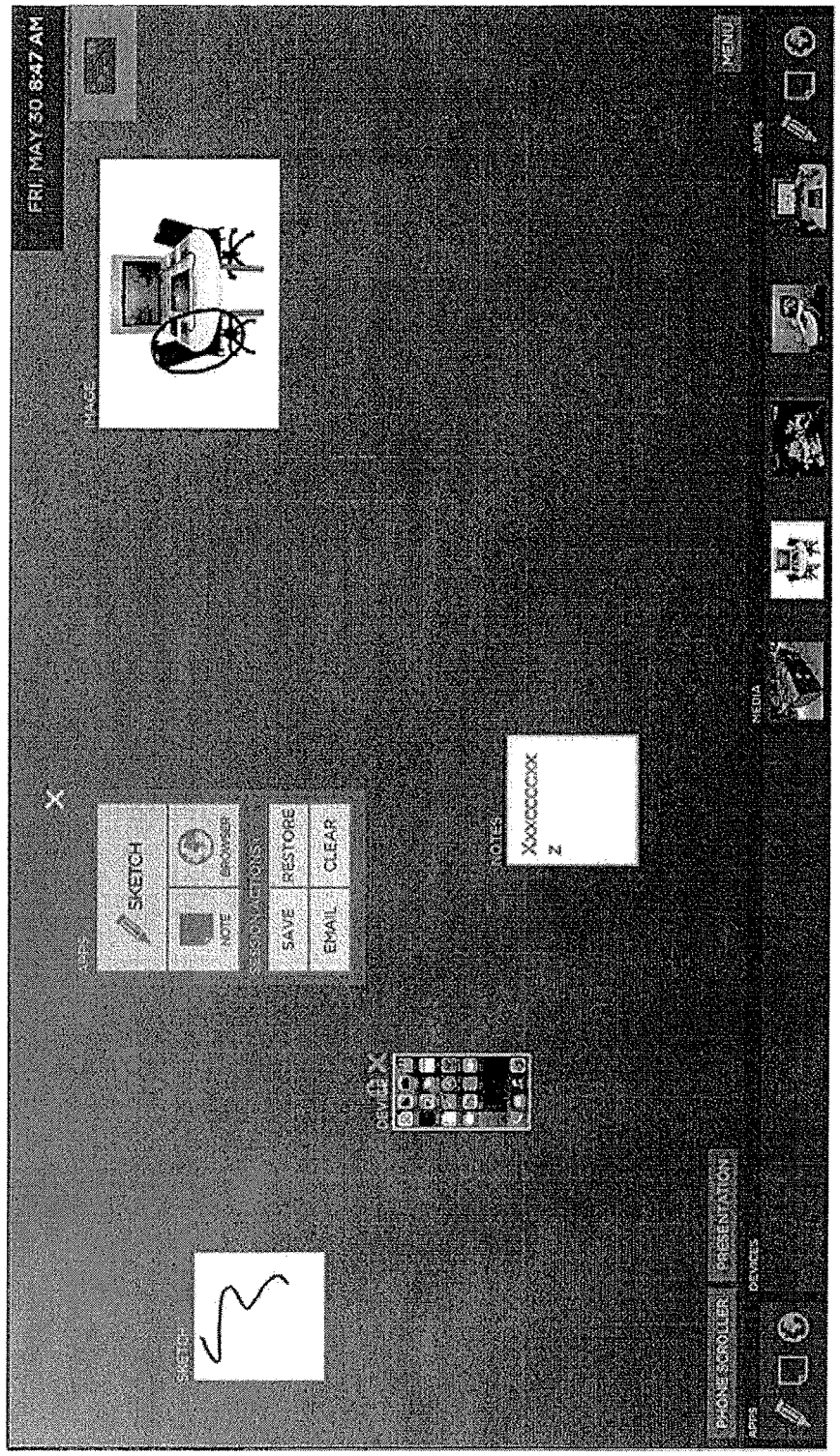
Figure 24:
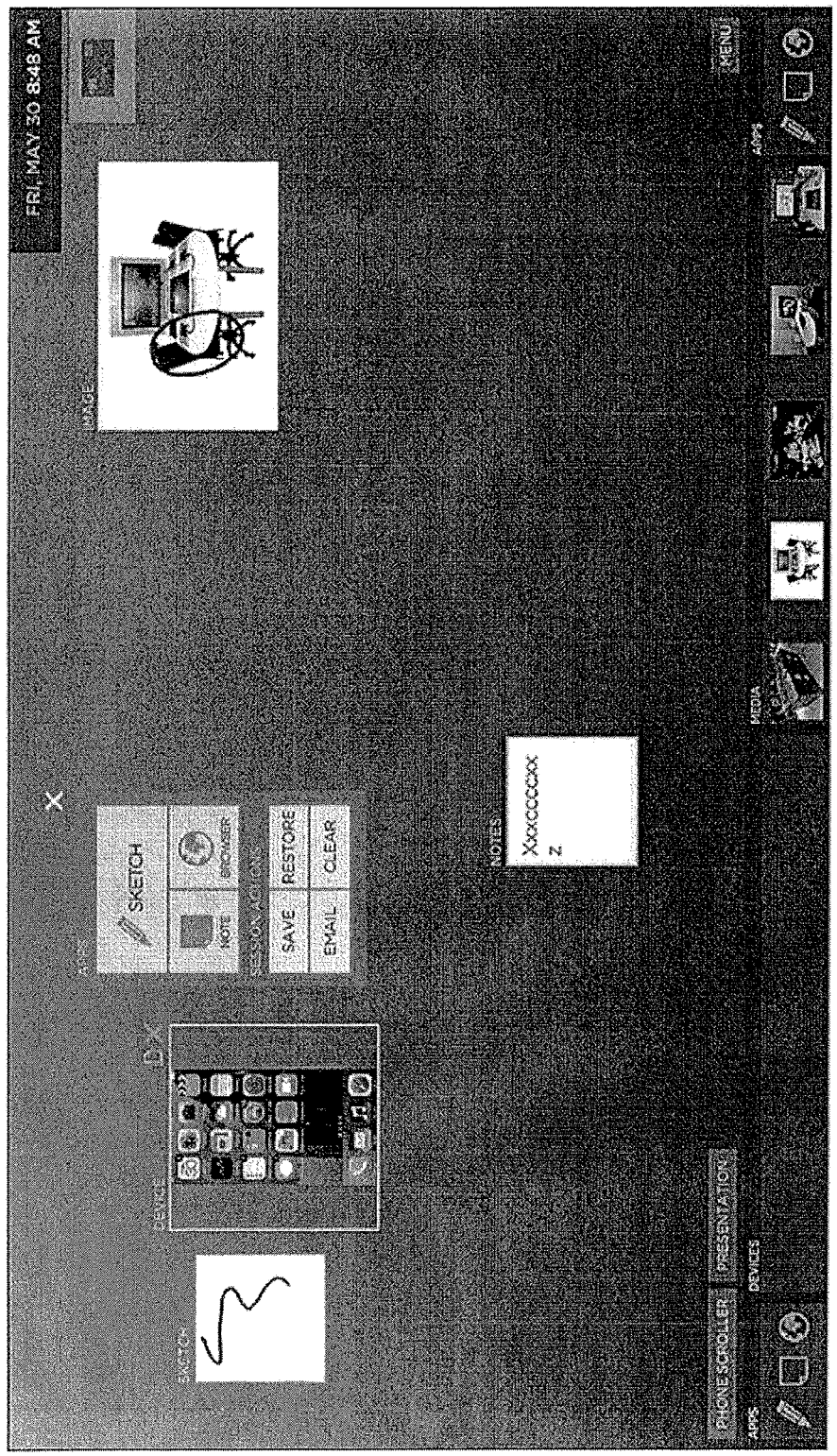

Also shown in FIG. 22 a device is in the device portion of the display tray. As can be seen in FIG. 23, the device may be dragged from the tray onto the display region to appear in a device window. As can be seen in FIG. 24, the device window may be resized.

The device window may include close icon "x", a window identifier, e.g., "device", and a duplication button, represented by a multi-page icon. The duplication button may be provided with any of the windows, either, in the tray or at another location relative to the window. The duplication button creates a duplicate of the window in the same format as the original. For example, activating the duplication button of a browser window will create a new browser window, opened to the same URL. Activating the duplication button associated with a media window, e.g., a window playing a video, will create a duplicate of the video. Activating the duplication button associated with a device window would create a duplicate of the device, and still update the contents in real time. Such duplication relies on any of the three video copy methods noted above. In contrast, activation of the camera icon associated with a window creates a still image of the window.

Figure 25:
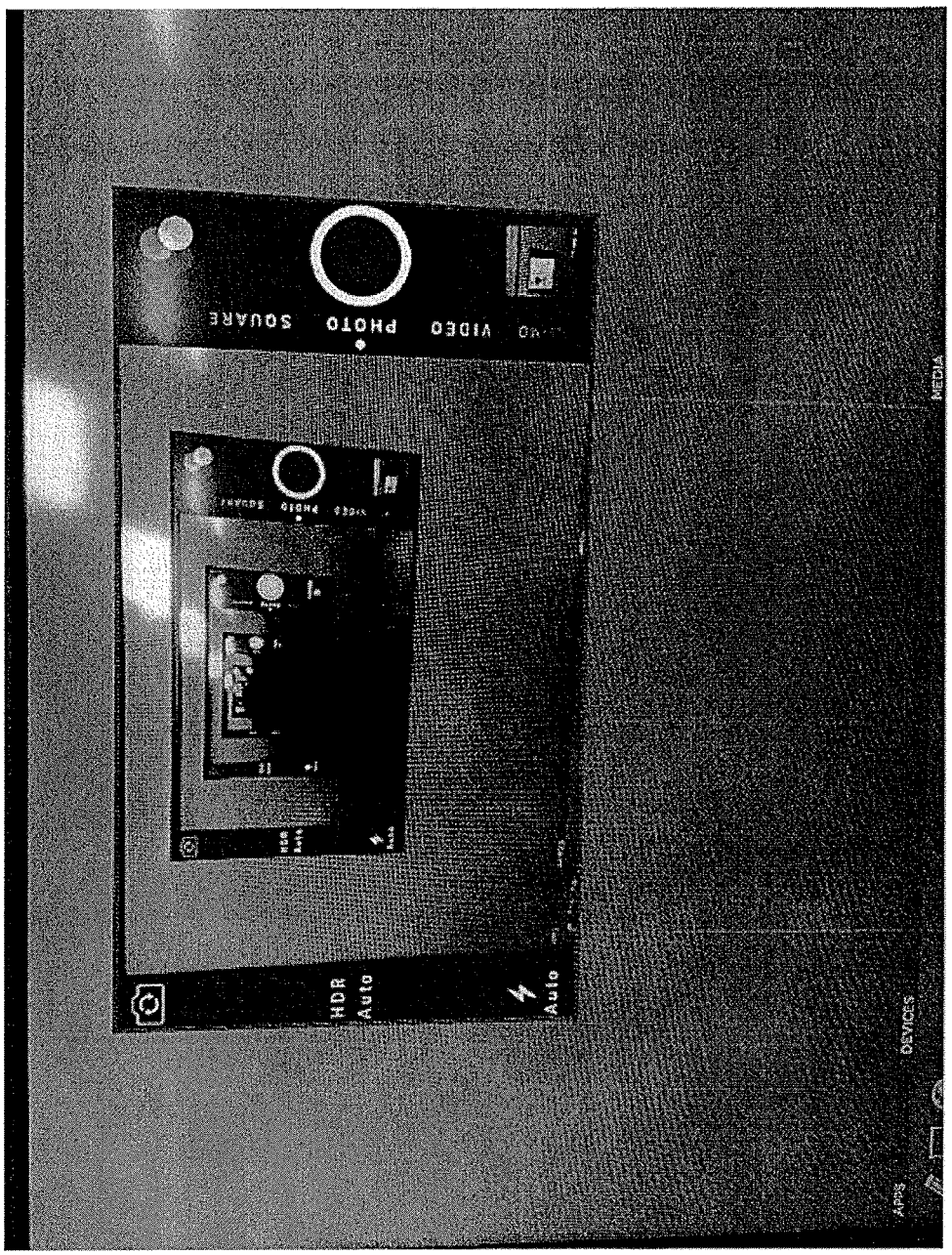
Figure 26:
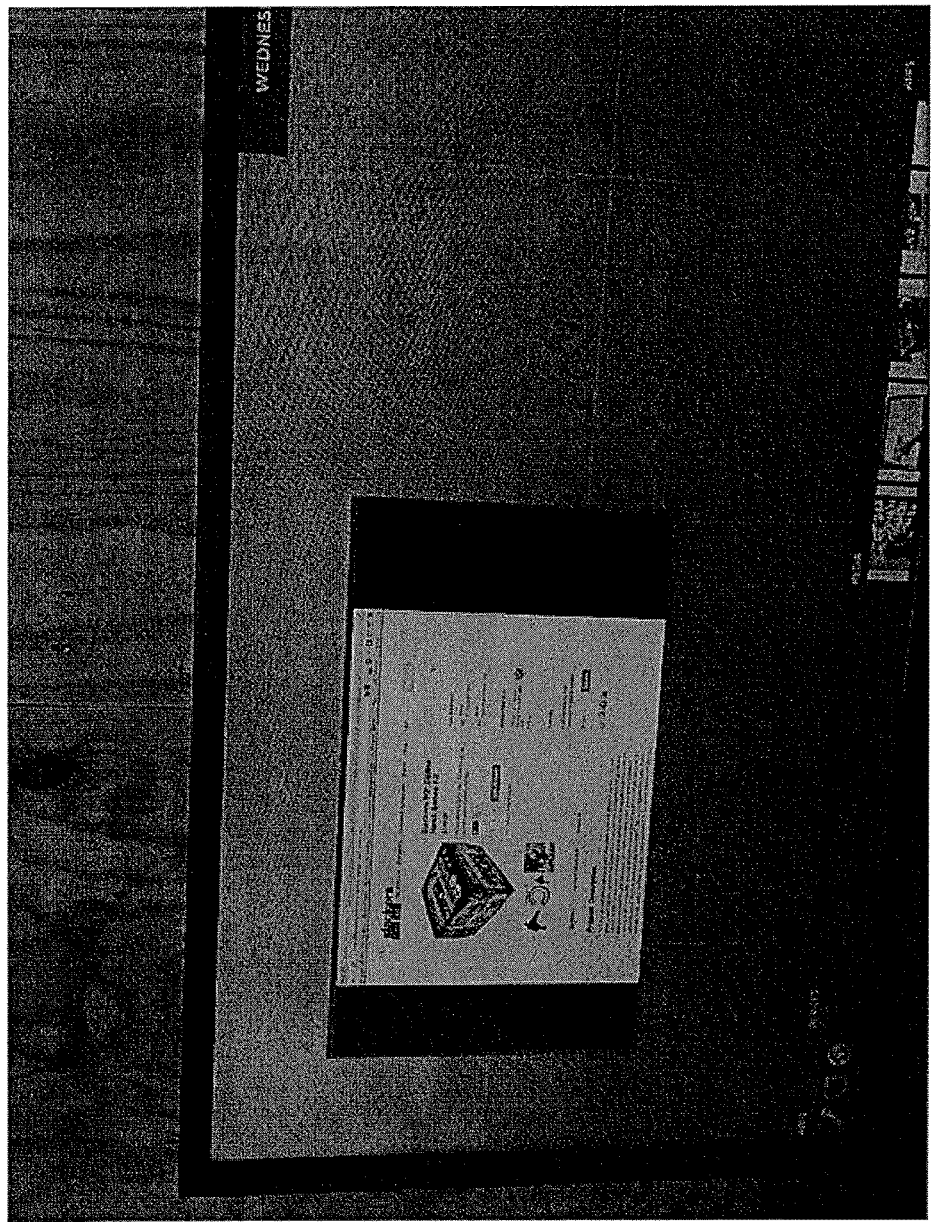
Figure 27:
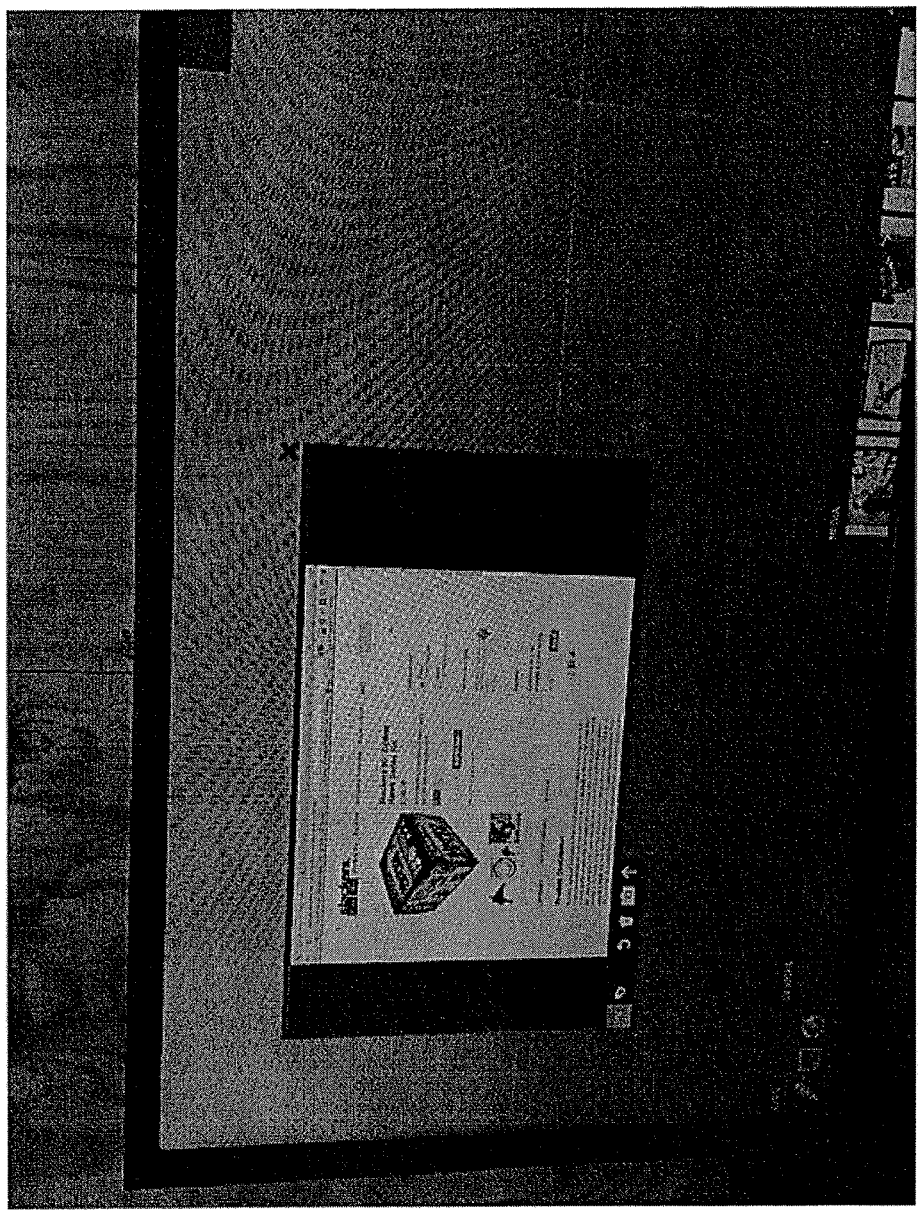
FIGS. 27 to 30B illustrate screen shots of a system according to embodiments operating in different modes.

FIGS. 25 to 27 illustrate additional screen shots of the canvas showing a device thereon. In FIG. 25, the device is dragged from the tray to the canvas. Here, the device takes a picture of itself with a camera of the device, creating an infinite mirror effect. FIG. 26 illustrates a web browser opened on the device. As can be seen in FIG. 27, tapping on the screen inside the device window opens a tray just like the one for the browser window in FIG. 14.

FIGS. 28 to 30B illustrate screen shots of different operational modes in accordance with embodiments. The embodiments discussed above as operating in a single person mode, even though multiple users may be using the screen. Single person mode with multiple users functions very well under numerous circumstances, but there are some conditions under which the single person mode would not be optimal.

Figure 28:
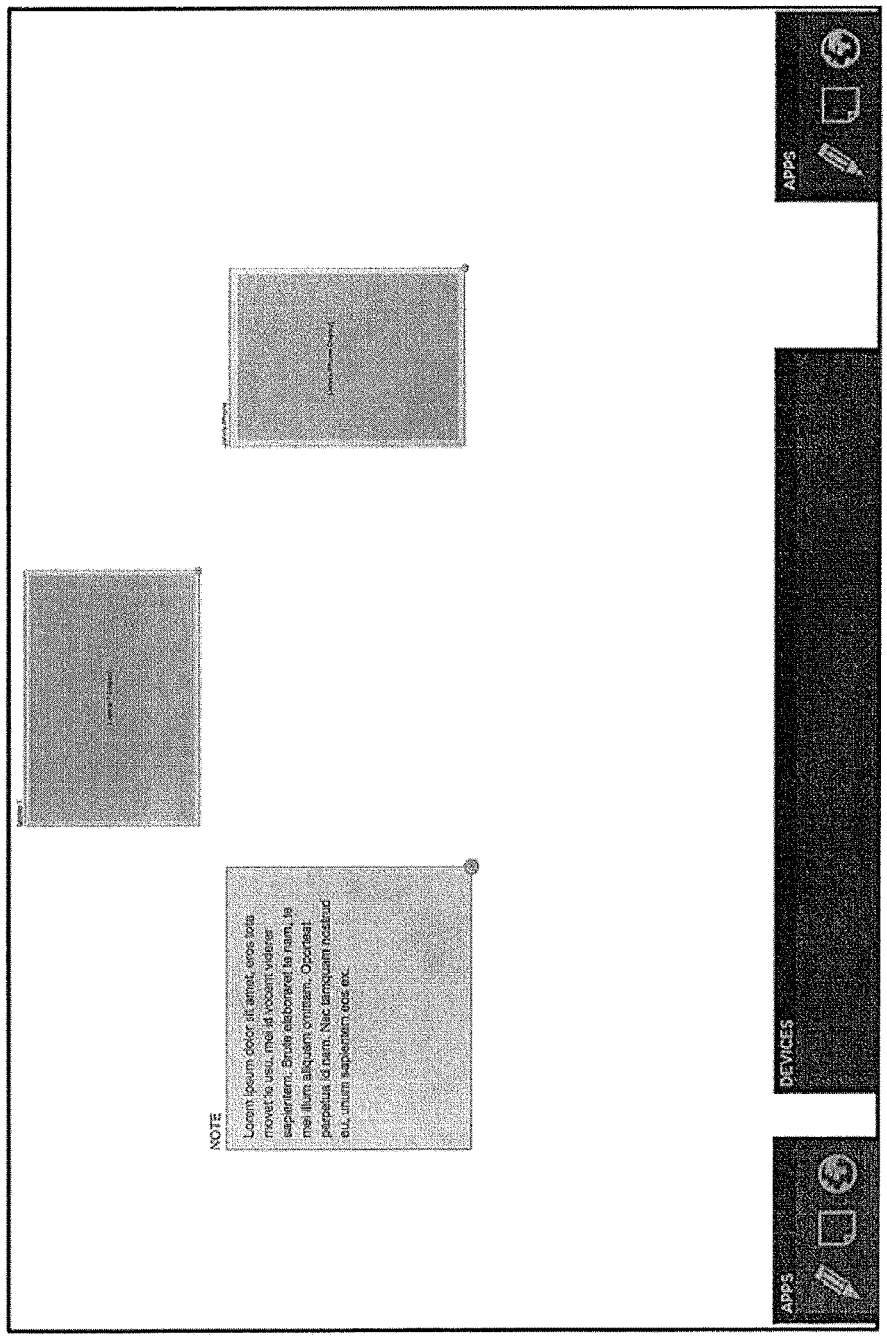

For example, referring to FIG. 28, if a first user is working on a first section of the touch screen, e.g., editing the notes on the left hand side of the screen, while a second user is working on a second section of the touch screen, e.g., John's iPhone® device, and if the system is working in the single person mode and the second user zooms the background, thereby zooming the entire canvas, the first area could be partially or fully removed from the viewable area of the touch screen, as shown in FIG. 28.

Figure 29A:
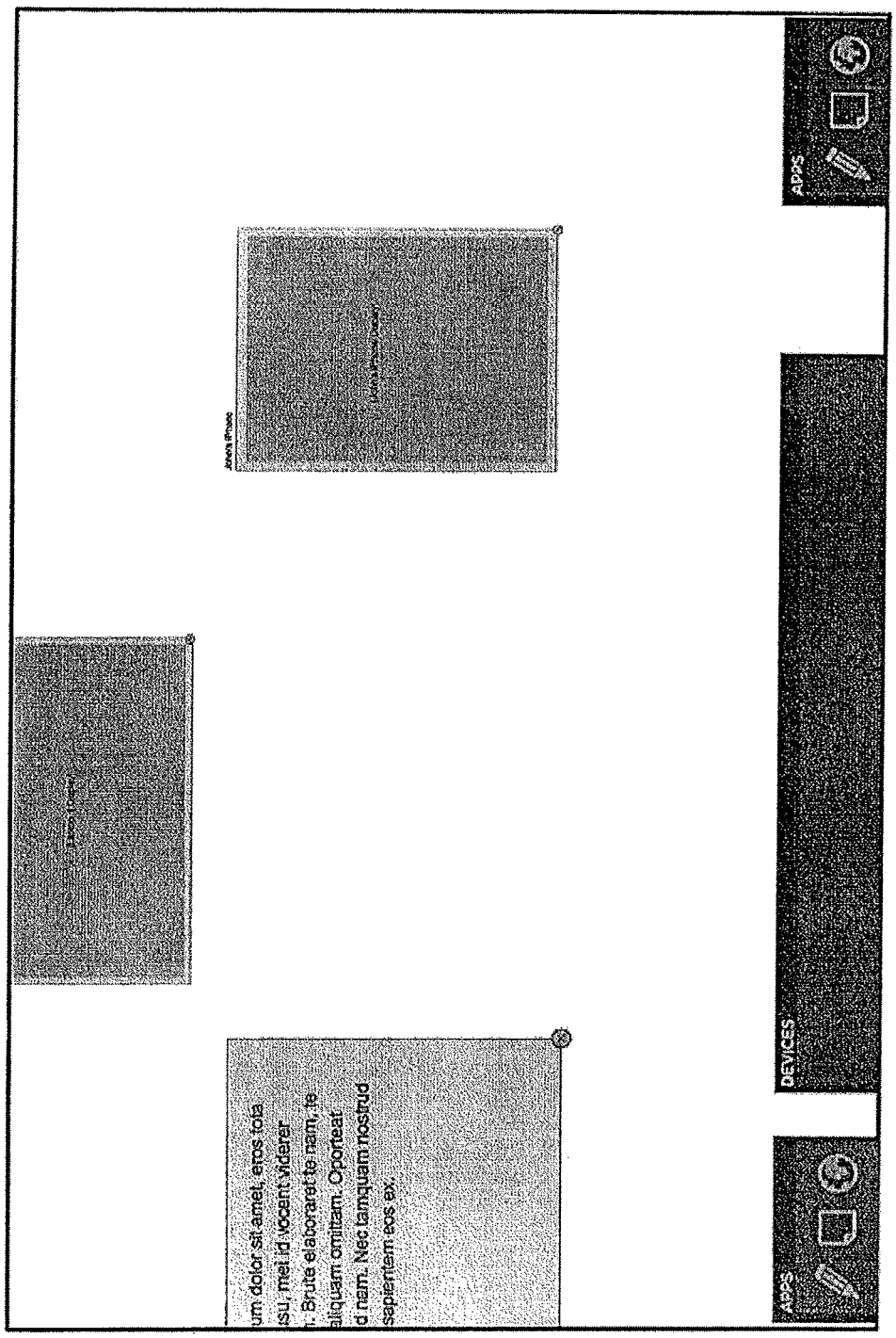
Figure 29B:
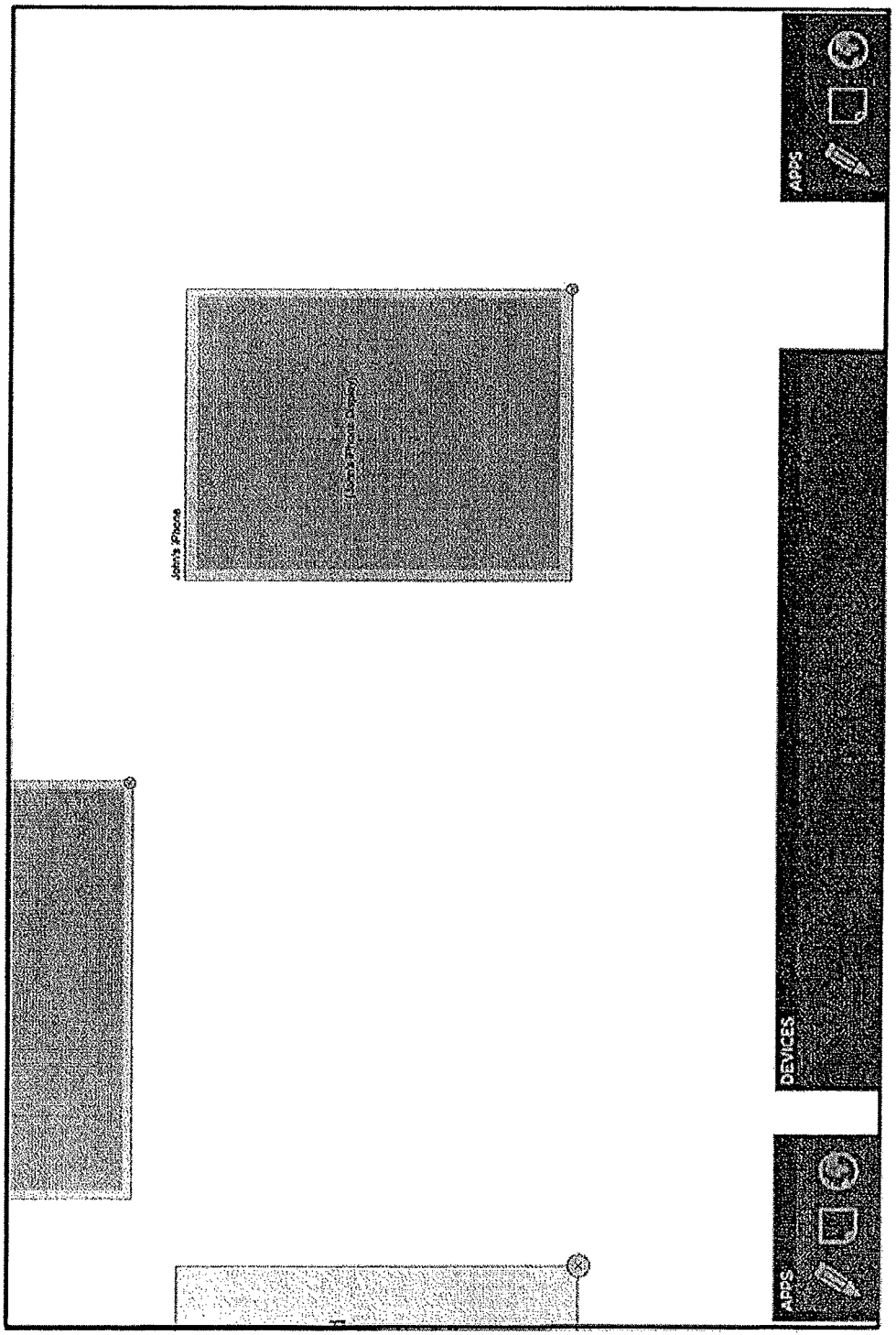

If the second user continues zooming and moving the second section, this impact on other regions worsens, as shown in FIG. 29. As can be seen in FIGS. 28 and 29, such action may render other regions unusable when operating in single person mode (SPM).

If all objects maintain their sizes and positions relative to the background canvas during a zoom of the canvas and if the second user zooms the canvas, and keeps the iPhone device in the center of his field of view, this will cause the notes that user 1 is editing to shift. If the zoom is sufficiently large enough then this shift will cause the notes to be partially or fully removed from the viewable area of the touch screen.

Figure 30A:
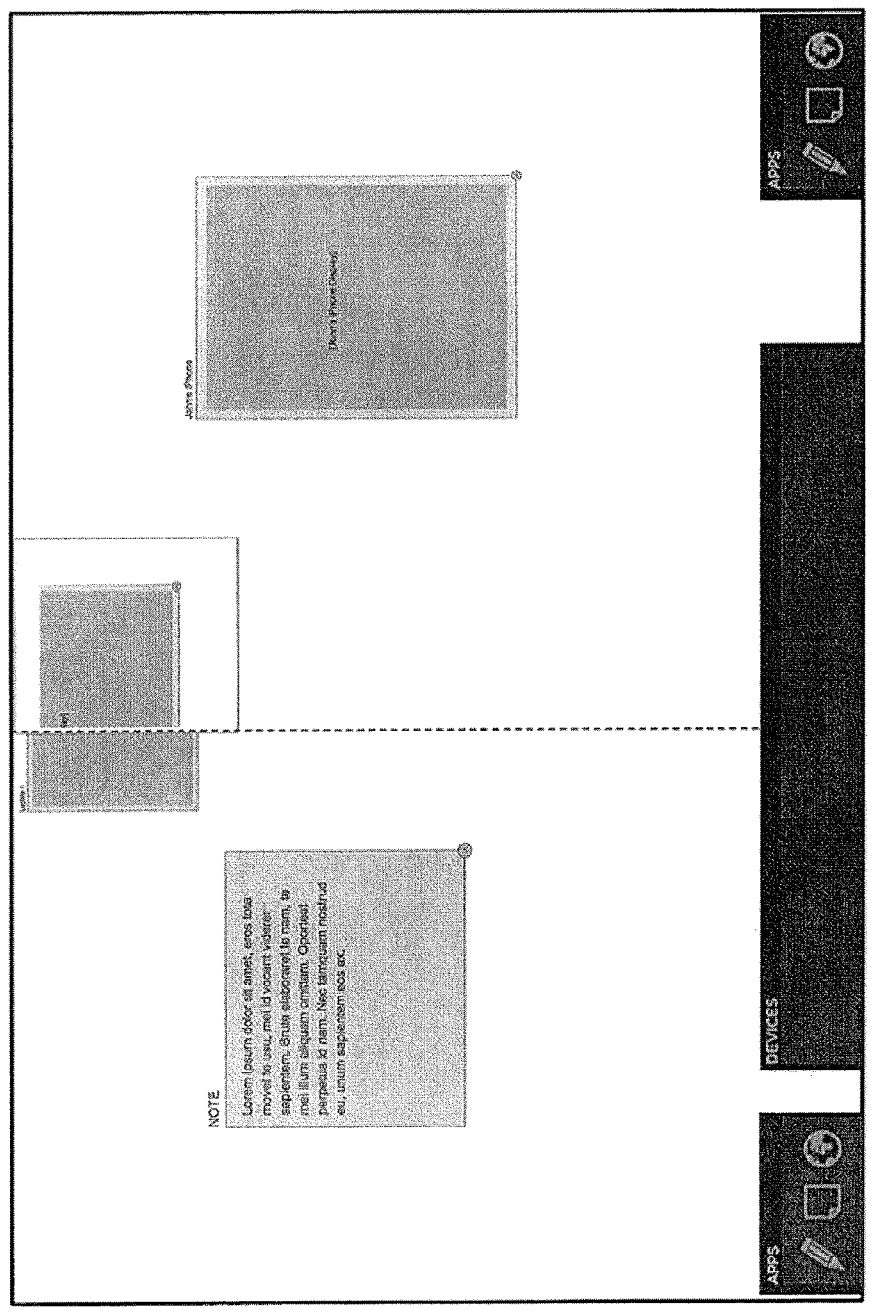
Figure 30B:
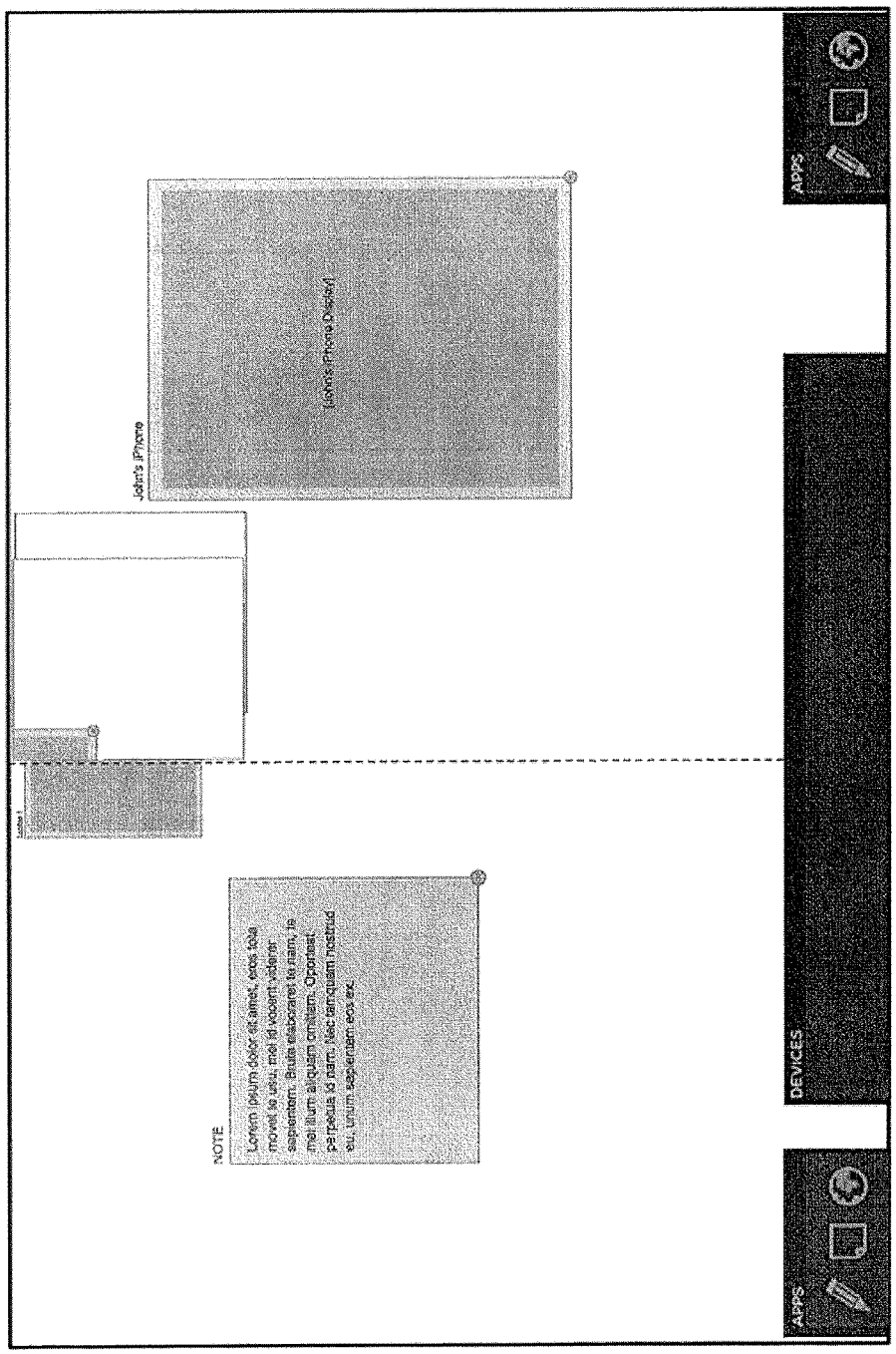

In contrast, if the system is operating in multiple person mode (MPM), e.g., two person mode, three person mode, and so forth, then each user can pinch, zoom, pan, and so forth, the section of the canvas they are viewing, as illustrated in FIGS. 30A and 30B. In this embodiment, the different sections have access to an entirety of the canvas with different users able to have independent views. For example, in two person mode, the left half of the screen could be a first section and the right half of the screen could be a second section. Dividing screens (here indicated by a dashed line for clarity, a physical indicator on the screen may or may not be present) into sections allows each user to have an independent view of the entire canvas. Canvas maneuvering commands, e.g., pinching, zooming, or panning of the canvas, only affect the view within the section. In FIG. 30B, a canvas zoom has been performed using a zoom gesture on the canvas (not adjacent to an object) in the second section of FIG. 30A. As can be seen by comparing FIG. 30B to FIG. 30A, the zooming on the second section does not change the view in the first section. However, the maneuvering of the individual objects displayed on the canvas will affect that object in all sections.

There are numerous manners in which different modes may be selected.

One option to display buttons on the touch screen to switch between the number of users. For example, initially the screen could be in SPM. Hitting a button labeled 2 person, 3 person, and so forth, could change the screen to the corresponding MPM mode. Alternatively, icons could be used to indicating the MPM mode or to revert back to SPM mode. Another option would be a button that indicates to add or subtract a user.

If for example two users are working on different sections of a large document they can do this conveniently in two person mode. Each user can then pan, pinch and zoom individual portions of the document. And then edit the portions that are in view (for example, by annotations, deletions, erasing sections, changing calculations). When done, they can then switch to single person mode to view the entire document or portions thereof across the entire touch screen. As may be Another option is to use touch information on areas of the touch screen. With this option, inputs received by the touch screen can be used to determine whether or not to switch between SPM and MPMs. For example, in a first method, the screen will start initially in SPM. As long as only one gesture is received at one time the screen will stay in SPM. However, if for example a user is drawing in a first region of a screen and a pinch, zoom, or pan of the canvas gesture is received in a second region of the screen, then the program can switch to a MPM, so that the entire canvas is pinched, zoomed, and/or panned, except for the first region. In the first region, the canvas can maintain its original position and size. In this manner the mode can be switched from SPM to 2PM (and similarly to 3PM or 4PM). The canvas can be switched back to SPM through the use of a button.

Similarly, the touch regions can be based on touch information along with object information. For example if only one object is located on the screen, the screen can stay in SPM. If a second object is created on the screen and simultaneous touches (or touches within a given time interval) are detected on the two objects the canvas can be switched to MPM, or be set to switch to MPM if a zoom of the background is detected within a given time interval after a touch is detected on the nearby object.

If pinches, zooms, and/or pans of the background are detected only in a specific region of the touch screen (e.g., the central ⅓ of the canvas), the system may assume that only one user is controlling the canvas size and position, and the system may stay in SPM. As soon as a pinch or zoom or pan of the background occurs in a second region, the system may automatically switch to an MPM mode. The canvas can be switched back to SPM through the use of a button or after a time out period during which touches occur only a specific region.

As yet another option, a camera in communication with the system may be used to detect the number of people near the touch screen or using the touch screen. If only one person is using the touch screen, the system can stay in SPM mode. If a second person is using the touch screen as detected by the camera, then when the first person pinches, zooms, and/or pans, the touch screen can switch to 2PM (or 3PM, 4PM, and so forth). Alternatively, although a person may be near the touch screen and looking at the touch screen, it does not necessarily mean that the person is intending to touch the touch screen, so the information from the camera may be used in conjunction with touch inputs to the system.

Further, a combination of methods may be used to determine which mode to employ. For example, suppose a camera detects two users near the screen, a first user near a first region and a second user in a second region. If the touch screen detects touches only in the first region, then the screen may stay in SPM. However, if touches are detected in the first region, while the camera detects a person in that first region and shortly afterwards touches are detected in a second region in the background that are pinch, zoom, and/or pan gestures of the canvas, the system may be configured to switch to MPM mode if the camera detects that the first person is still near the first region or is near the first region and looking at the screen, and a second person is near the second region of the touch screen.

Mirror Mode

Given a computer with a primary touch screen and a secondary screen, it is straightforward to place the computer in to "Mirror Mode" in which everything on the primary screen is mirrored on the secondary screen. Typically, when two different screens are connected to a computer, the computer can be set to either "mirror mode" or "extended desktop" mode using the system preferences of the computer's operating system.

With a conventional system, the primary computer has a CPU and one or more video cards. Each video card has a different frame buffer for each monitor connected to it. When in mirror mode, the resolution of each display is set to the same value (e.g. 1080p HD). The CPU sends the same video information to the two frame buffers on the video card or cards.

In extended desktop mode, each monitor can have a different resolution. The CPU loads a first frame buffer on the video card(s) for a first monitor and a second frame buffer for a second monitor.

In systems in which a primary screen, e.g., a display including a touchscreen serving as a primary input to a computer, is oriented in one direction, e.g., is horizontal relative to users, the primary screen may be divided into a plurality of sub-screens (screen sections) and/or the display thereon may be rotated, as described, for example, in U.S. Ser. No. 12/650,684, which is hereby incorporated by reference in its entirety. In a conventional mirror mode, a secondary screen will also display all sub-screens and/or be rotated.

However, when the secondary screen is oriented in a different direction than the primary screen, e.g., vertical relative to users, or when other users of the secondary screen are oriented around the secondary screen differently than users of the primary screen, even when the primary screen's display is rotated, the secondary screen should maintain an orientation of the display and/or only display fewer than all of the sub-screens on the primary screen.

For example, the primary screen may be placed horizontally in a table for use with multiple users on multiple sides of the table, with the primary screen divided in to multiple sections, where each section is used by a different user. The screen sections may be oriented differently in order to face the corresponding user's location. The secondary screen may be mounted nearby vertically in order to be viewed by multiple users.

If one of the two screens has higher resolution than the other screen, then with conventional mirror mode, lower resolution would have to be used for both screens.

Additionally, with a conventional system, there is not an easy way to flip back and forth between mirror mode and extended desktop mode. When this is done through the operating system, typically one or both screens resets and flashes a blank screen for a few seconds. In addition, the resolution settings may change and information displayed on the screens is often shifted.

Figure 31:
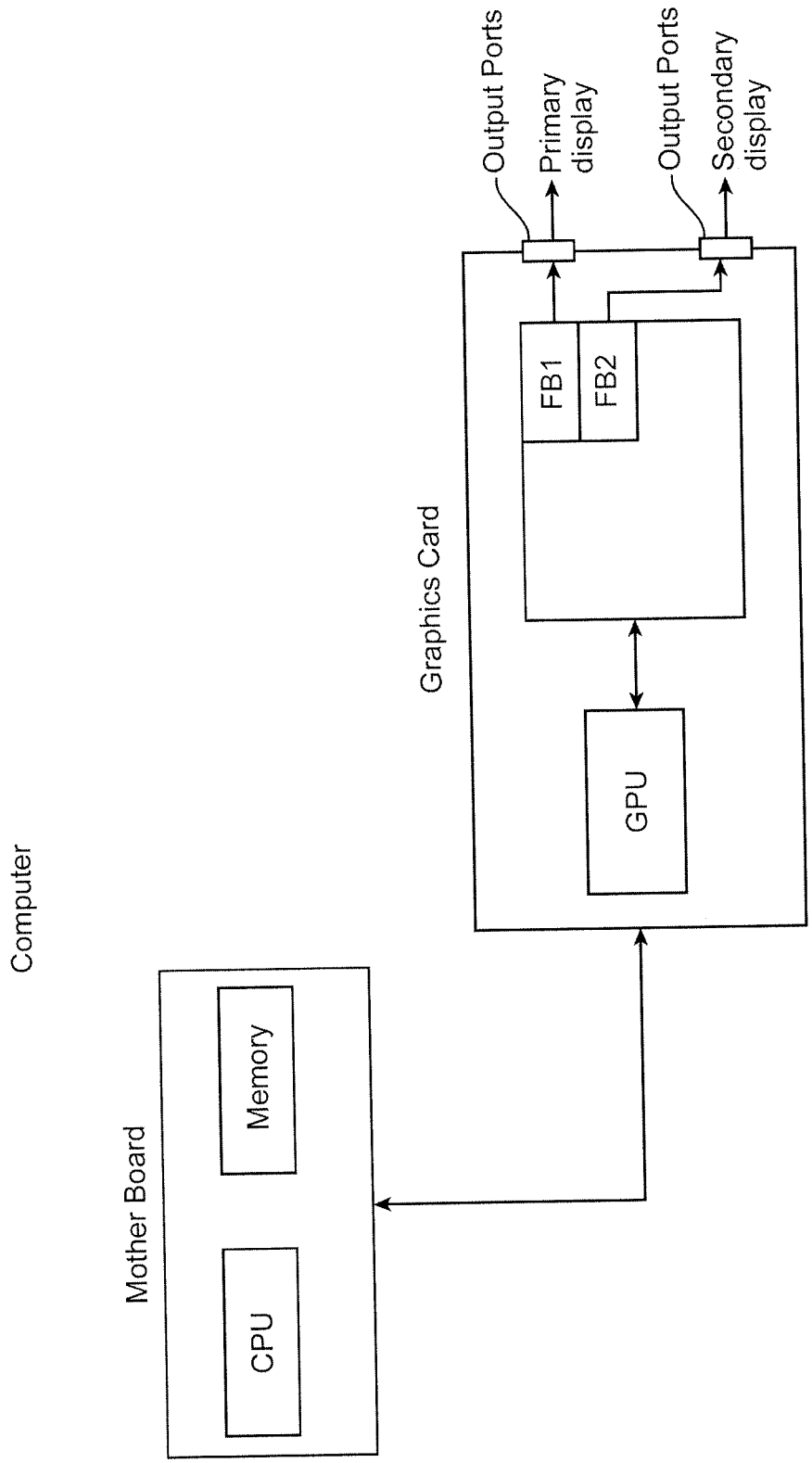
FIG. 31 illustrates a block diagram of a computer system used to allow a display system realize multi-user mirroring in accordance with an embodiment.

In accordance with an embodiment, a GPU on a video card may grab information from a frame buffer an copy it in to video memory on the video card as shown in FIG. 31. Then the CPU can send commands to the GPU to manipulate the information in the video memory (for example, removing sections of the image, scaling it, rotating it) and then copy it to a second frame buffer. In this embodiment, the CPU is set to extended desktop mode and the CPU initially sends different information to each video frame buffer on the video card or cards. Initially, the system functions as described in U.S. Pat. No. 8,522,513, which is hereby incorporated by reference in its entirety, and items on the primary screen can be "tossed" to a secondary screen. However, when a user hits the multi-user mirroring function, then the CPU communicates to the GPU on the video card to copy information from the primary screen's video buffer to the GPU's video memory.

The GPU can then manipulate the data and then copy it to a second frame buffer on the video card, if the video card contains two output port displays. If the output port of the second display is located on a second video card, then the GPU can send the information to the GPU on the second video card. When the GPU copies the information to the second frame buffer, the GPU will overwrite the information loaded in to the frame buffer by the CPU, or the GPU can be set to ignore the information coming from the CPU and instead use the information coming from the GPU to load in to the second frame buffer.

Alternatively, the CPU may copy the information from the CPU's memory, just prior to sending the information to the graphics card or may copy the information from the first frame buffer to the CPU's memory. This is more CPU intensive than the embodiment described above.

Either way, once the information is copied, the information can then be manipulated, e.g., rotated and/or certain sections to be selected and scaled for display on the secondary screen.

Figure 32:
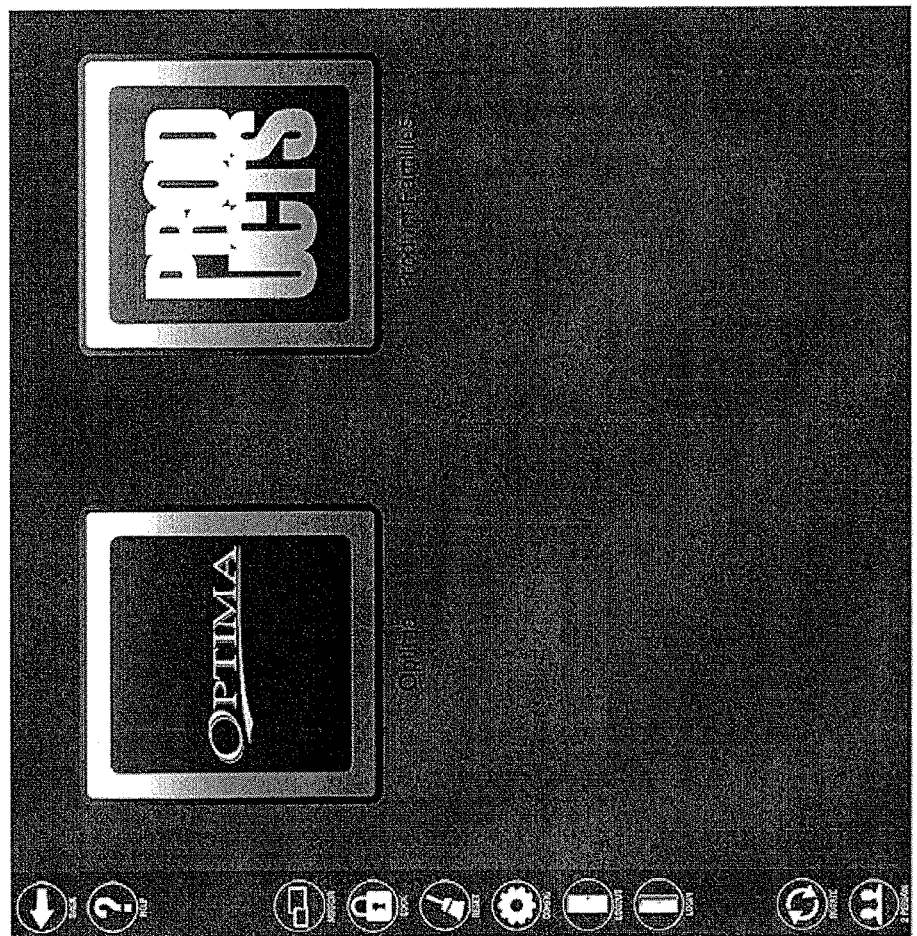
FIG. 32 illustrates a screen including an icon bar in accordance with an embodiment.

FIG. 32 illustrates a screen shot of a primary screen 1000 including a toolbar 1500 in accordance with an embodiment. As can be seen therein, the toolbar 1500 include a multi-user mirroring icon 1520. The following will describe in detail how the system operates when the multi-user mirroring icon 1520 is selected.

FIGS. 33A and 33B illustrate a primary screen and a secondary screen in a conventional system operating in single user mode. As can be seen in FIG. 33A, when the primary screen has the same orientation as the secondary screen, the display on the secondary screen is fine. However, when the primary screen is rotated, as illustrated in FIG. 33B, the orientation of the display on the secondary screen is also rotated, which may not be desirable in numerous situations, e.g., when the secondary screen is horizontal to the users.

Figure 34A:
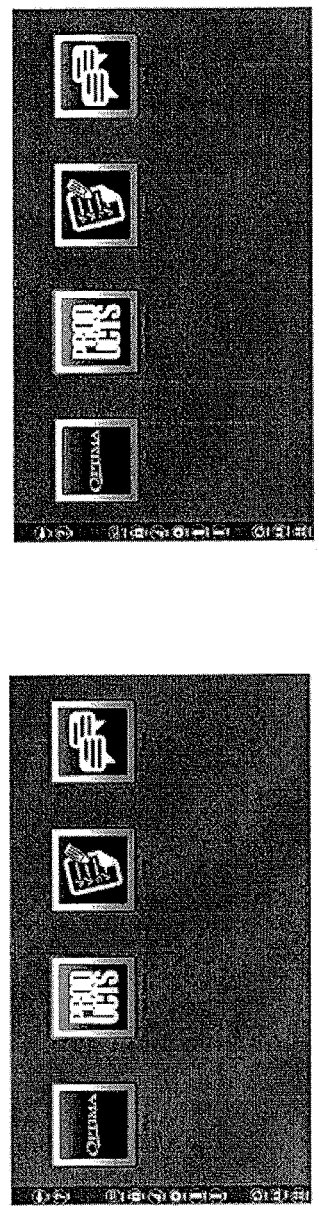
FIGS. 34A and 34B illustrate a primary screen and a secondary screen in accordance with an embodiment operating in single user mode.
Figure 34B:
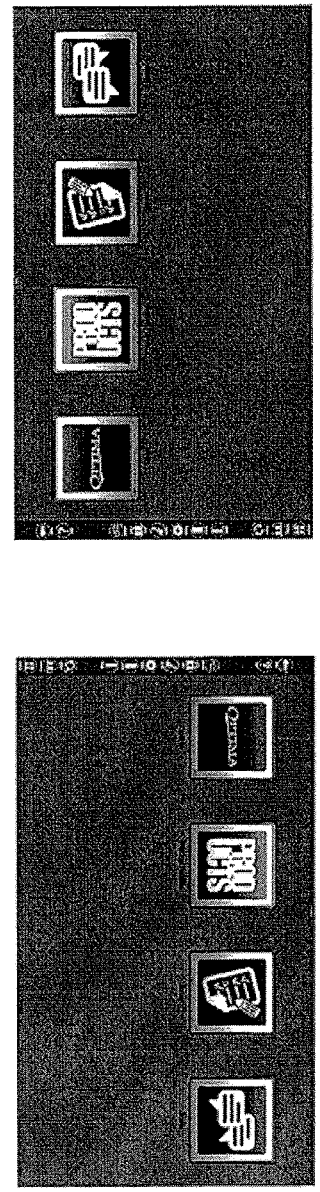

FIGS. 34A and 34B illustrate a primary screen and a secondary screen in a display system operating in single user mode in accordance with an embodiment. As can be seen therein, the primary screen includes a "mirror" icon in a control bar. Tapping this icon, toggles the secondary screen between the multi-user mirroring mode being on or off according to embodiments. With multi-user mirroring "off", items can be tossed onto the secondary screen or a screen saver or other items can be shown on the secondary screen that are not present on the primary screen. With multi-user mirroring mode "on", the secondary screen simply displays what is on the primary screen. However, no matter the orientation of the primary screen, the secondary screen maintains the same orientation. In other words, as shown in FIG. 34B, even if an orientation of the display on the primary screen is rotated, the orientation of the display on the secondary screen remains the same.

The secondary screen may display the primary screen with the icon bar removed. The GPU can remove this section when copying the information from the first memory frame buffer to the second frame buffer, as illustrated in FIG. 31. If the secondary screen is a non-touch screen, then any touch enabled buttons or icons may also be removed.

FIG. 35A to 53B illustrate screen shots of a primary screen that includes a multi-user mirror mode option and a secondary screen in different stages of utilizing the multi-user mirror mode when the primary screen is operating in a multi-person mode, as described, for example, in U.S. Pat. No. 8,583,491, which is incorporated by reference herein in its entirety, but using a conventional mirroring function. Again, as can be seen in FIGS. 35A and 35B, all sub-screens on the primary screen are displayed on the secondary screen. When all sub-screens on the primary display has the same orientation as the secondary display, the image on the secondary display is fine, as illustrated in FIG. 35A. However, when any of the sub-screens on primary display is rotated, as illustrated in FIG. 35B, the orientation of the corresponding sub-screen on the secondary display is also rotated, which may not be desirable in numerous situations, e.g., when the secondary display is horizontal to the users.

In contrast, in accordance with an embodiment, the primary screen may operate in two person mode, and each section has its own icon bar, including a mirror icon. The GPU can pull out only one section of the two sections and copy only this portion to the secondary screen, as illustrated in FIG. 36A. If rotated, as illustrated in FIG. 36B, the orientation of the section on the secondary screen may be unchanged. Finally, as shown in FIG. 36D, if both sections are to be displayed on the secondary screen, but are displayed on the primary screen with two different orientations, the GPU can re-orient the sections so that on the secondary screen, both sections are displayed with the same orientation The embodiments are particularly useful for connections to websites, as illustrated in FIGS. 36C and 36D. If the information displayed on the primary screen comes from the computer itself, then the data can be also generated for the secondary screen and reformatted and resealed by the CPU. However, if the information comes from an outside source, e.g., a website, then the situation is more complicated. For example, if a web session is opened on the primary screen, it is difficult to generate a simultaneous web session on the secondary screen, while updating the session on the secondary screen in real time without using one of the methods described above.

For example, if the primary screen is in single-person mode and is embedded horizontally in a table and a web session is initiated on the primary screen, a user may tap the "mirror" icon and the web session will appear on the secondary screen, as shown in FIG. 36C. If the user then taps the "rotate" icon, the web session's orientation will then rotate on the primary screen, by 180 degrees or 90 degrees (or another angle, depending on the number and arrangement of the seating stations around the table.) However, on the secondary screen, it is desired that the web session be mirrored, without rotation, as shown in FIG. 36D. This is achieved by the CPU handling the orientation on the secondary screen via the GPU. For example, if the image is rotated by 180 degrees, once the "rotate" icon is tapped, the web session on the primary screen will be rotated by 180 degrees with respect to its initial orientation. The CPU would then send a signal to the GPU to copy this information from the first frame buffer and rotate it by 180 degrees and then send the information to the second frame buffer (see FIG. 32). Thus the web session on the secondary screen will maintain its orientation, even when the orientation of the web session on the primary screen is changed.

Figure 37:
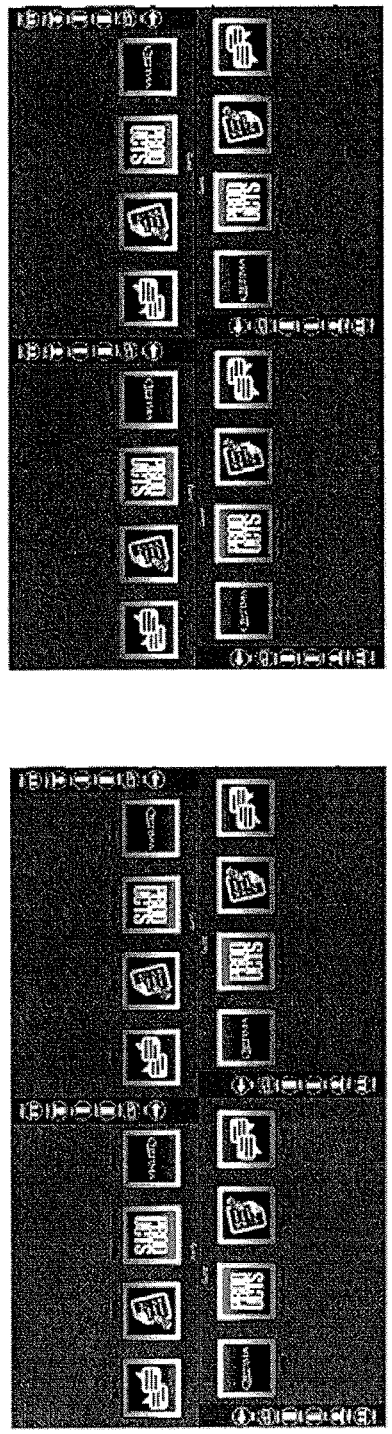
FIG. 37 illustrates a primary screen and a secondary screen in a conventional system operating in four user mode.
Figure 39:
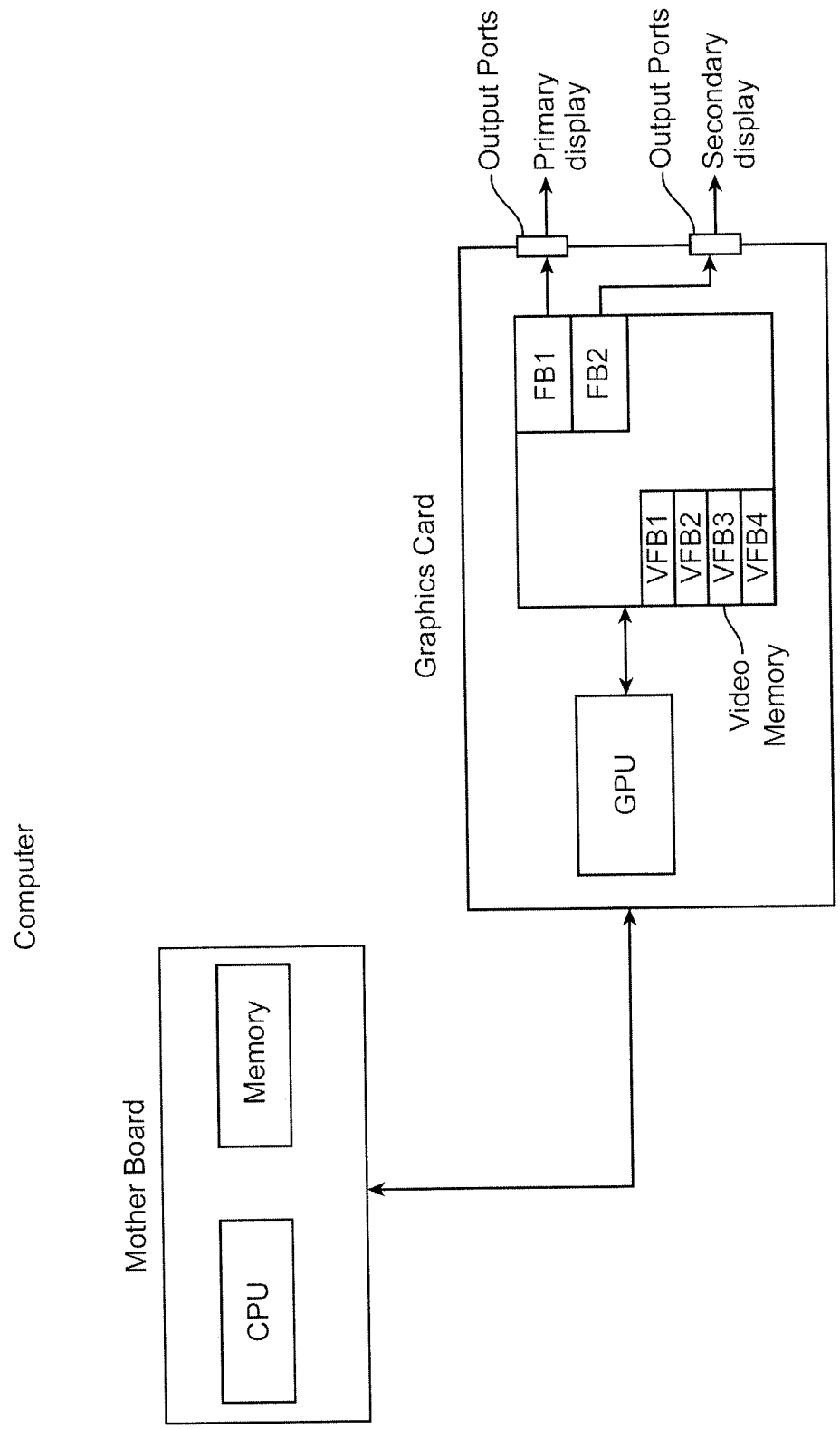
FIG. 39 illustrates a block diagram of a computer system used to allow a display system realize multi-user mirroring in accordance with an embodiment.

In more than two person mode, e.g., in four person mode, there would be four sections, two with one orientation and two with an opposite orientation. Alternatively, if users are positioned at ends of the primary screen, sections may be rotated so that all four sections have a different orientation. FIG. 37 illustrates a primary screen and a secondary screen in a conventional system operating in four user mode. As can be seen therein, the orientations of the sections displayed on the primary screen and the secondary screen are the same.

In contrast, as illustrated in FIGS. 38A to 38F, the multi-user mirroring may allow different images to be displayed on the secondary screen. In this case, if for example, only one section is displayed on the secondary screen, as shown in FIG. 38A, through the use of the mirroring button, the particular section where the mirroring button is selected is displayed across the entire secondary screen. If more than one section is to be display, these may be tiled and displayed on the secondary screen, all with the same orientation, as shown in FIGS. 38B to 38D.

Also, if the primary screen is in multi-person mode, then when initiating a web session, as shown in FIGS. 38E to 38F, the web session on the primary screen will have a lower resolution than the full resolution of the primary screen display. If both the primary screen and secondary screens have the same resolution, then when expanding a single user section across the entire secondary screen, this section will have a lower resolution than the secondary screen's resolution.

For example, suppose both the primary screen and secondary screen are 1080 p hd displays and the primary screen is in four person mode. In this case, if a user using one section of the primary display initiates a web session, then this web session will have a resolution of at most one fourth of the full 1080 p hd resolution, because the resolution of the window requesting the web session from the host would be 960×540 pixels. Using one of the methods above, if this section by itself is displayed across the entire secondary screen (only 1 of the 4 sections is selected for multi-user mirroring), then the resolution of this session displayed on the secondary screen would be limited to 960×540.

In some cases, this may not be a problem, but in other cases a higher resolution to be displayed on the secondary screen is desired. On method to achieve this is to use a higher resolution display for the primary screen. For example, a 4 k resolution display (3840×2160) could be used for the primary screen and a 1080 p display could be used for the secondary screen. In this case, even in four person mode, if one section of the four sections was selected to be mirrored on to the secondary screen, it could be displayed on the secondary screen at a resolution of 1080 p.

Another way to increase the resolution of a section of the primary screen on the secondary screen is to set-up a virtual display on the video card. As shown in FIG. 9, when the primary and secondary displays are connected to the computer via the output ports on the video card, the first frame buffer and second frame buffer are automatically created by the computer's operating system within the video memory on the graphics card. However, in addition to these frame buffers, additional virtual frame buffers can be created within the video memory if the CPU instructs the GPU to do so. In this method, when the primary screen is split into multiple sections, virtual frame buffers are created for each section within the video memory on the graphics card. For example, as shown in FIGS. 8A to 8F, if the primary screen is set to 4 person mode, four virtual frame buffers can be created in the GPU's video memory. For each virtual frame buffer the resolution can be set arbitrarily to the resolution of a virtual screen.

For example, the resolution of each virtual screen can be set to 1080 p hd (1920×1080 pixels). Each virtual frame buffer would then be sized accordingly. Then, if the primary screen was in 4 person mode, and a web session was initiated, by a user in one section of the primary screen, the computer would not initiate the session from frame buffer 1, but would instead instruct the GPU to initiate the web session from the first virtual frame buffer. This would initiate the web session with the resolution of the virtual screen instead of the resolution of the smaller section of the primary screen. Then as information in this session is changed, the information would be copied at a reduced resolution from the virtual frame buffer to the first frame buffer. Any inputs on the primary screen are then passed to the virtual frame buffer and sent through the virtual frame buffer and updated within the virtual frame buffer and then copied to the first frame buffer in real time. Then if the multi-user mirror mode button is activated, the GPU can copy the information from the virtual frame buffer to the second frame buffer for display on the secondary screen. If, the number of sections displayed on the secondary screen is less than the number displayed on the primary screen, then the resolution displayed on the secondary screen can then be greater than that displayed on the primary screen.

Each section is assigned to a different virtual user and a virtual session is started for each virtual user. Normally virtual sessions are used to change between users and usually only 1 desktop is activated at a time for each user. In this manner, the desktop resolution can be set independently for each virtual session. For example, if the primary screen is set to 4 person mode, then 4 virtual sessions would be initiated, one for each section. For each virtual session, the resolution can be set arbitrarily to the resolution of a virtual screen. The resolution of the virtual sessions can then be sampled to a lower resolution for display on the primary screen. However, when a section is selected to be displayed on the secondary screen and a higher resolution is needed than can be obtained from the video frame buffer memory on the graphics card, instead of getting this information from the frame buffer, the CPU can send the full resolution (or a higher resolution than that displayed on the primary screen) stored within the computer from the virtual session's display.

This mirroring function can also be used when displaying lap top computers and mobile device information on the primary and secondary screens. As described in U.S. Ser. No. 13/841,883, which is herein incorporated by reference in its entirety, information from lap top computers and mobile devices including video information can be sent wirelessly to the computer for which the primary screen serves as the primary input. For example, the entire contents of the video display of a mobile device can be sent wirelessly to the table computer. The table computer can then store this information in a virtual frame buffer. The CPU can then instruct the GPU to sample the information in the virtual frame buffer, lowering its resolution and/or rotate the information and then copy it to the primary screen's frame buffer for display in a portion of the primary screen. In multi-user mirror mode, the above methods can be used to display lap top or mobile device screens on a secondary screen. In this case, if the primary screen resolution is in multi person mode and a higher resolution than is available from the video frame buffer is needed to be displayed on the secondary screen then when this option is selected the CPU can instruct the GPU to send the higher resolution video signal stored in the virtual frame buffer to the secondary screen's frame buffer for display on the secondary screen. Another method for solving the above problems is to use multiple layers within each video frame. That is instead of having virtual frame buffers, the GPU can be instructed to display information on various layers and different levels. Upper layers would cover up lower layers. When a first lap top computer is connected, or when a first user session is activated, the lowest layer of the frame buffer can be used with the corresponding video information. Then the CPU can add layer sections on top of the bottom layer to effectively cover up the information on the bottom layer of the frame buffer.

Display of Information from Mobile Devices on a Group Display

Currently there are numerous manners in which mobile devices can be connected to a single display. For example, a cable maybe used to send the output of a lap top computer to a particular input port of an LCD display. Changing the input port used for the LCD display, will change the display to that of the connected computer. This may also be realized wirelessly.

There are software program available that digitize the information on a mobile device that can then be streamed to a host computer. The host computer can be connected to a group display. In this manner, information displayed on the group displayed can be switched to the information streamed to the host computer by the mobile device with downloaded software application.

Alternatively, some devices, e.g., AppleTV, connect a mobile device wirelessly to the AppleTV using Apple's Airplay protocol. This works in a manner very similar to the above, except that no software is required to be downloaded onto the mobile device. Apple's Airplay software for transmission is built in to operating systems for Apple devices.

In each of these methods, when a mobile device connects to the group display, prior to anything being displayed on the group display, there is a handshake between the host computer and the mobile device that sets the resolution to be transmitted and the mode of operation. The mode of operation is typically either Mirror Mode (same information displayed on user's screen to be displayed on the external display) or Extended Desktop (different information displayed on the external display). The host computer sends the mobile device the various resolutions supported by the Group Display and the mobile device sends back to the host computer which resolution it would utilize. From then on, until the device is disconnected, the host computer sets the resolution of the Group Display to that chosen by the mobile device and the mobile device transmits the digitized signal with the resolution selected.

It is desirable for multiple users to share information on their mobile devices. The mobile devices may be: lap top computers, smart phones or tablet computers. The information that may be shared includes photos, videos and whatever content is on the display screen of one of these mobile devices.

As will be described in detail below, in accordance with one or more embodiments, information from more than one mobile device may be displayed simultaneously on a group display. Information from each device may be displayed in its own window on the group display. The information may be provided via a wireless network, Bluetooth, and other non-hard-wired mechanisms.

Figure 40:
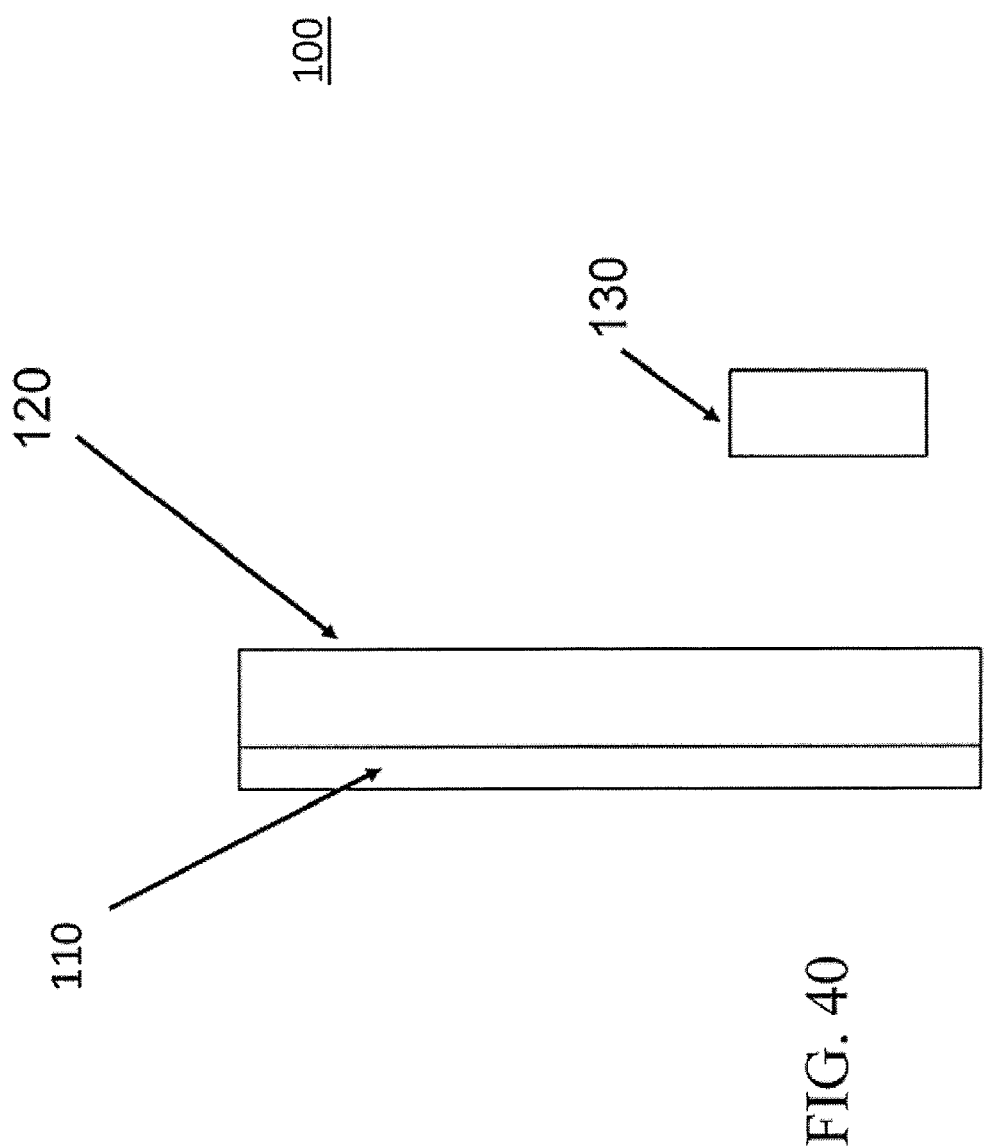
FIG. 40 illustrates a side view of a group display.

As illustrated in FIG. 40, a group display 100 includes a sensor 110, a digital display 120, and a host computer connected to the sensor 110 and the display 120. The sensor 110 may be a gesture sensor, e.g., a touch sensor (e.g., optical touch sensor, projected capacitive sensor or other sensor that responds to a user's touch) or a motion sensor that responds to movement in the range of the group display's gesture sensor (e.g. a visible or IR camera). The host computer includes a digitizer receiver program (DRP). The digital display 105 may be, e.g., an LED, OLED, LCD, or plasma display. The digital display 105 may be mounted vertically, e.g. on a wall, or horizontally, e.g. embedded in a flat table top or at an angle (tilted).

Figure 41:
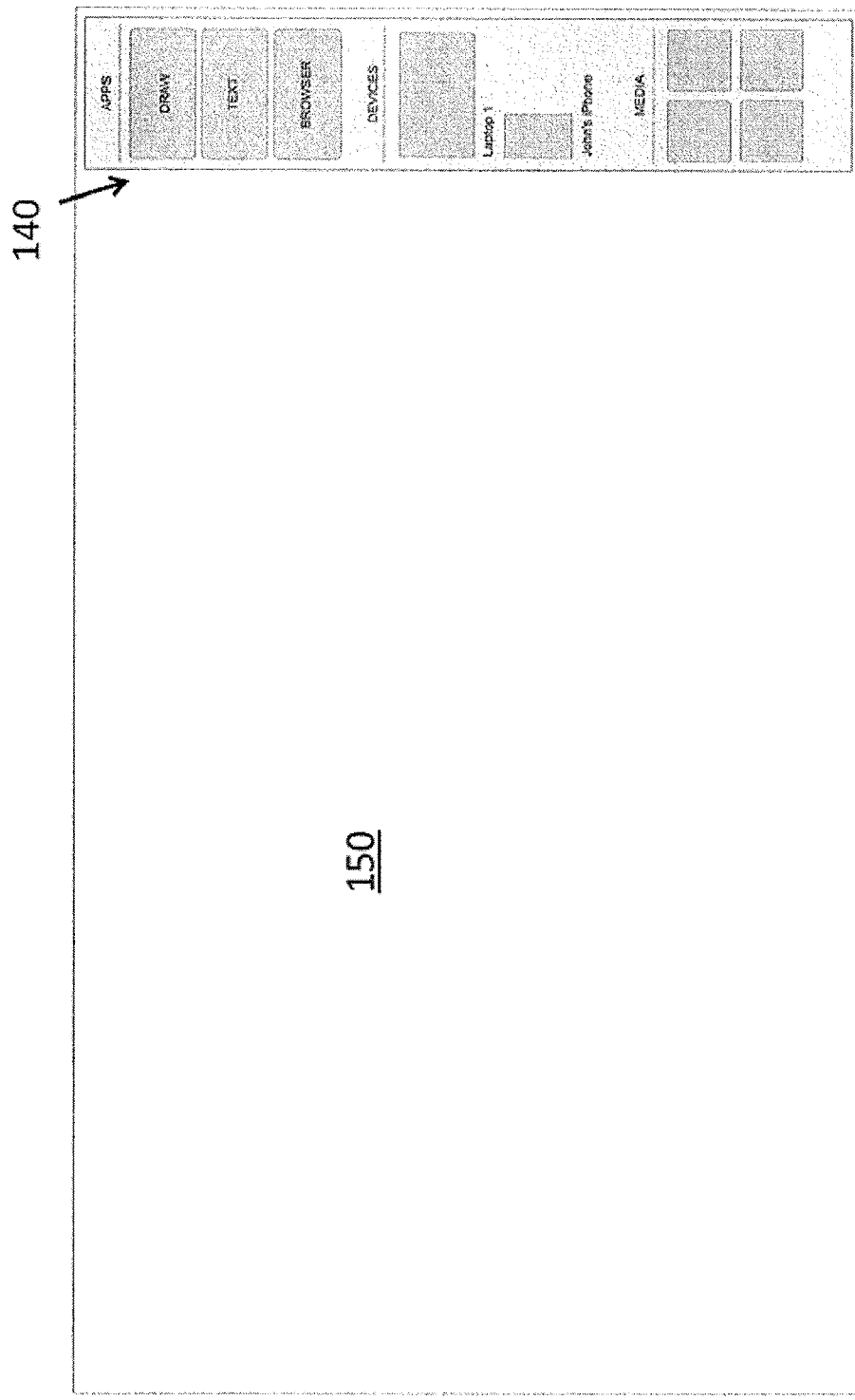
FIG. 41 illustrates a top view of a group display before any action has been taken thereon.

A top view of the display 120 is illustrated in FIG. 41. The display 120 may include a tray region 140 and a display region 150. The tray region 140 may include different items, e.g., applications, available mobile devices, other media, e.g., local media files from the host computer, and so forth, which may be deployed to control what is displayed in the display region 130 of the group display 100. When a mobile device is ready to send information to the group display 100 as described below, a corresponding device icon may appear in the tray region 120.

When a user with a mobile device chooses to share information with the host computer, an icon representing the user's mobile device may appear in the tray region 120. The communication between the user's mobile device and the host computer may take place with any wireless protocol, e.g. wifi, wifi direct, WiDi, Bluetooth or high speed Bluetooth. In one embodiment, once a mobile device joins a wireless network, the user of the mobile device will have the ability to view any computers on the same network that are running the DRP. This can be done either through the operating system of the mobile device or through a stand-alone App. In order for the information from a mobile device to be displayed on the group display, the mobile device includes a digital transmitter or a digitizer, which may be either built into the operating system of each device or included in a separate App that the user may download on to their mobile device. For example, Apple has its Airplay digitizer built in to its operating system. If Airplay is used as the digitizer, then the DRP would be an Airplay receiver. In this embodiment a user of a mobile device will first choose to mirror its information using the digitizer and then will have the ability to choose which computer to join for the mirror function from a list of computers containing all computers on the wireless network that have a DRP for active digitizer on the mobile device. If the user chooses to perform the mirroring of its information with the host computer, then an icon representing the user's mobile device may appear in the tray as in FIG. 41.

At this point the DRP has now received the content from the mobile device transmitted by the digital transmitter, but this is not displayed in the display region 150. The icon in the tray as in FIG. 41 representing the mobile device may include a thumbnail or a low resolution version of the contents displayed on the user's mobile device. This can be achieved by the host computer sampling the information output from the DRP.

Figure 42:
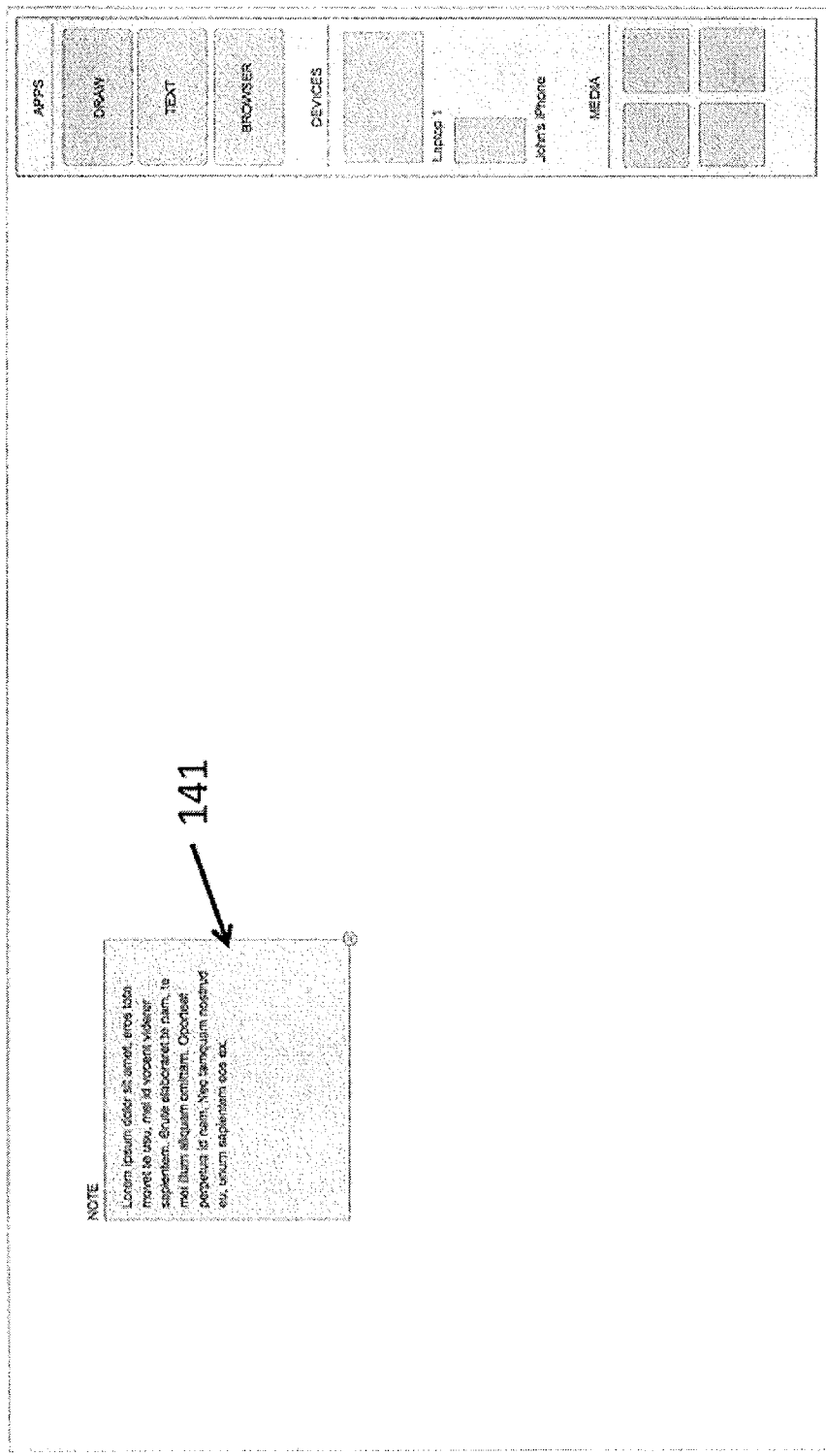
FIG. 42 illustrates a top view of a group display after a note application is opened.

In FIG. 42, a user has selected a text application from the tray region 140, which opens a text box or note 141 in the display region 150. This can be achieved by the user dragging the "text" icon in to the display region 150.

Figure 43:
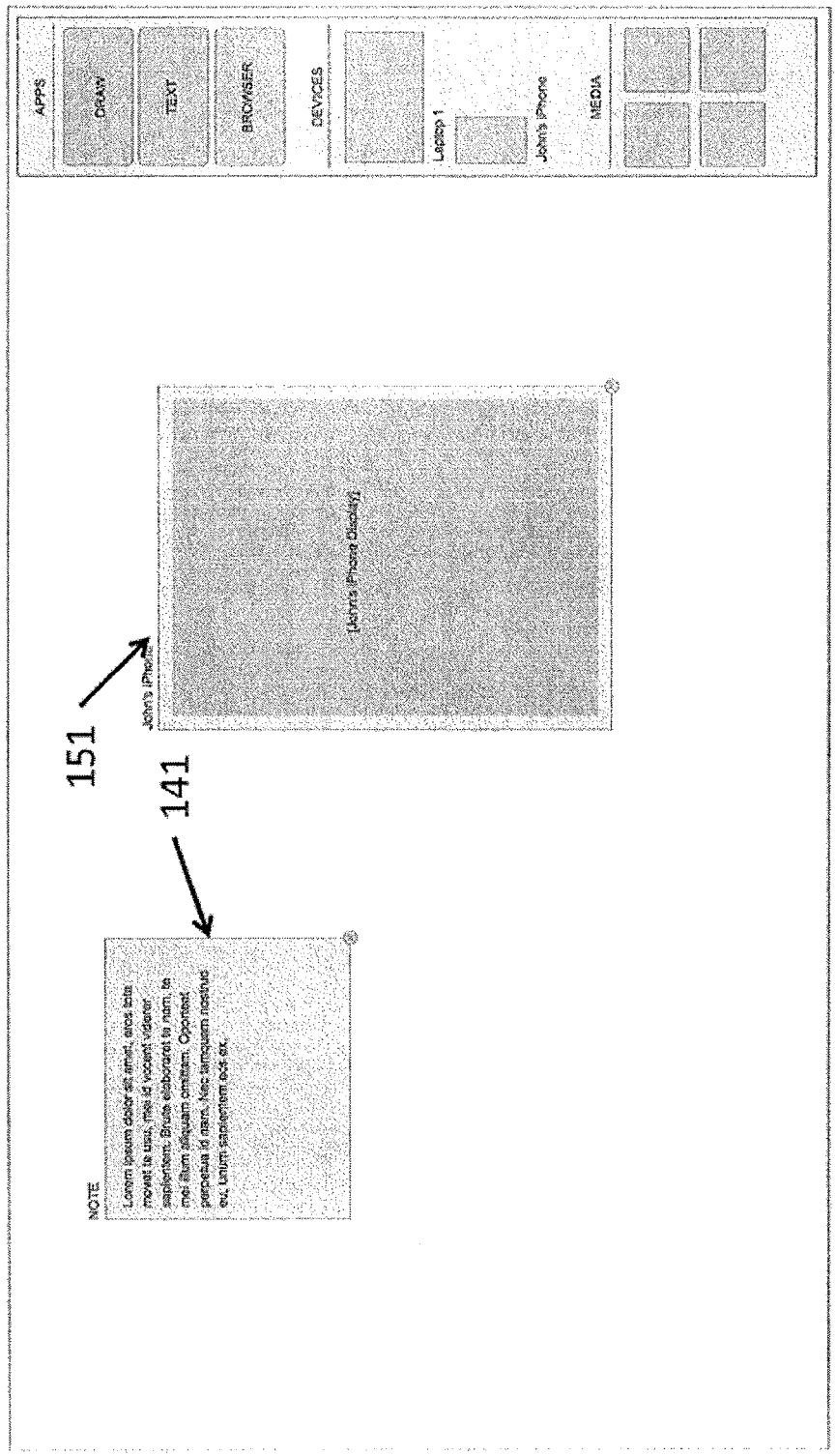
FIG. 43 illustrates a top view of a group display after information from a first mobile device is provided thereto.

In FIG. 43, information from a first mobile device is displayed in the display region 150. In order for the information from a mobile device to be displayed on the group display, the mobile device includes a digitizer, as described above. When a user wants to display something in the display region 150 from a mobile device, the device icon appearing in the tray region 140 may be dragged from the tray region towards the display region, thereby opening a window corresponding to that mobile device.

Before transmitting the information from the mobile device, the resolution to be transmitted needs to be established both in the digitizer (in the mobile device) and the DRP (in the host computer 130. The host computer 130 may send resolution information of digital display 120 to the mobile device. A standard resolution, e.g. 1080 p, may serve as a default, or a list of possible resolutions may be sent for the user of the mobile device. Alternatively, the digitizer may send a standard fixed resolution, or the maximum resolution it is capable of sending. Initially, when a mobile device is connected, the host computer may transmit the default resolution to the mobile device, and the digitizer may transmit its content at that standard default resolution. However, the output of the DRP may not be displayed directly on the group display 100. Instead, this output may be saved in a virtual layer. The virtual layer graphics information may be located in random access memory within the host computer, within a virtual display region in video memory within the graphics card, or may be displayed on a bottom layer of the group display, which is subsequently covered up by other layers generated by a host program running on the host computer and is therefore not visible to a user viewing the group display 100.

The host program accepts inputs from the DRP and also accepts other inputs, e.g., gesture and/or touch inputs, from the display region 150. When a mobile device is connected virtually through a wireless connection to the host computer, once the DRP sends the information to the host program, the host computer 130 generates the virtual layer and then uses the information within the virtual layer to display some or all of this information within a first window 151 in the display region 130 on the group display 100.

Figure 44:
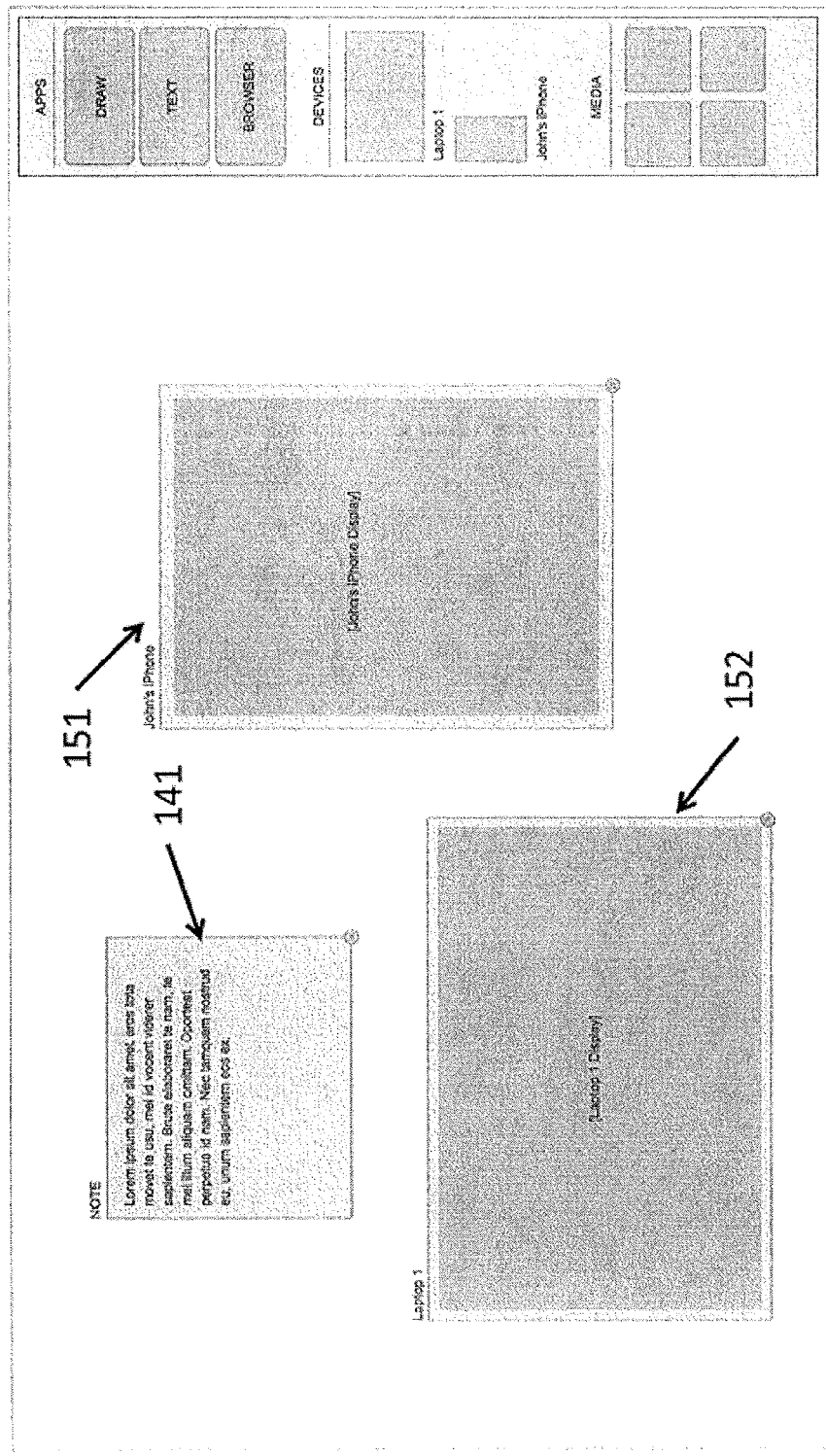
FIG. 44 illustrates a top view of a group display after information from a second mobile device is provided thereto.

As illustrated in FIG. 44, when a second mobile device is to be displayed in the display region 150 on the group display, the host computer generates the virtual layer and then uses the information within the virtual layer to display some or all of this information within a second window 152 in the display region 150 on the group display 100.

Thus, as shown in FIG. 44, each mobile may be displayed in a different window in the display region 150 on the group display 100. Each window may manipulated with touch and/or motion gestures. Such manipulations may include moving the windows (pan), resizing the widows (pinch and zoom), annotating the windows (text or drawing), tossing the window to another screen (as disclosed, for example, in U.S. Pat. No. 8,522,153, which is hereby incorporated by reference), or deleting the window.

For example, as the first window 151 is decreased in size, the host computer 130 may sample the information stored on the virtual layer and thereby still display the contents of the first mobile device's screen, but at reduced resolution. Subsequently, if the first window 151 is increased in size, then the contents for the first mobile device's screen can still fill the first window 151, and the resolution can be increased by accessing more information from the virtual layer, without affecting the DRP.

When a second mobile device is then connected in a similar manner, then the second window 152 may be displayed in the display region 150 on the group display 100 containing the contents of the second mobile device. Both first and second windows 151, 152 may then be resized, move, and updated in real time with the contents of the two mobile devices, which may be dynamically changing, e.g. if the contents on the mobile device screens themselves are changing and the resolution can be changed as the windows are resized, also in real time. Alternatively, when a user is interacting with window 151, 152, the image from the mobile device itself may remain static, and then updated once the interaction is ceased. Also, actions may be taken in different windows at the same time.

Figure 45:
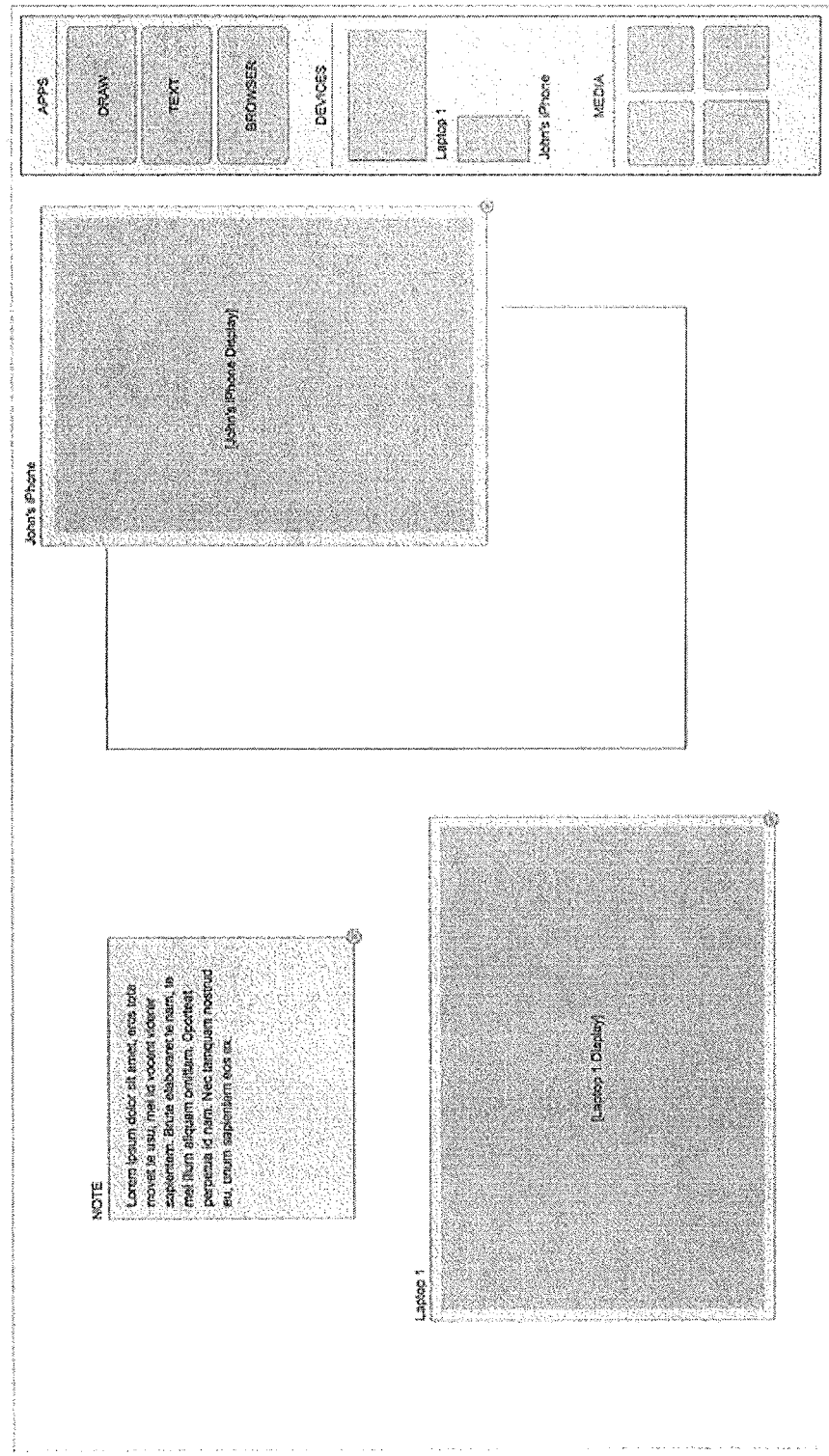
FIGS. 45 to 49 illustrate different actions that may be performed on the group display.
Figure 46:
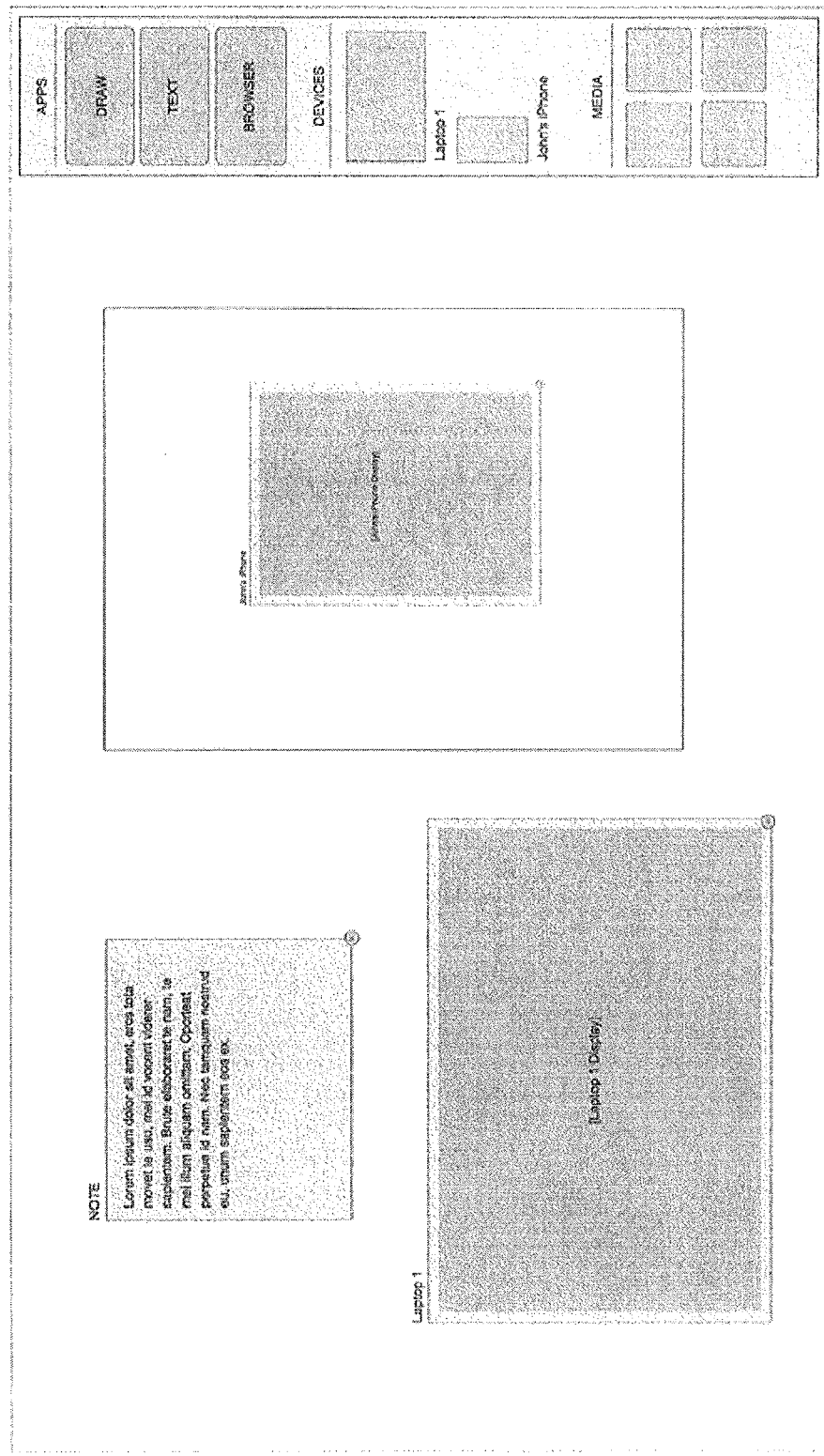

Numerous actions may be taken with respect to the window. As illustrated in FIG. 45, one of the windows, here window 151, has been panned or moved by a gesture adjacent the display region of the digital display 120 that is detected by the sensor 110 and processed by the host computer 130. As illustrated in FIG. 46, one of the windows, here window 151, has been resized, e.g., in response to a pinch or zoom gesture adjacent the display region of the digital display 120 that is detected by the sensor 110 and processed by the host computer 130. If the digital display 120 is mounted horizontally, in addition to pan, pinch and zoom gestures, rotation gestures may also be employed, e.g., to rotate a window for viewing by a user located on a different side of the table. In order to perform such alteration to the characteristics of the window, a user may first tap or point to the desired window to activate that window and then perform the desired alteration.

Figure 47:
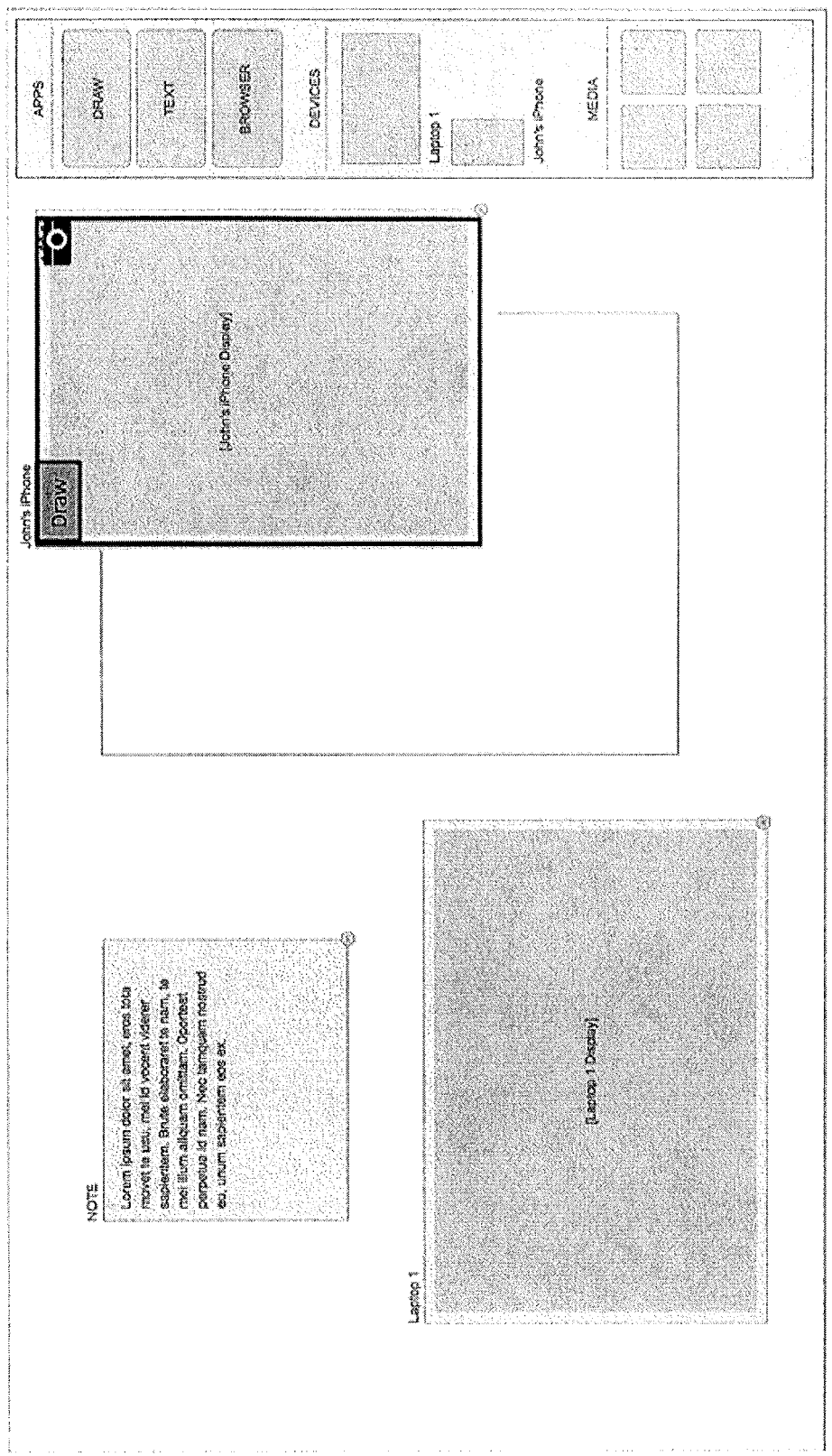
Figure 48:
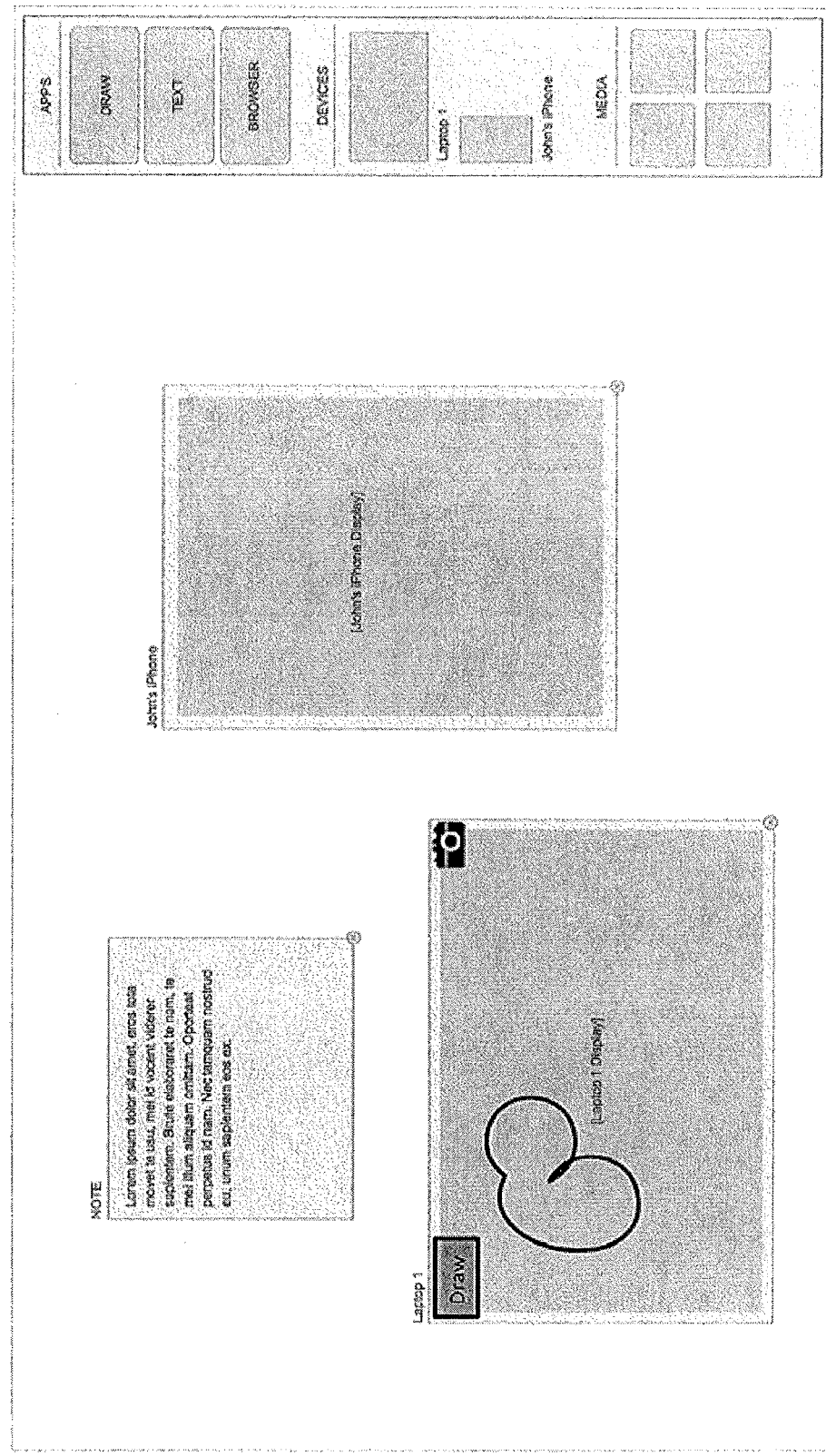
Figure 49:
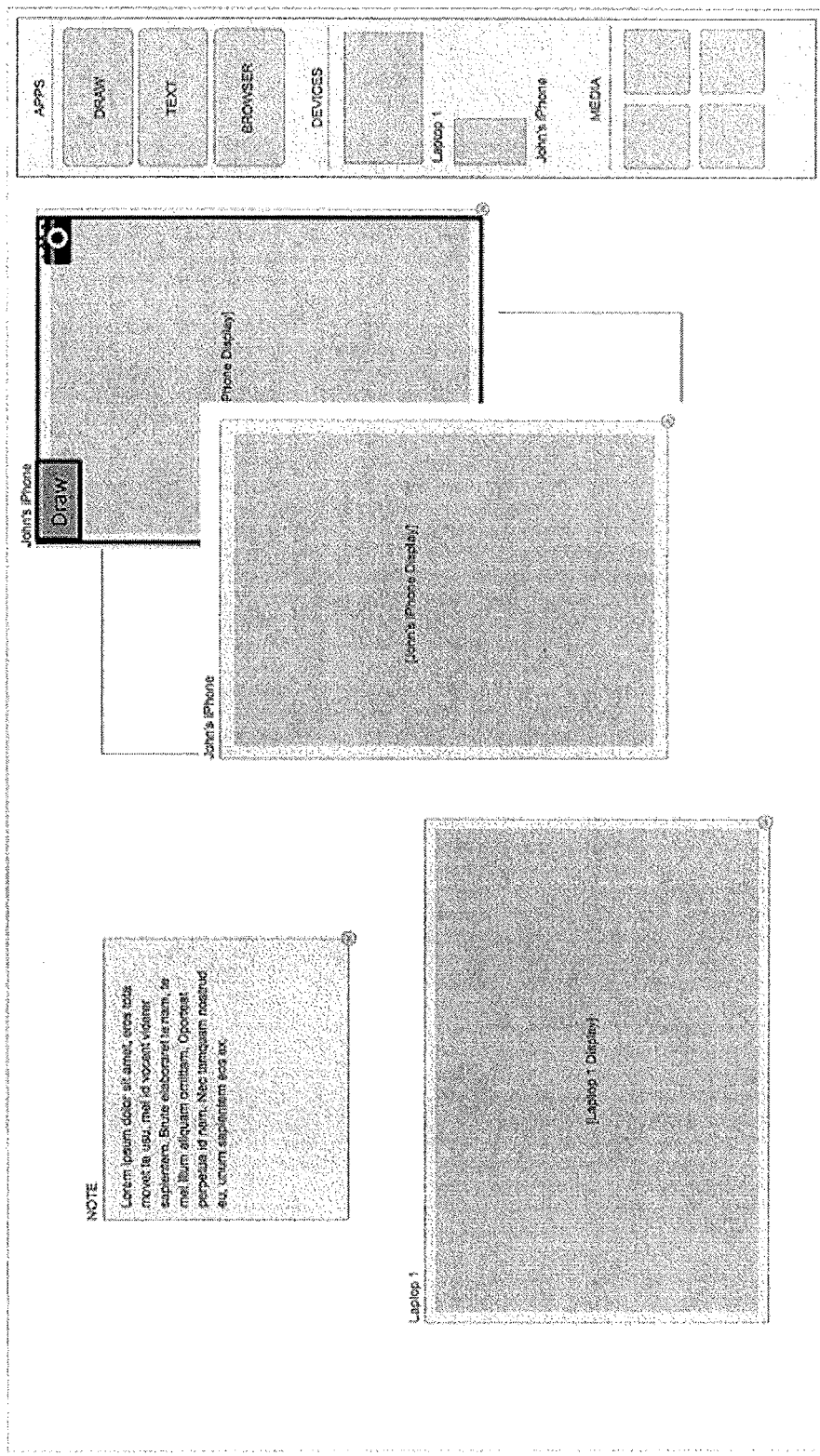

If a user is to otherwise alter or copy the window itself, a user may double tap or double point to activate additional functions to interact with the window. For example, as illustrated in FIG. 47, an activated window, here window 151, may now include a snapshot tool, indicated by a camera icon, and/or a draw tool. As illustrated in FIG. 48, one of the windows, here window 152, has been drawn on, e.g., annotation may be performed on a top layer, i.e., on top of the first and second windows. As illustrated in FIG. 49, when the camera icon of the window is activated, a snapshot of that window is provided in the display region 150.

Figure 50A:
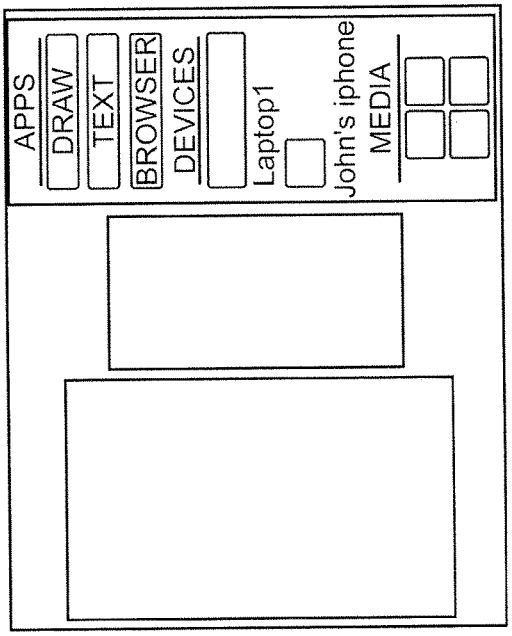
Figure 50B:
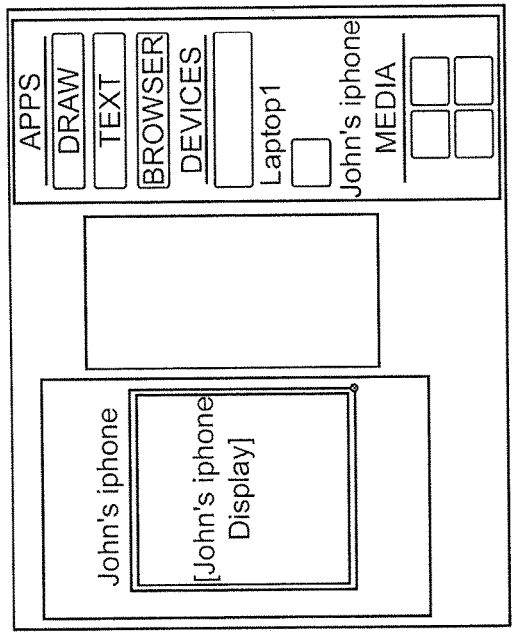

As illustrated in FIG. 50a, there may be a secondary display 200 near the group display 100. When a selected window is dragged or tossed in a particular direction, e.g., off the display region 150 or towards the secondary display, the window may be displayed on the secondary display 200, but no longer in the display region 150, as illustrated in FIG. 50b. Another window may also be tossed onto the secondary display 200, as illustrated in FIG. 50c. Then, as illustrated in FIG. 50d, one of the windows may be returned to the display region 150. If the secondary display includes a gesture sensor, the window may be returned to the display region 150 in a similar fashion. Additionally or alternatively, the secondary display 200 may include a clear screen icon. If the secondary screen does not include gesture recognition, then a clear screen icon can be place on the primary group display 100. If a window is tossed to a secondary screen, instead of removing the window from the primary group display 100, a duplicate of the window can be sent to the secondary display 200.

The secondary display 200 may be set up in any one of several modes including:

Mode1: Each time a window is tossed to the secondary display 200, it is displayed on the secondary display 200 and the previous window is removed from the secondary display 200.

Mode2: When a first window 131 from the group display 100 is tossed to the second group display, the first window 131 occupies all or a majority of the secondary display 200. Then, when the second window 132 from the group display 200 is tossed to the second group display 360, the first window 131 is reduced in size, so that both the first and second windows can be displayed on the secondary display 200.

The secondary display 200 may also be a touch display, so that the multiple windows can be organized, resized and rearranged on the secondary display 200.

Figure 51:
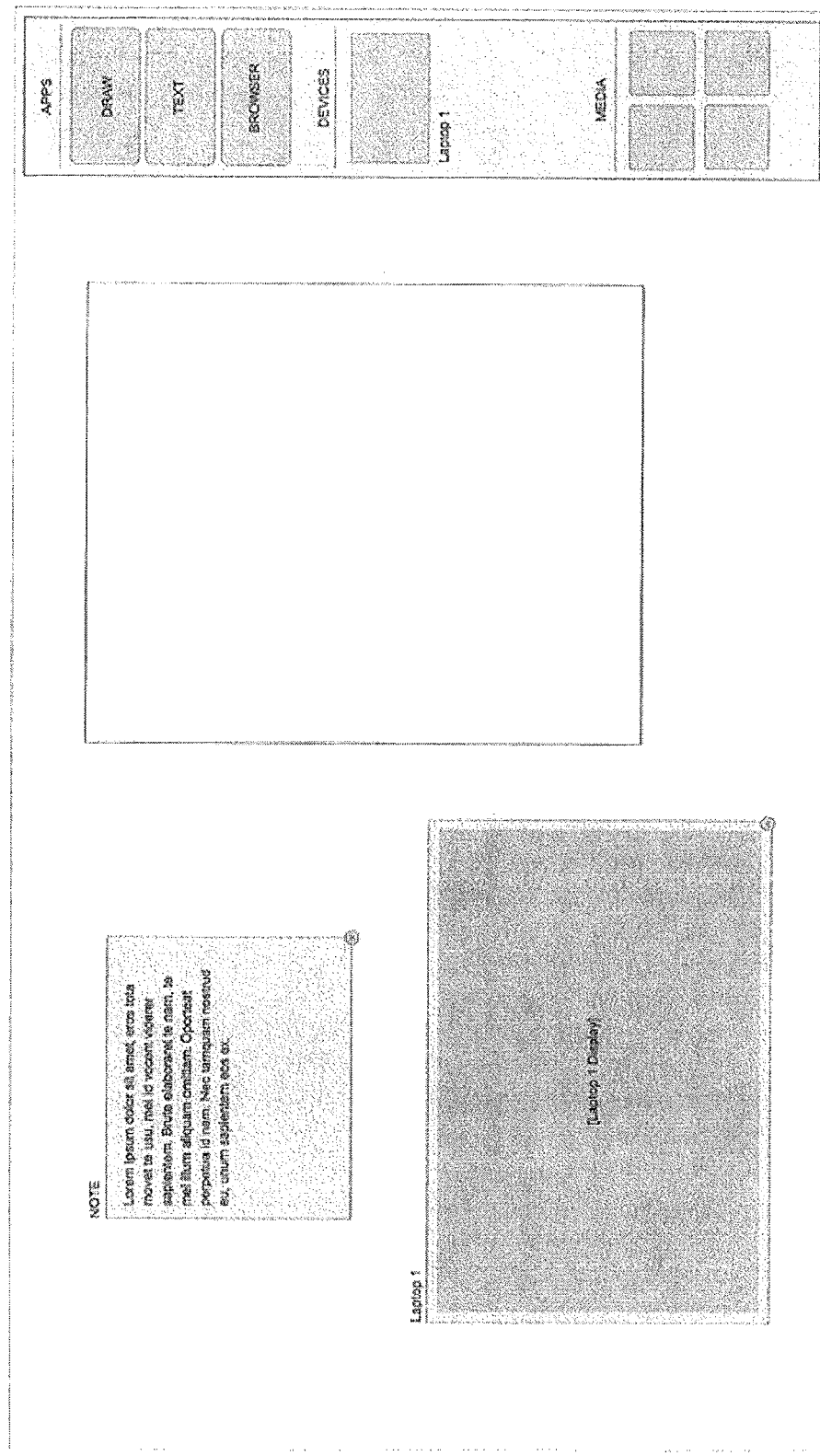
FIG. 51 illustrates a top view of a group display in which a mobile device has ceased communication.

As illustrated in FIG. 51, when a mobile device is no longer able to communicate with the group display, the corresponding window in the display region 150 and the icon in the tray region 140 will disappear.

Figure 52:
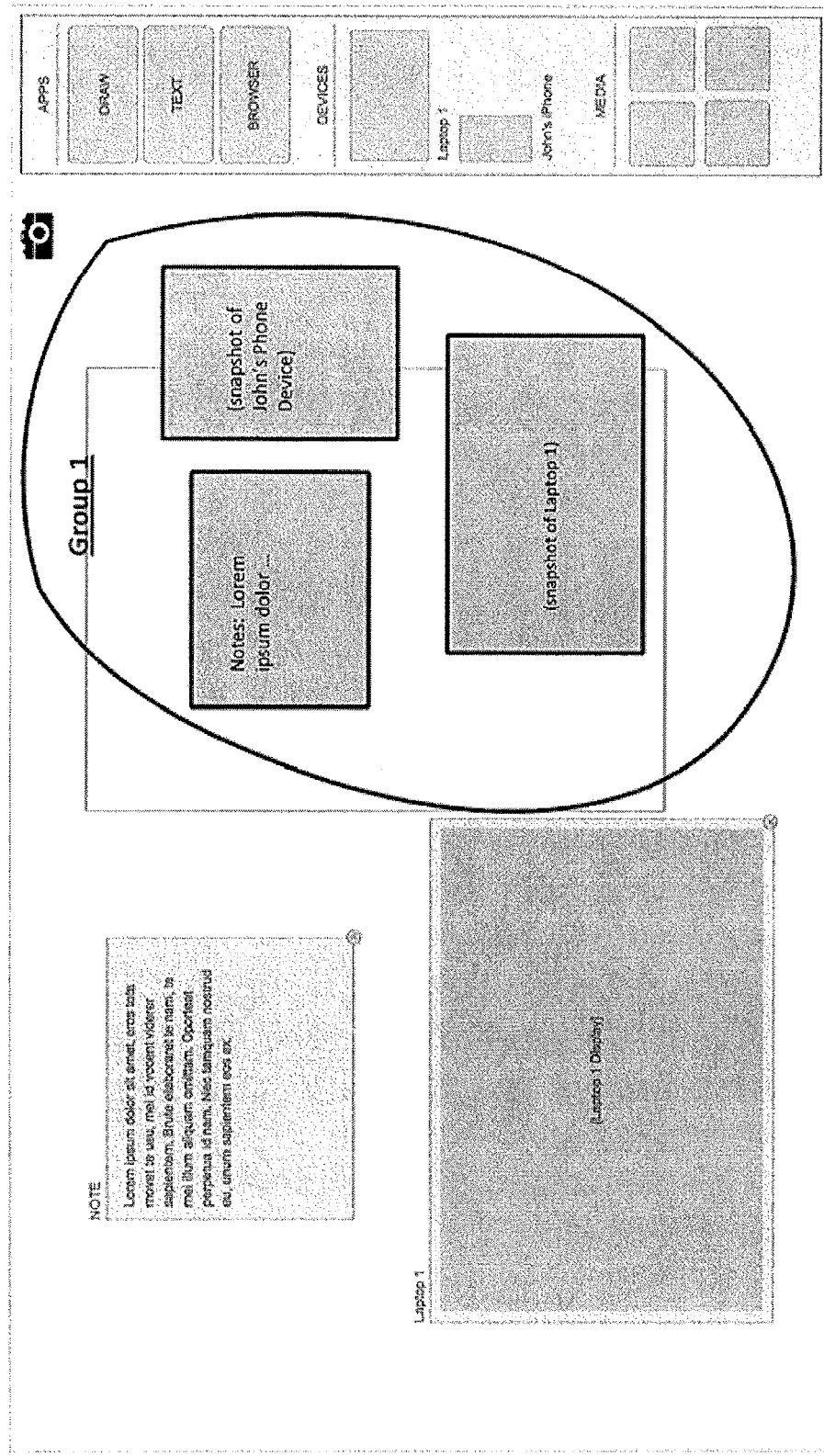
FIG. 52 illustrates a top view of a group display in which grouping is performed.

Items in the display region 150 may be grouped and/or sorted. For example, the first window 151, the second window 152, and other windows may be moved or resized. If a grouping is to be saved, a snapshot of any dynamic images may be taken, and then some gesture to indicate some grouping, e.g., encircling the grouped items, as illustrated in FIG. 52, may be saved, e.g., on the host computer 130 and/or the cloud, under a name, e.g., Group 1.

The group display 100 may be a 1080 p or a 4 k (3840×2160) resolution display. The first and second mobile devices may be connected at 1080 p resolution and initially displayed over an area occupying approximately one quarter of the display region 130 of the group display 100. As the first window 151 is reduced in size, the resolution within the first window would be reduced. If the first window 151 is increased beyond a size of about ¼ of the display region 150, the first window 151 may be displayed at a fixed resolution of 1080 p and scaled up to be displayed over the larger area.

Figure 53:
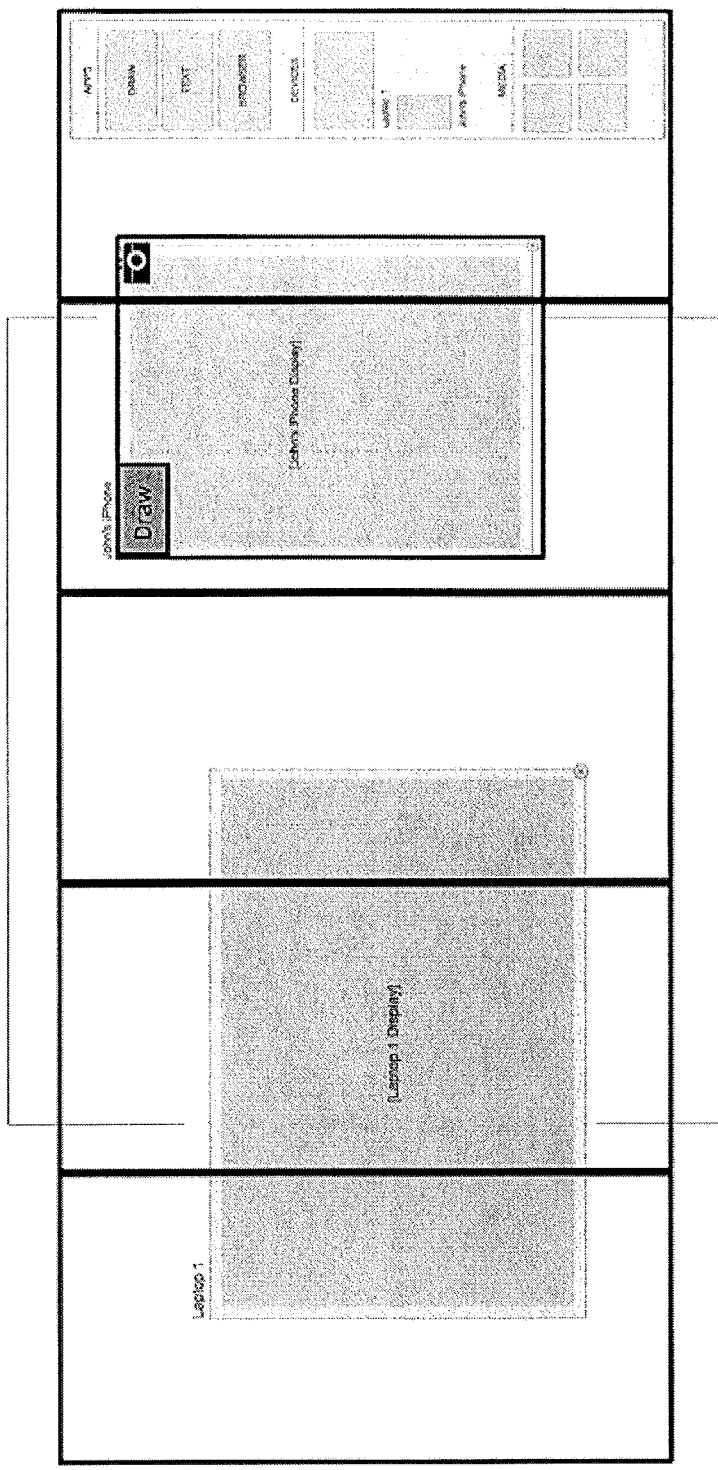
FIG. 53 illustrates a top view of a group display in which a mobile device has ceased communication.

In another example, as illustrated in FIG. 53, a group display 300 may include a series of 1080 p displays, each in portrait mode, e.g., five 1080 p displays that would have a combined resolution of 5400×1920. When a first mobile device is connected to this display, its contents could be displayed across 1920×1080 pixels, meaning the first window 151 would cross multiple displays. A single touch sensor could be placed across the series of displays, so that the first window could be manipulated by touch in the above described manners, even though the window would cross multiple displays. The Host Program may also allow capturing screen shots and/or videos of sections of the screens including the First Window and/or Second Window and any annotations on them. The use of multiple screens allows resolution to be maintained less expensively.

By way of summation and review, embodiments provide a multimedia display that allows content from more than one mobile device to be displayed, manipulated, and updated in real time on a group display.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. For example, input devices in addition to or other than the touch screen, e.g., gesture detectors, keyboards, mice, track pads, and so forth may be used. Accordingly, it will be understood by those of skill in the art that various changes in form and details may be made without departing from the spirit and scope of the present invention as set forth in the following claims.

What is claimed is:

1. In a computing environment, the computing environment having a multiple input detection system including a detector that detects and transmits multiple simultaneous user inputs from different users at a same time, a method for processing inputs from different users across multiple application windows of one or more applications displayed on a single display of a user interface, resulting in a multi-user graphical user interface (GUI), the computing environment running an operating system (OS) designed to run with a single user GUI, the method comprising: receiving a first user input from the detector;

simultaneous to receiving the first user input from the detector, receiving a different second user input from the detector;

determining, in a primary application, separate from the OS, that the first user input corresponds to a first window;

the primary application sending the first user input to a first secondary application that runs in parallel with the primary application, the first secondary application being designed to run with the OS;

determining a first user input event from the first user input;

displaying a result of the determined first user input event in the first window associated with the first secondary application;

determining, in the primary application, that the second user input corresponds to a second window;

the primary application sending the second user input to a second secondary application that runs in parallel with the primary application, the second secondary application being designed to run with the OS;

determining a second user input event from the second user input; and displaying a result of the determined second user input event on the second window associated with the second secondary application, wherein the first and secondary applications starts up in invisible windows by the primary application, wherein said method further comprising providing a first user account and corresponding login information for the primary application, the primary application running in the first user account, the primary application logging into a second user account for the first secondary application within the second user account and starting the first secondary application, display information from the first secondary application or an entirety of a desktop for the second user being transferred to the primary application to be displayed by the primary application in a window on the display and input information is transferred by the primary application to the first secondary application or to the desktop for the second user.

2. The method as claimed in claim 1, wherein the first and second secondary applications are a same type of application.

3. The method as claimed in claim 2, wherein the first and second secondary applications are web browser applications.

4. The method as claimed in claim 1, wherein the primary application distributes user inputs to the first and second secondary applications while bypassing the OS.

5. The method as claimed in claim 1, wherein the primary application receives user inputs from the detector before the OS receives the first user input.

6. The method as claimed in claim 1, wherein the primary application distributes user inputs to the first and second secondary applications through the OS.

7. The method as claimed in claim 1, wherein the primary application is in a first computer running a first operating system and the first and second secondary applications are in at least one second computer running a second operating system.

8. The method as claimed in claim 7, wherein the first operating system and second operating system are different types of operating systems.

9. The method as claimed in claim 1, wherein the first user input includes moving or resizing the first window and the second user input includes moving or resizing the second window.

10. In a computing environment, the computing environment having a multiple input detection system including a detector that detects and transmits multiple simultaneous user inputs from different users at a same time, a method for processing inputs from different users across multiple application windows of one or more applications displayed on a single display of a user interface, resulting in a multi-user graphical user interface (GUI), the computing environment running an operating system (OS) designed to run with a single user GUI, the method comprising: receiving a first user input from the detector;

simultaneous to receiving the first user input from the detector, receiving a different second user input from the detector;

determining, in a primary application, separate from the OS, that the first user input corresponds to a first window;

the primary application sending the first user input to a first secondary application that runs in parallel with the primary application, the first secondary application being designed to run with the OS;

determining a first user input event from the first user input;

displaying a result of the determined first user input event in the first window associated with the first secondary application;

determining, in the primary application, that the second user input corresponds to a second window;

the primary application sending the second user input to a second secondary application that runs in parallel with the primary application, the second secondary application being designed to run with the OS;

determining a second user input event from the second user input; and displaying a result of the determined second user input event on the second window associated with the second secondary application, the primary application is in a first computer running a first operating system and the first and second secondary applications are in at least one second computer running a second operating system which is different from the first operating system.

* * * * *